(12) United States Patent
Madisetti et al.

(10) Patent No.: US 10,460,283 B2
(45) Date of Patent: *Oct. 29, 2019

(54) SMART CONTRACT OPTIMIZATION FOR MULTIPARTY SERVICE OR PRODUCT ORDERING SYSTEM

(71) Applicant: Vijay Madisetti, Johns Creek, GA (US)

(72) Inventors: Vijay Madisetti, Johns Creek, GA (US); Arshdeep Bahga, Chandigarh (IN)

(73) Assignee: Vijay Madisetti, Johns Creek, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,046

(22) Filed: Mar. 25, 2019

(65) Prior Publication Data

US 2019/0220813 A1 Jul. 18, 2019

Related U.S. Application Data

(63) Continuation-in-part of application No. 16/127,283, filed on Sep. 11, 2018, now Pat. No. 10,243,743.

(60) Provisional application No. 62/557,820, filed on Sep. 13, 2017, provisional application No. 62/618,784, filed on Jan. 18, 2018, provisional application No.
(Continued)

(51) Int. Cl.
*G06Q 10/08* (2012.01)
*G06Q 20/40* (2012.01)
*H04L 9/06* (2006.01)

(52) U.S. Cl.
CPC ....... *G06Q 10/0833* (2013.01); *G06Q 20/401* (2013.01); *G06Q 20/405* (2013.01); *H04L 9/0637* (2013.01); *H04L 2209/38* (2013.01); *H04L 2209/56* (2013.01)

(58) Field of Classification Search
CPC ............ H04L 2209/38; H04L 2209/56; H04L 9/0637; G06Q 20/405; G06Q 10/0833; G06Q 20/065; G06Q 2220/00; G06Q 20/401; G06Q 20/389; G06F 21/602; G06F 21/645; G06F 16/2635
See application file for complete search history.

(56) References Cited

U.S. PATENT DOCUMENTS

2017/0236123 A1* 8/2017 Ali ....................... G06Q 20/401
705/75
2017/0353309 A1* 12/2017 Gray ....................... G06F 21/53
(Continued)

*Primary Examiner* — David T. Brooks
(74) *Attorney, Agent, or Firm* — Daniel C. Pierron; Widerman Malek, PL

(57) ABSTRACT

A method of tracking orders through a blockchain network including receiving an indication of order placement, receiving a plurality of global variable registration requests from a plurality of linked smart contracts recorded to a first blockchain network responsive to an order placement at a global variable name system (GVNS), defining a global variable responsive to each global variable registration request, receiving a first status update related to the order from a first smart contract of the plurality of smart contracts, defining a first received status update, and updating a first global variable of the GVNS responsive to the first received status update, defining a first GVNS variable update. The first and second smart contracts include the first global variable and the value of the first global variable on each of the first and second smart contracts is updated responsive to the first GVNS variable update.

20 Claims, 44 Drawing Sheets

Related U.S. Application Data

62/814,892, filed on Mar. 7, 2019, provisional application No. 62/815,394, filed on Mar. 8, 2019.

(56) References Cited

U.S. PATENT DOCUMENTS

| | | | |
|---|---|---|---|
| 2018/0144156 A1* | 5/2018 | Marin | G06F 21/31 |
| 2018/0158050 A1* | 6/2018 | Chenard | G06F 21/64 |
| 2018/0181309 A1* | 6/2018 | Miyamae | G06F 3/065 |
| 2018/0330343 A1* | 11/2018 | Gray | G06Q 20/065 |
| 2019/0080284 A1* | 3/2019 | Kim | G06Q 10/0833 |
| 2019/0087793 A1* | 3/2019 | Dickerson | G06Q 20/0658 |

* cited by examiner

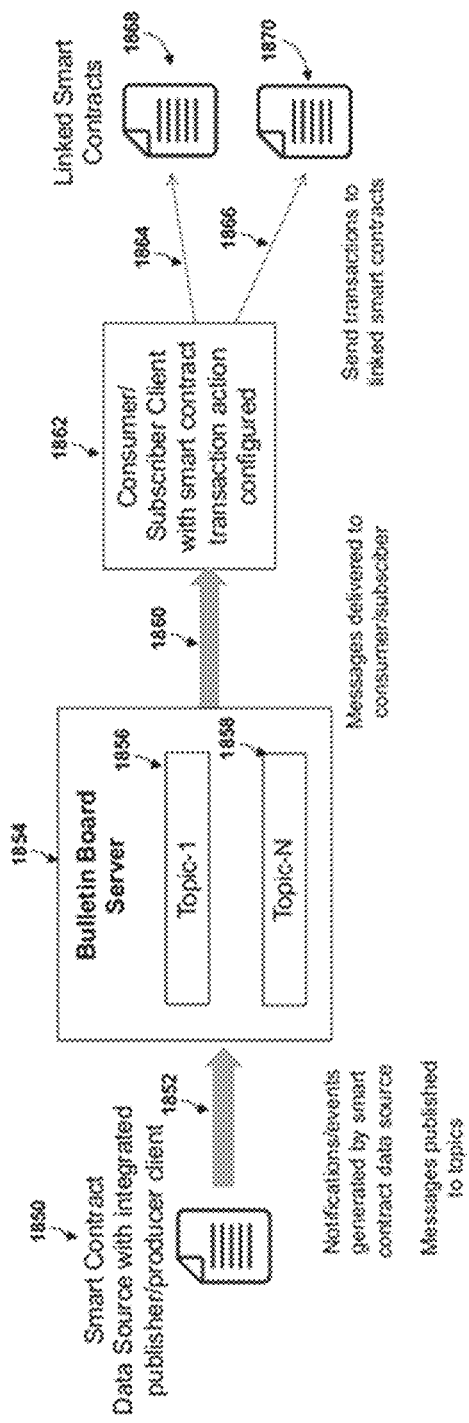

Publisher/Producer Client

```
import bulletinboard
client=bulletinboard.client()
client.connect(server='127.0.0.1', port='8884',
               clientID='client123', secret='123456')
message={
    topics: ["lending", "loans"],
    payload: {"loanRequest":"12",
              "amount":"100", "interest":"0.01"},
    headers:{"from":"0x0", "priority":1,
             "persistent":True}
    ttl: 100,
    nonce: 123
}
client.publish(message)
```

Consumer/Subscriber Client

```
import bulletinboard
client=bulletinboard.client()
client.on_connect = on_connect
client.on_message = on_message client.connect(server='127.0.0.1', port='8884',
               clientID='client123', secret='123456')

def on_connect(client):
    print("Connected to Bulletin Board Server")
    client.subscribe("#")

def on_message(client, msg):
    print("topic: "+ msg.topic)
    print("payload: "+ str(msg.payload))

client.loop_forever()
```

SMART CONTRACT OPTIMIZATION FOR MULTIPARTY SERVICE OR PRODUCT ORDERING SYSTEM

RELATED APPLICATIONS

This application is a continuation-in-part application of and claims priority under 35 U.S.C. § 120 of U.S. patent application Ser. No. 16/127,283 filed on Sep. 11, 2018 and titled Tokens or Crypto Currency Using Smart Contracts and Blockchains, which in turn claims priority under 35 U.S.C. § 119(e) of U.S. Provisional Patent Application Ser. No. 62/557,820 filed on Sep. 13, 2017 and titled Tokens or Crypto Currency for Change Using Smart Contracts and Blockchains, which in turn claims priority under 35 U.S.C. § 119(e) of U.S. Provisional Patent Application Ser. No. 62/618,784 filed on Jan. 18, 2018 and titled Additional Features of CoinBank and nCash NCC Tokens. This application also claims priority under 35 U.S.C. § 119(e) of U.S. Provisional Patent Application Ser. No. 62/814,892 filed on Mar. 7, 2019 and titled Enhanced Point of Sale POS with Blockchain and Smart Contracts. This application also claims priority under 35 U.S.C. § 119(e) of U.S. Provisional Patent Application Ser. No. 62/815,394 filed on Mar. 8, 2019 and titled Smart Contract Optimization for Multiparty Service or Product Ordering Systems. The contents of these applications are incorporated herein by reference.

FIELD OF THE INVENTION

The present invention relates to systems and methods for blockchain-based optimization of order placement, order delivery, purchase order, order return via smart contracts.

BACKGROUND OF THE INVENTION

Blockchain is a distributed and public ledger which maintains records of all the transactions. A blockchain network is a truly peer-to-peer network and it does not require a trusted central authority or intermediaries to authenticate or to settle the transactions or to control the network infrastructure. Users can interact and transact with the blockchain networks through Externally Owned Account (EOAs), which are owned and controlled by the users. Each EOA has a balance (in certain units of a Cryptocurrency associated with the Blockchain network) associated with it. EOAs do not have any associated code. All transactions on a blockchain network are initiated by EOAs. These accounts can send transactions to other EOAs or contract accounts. Another type of accounts support by second generation programmable Blockchain platforms are the Contract Accounts. A Contract Account is created and owned by an EOA and is controlled by the associated contract code which is stored with the account. The contract code execution is triggered by transactions sent by EOAs or messages sent by other contracts.

Blockchain networks can either be public or private. Public blockchain networks are free and open to all and any user can create an account and participate in the consensus mechanism on a public blockchain and view all the transactions on the network. Private blockchain networks are usually controlled and operated by a single organization and the transactions can be viewed only by the users within the organization. Public blockchain networks are usually unpermissioned or permissionless, as any node can participate in consensus process. Some public blockchain networks adopt a permissioned model where the consensus process is controlled by a pre-selected set of nodes. Private blockchain networks usually adopt the permissioned model. While public blockchain networks can be considered as fully decentralized, private blockchain networks are partially decentralized.

Organizations can have multiple private blockchain networks where each network is dedicated to a specific use case or department or business vertical. The blockchain networks within an organization may be created either using the same blockchain platform or technology or with different platforms or technologies.

On each blockchain network, a user can create multiple Externally Owned Accounts (EOAs). Each Externally Owned Account (EOA) has a public-private keypair associated with it. The account address is derived from the public key. When a new EOA is created, a keyfile is created which has the public and private keys associated with the account. The private key is encrypted with the password which is provided while creating the account. For sending transactions to other accounts, the private key and the account password are required.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

With the above in mind, embodiments of the present invention are directed to a system and associated methods for exchange of information, value or tokens within and between blockchain networks and the real physical world.

In some embodiments, the systems, apparatus and methods allow creation and deployment of scalable blockchain applications that rely on a large number of smart contracts that interact with each other through the use of either a cloud-based billboard architecture or a blockchain-based billboard architecture. This architecture allows extension of existing blockchain applications to deploy smart contracts that use global shared variables (within languages, such a Solidity) to exchange information with each other. The billboard architecture allows the integration of scalable information exchange between the real-world (e.g., triggers such as loan payments or sales of products) and the systems of smart contracts and oracles, seamlessly and efficiently. Several familiar programming models such as push/pull, publish/subscribe and consumer/producer may be easily supported for production deployment.

Decentralized blockchain applications and smart contracts in second and third generation blockchain platforms such as Ethereum, Hyperledger, Neo, Lisk and EOS that rely on a large number of linked smart contracts interacting with each other can benefit from the proposed Bulletin Board Messaging Framework (BBMF) and the Global Variable Name System (GVNS) technologies. In current implementations of applications with linked smart contracts, one smart contract can send a transaction to another contract or reference public state variables of other contracts. However, such calls and variable references must be coded in the smart contract and the contract code once deployed cannot be changed. If one contract in a system of linked contracts must be changed then it would need re-deployment of all the other linked contracts as the code has to be changed. BBMF and GVNS technologies allow the seamless integration of scalable information exchange between the real-world and the systems of smart contracts and oracles, seamlessly and efficiently. Further, legacy blockchain-based code can be seamlessly upgraded and functionality modified through change in the BBMF framework through new mapping and distribution from older public state variables to new or redefined ones.

In some embodiments, the method and systems may further comprise fintech and enterprise applications, including but not limited retail payments, loyalty rewards and peer-to-peer lending application and an associated platform that provide the following features:

- Scalable blockchain architecture that links to the real-world: Decentralized applications and systems that are based on a very large number of interacting smart contracts that are coupled with and responsive to real world triggers and events, using a novel billboard-based information and value distribution system.
- Secure Blockchain Payments: The platform is built on second generation programmable Blockchain network (such as Ethereum) and allows individuals to securely send and receive payments.
- Pay at Merchant Stores: The application allows users to spend crypto or fiat currencies managed by the platform at affiliated merchant stores.
- Get Change in Tokens: Users no longer have to deal with the inconvenience of receiving loose change back when making purchases, rather they can receive the change into their mobile application wallet.
- Loyalty Rewards and Offers: Users can get exclusive loyalty rewards, discount offers and cashbacks by paying with app at affiliated merchant stores.
- Supports Multiple Currencies: The mobile application wallet is capable of managing multiple layers of currencies (fiat currency, cryptocurrency and ERC-20 tokens). Users can buy the native tokens named Coins (NCC) by paying with credit or debit card, ACH bank transfer, or any of the supported cryptocurrencies (including Bitcoin, Ether, Litecoin, and more).
- ERC20 Token: Coins (NCC) are based on the ERC-20 token standard. NCC tokens can be purchased with any of the supported fiat or crypto currencies in the exemplary app.
- Chat and Transact with Contacts: With the app users can chat and send payments or request payments from their contacts.
- Borrow and Lend Coins: The application includes a lending marketplace and supports borrowing and lending of exemplary coins.
- Multiple Account Types: The application supports customer, merchant admin and merchant operator account types. The exemplary application and platform is an example of where these proposed technologies may be inserted into.

Additionally, embodiments of the present invention are directed to a method of exchanging value across a blockchain network comprising receiving a first transaction smart contract, that may be a transaction, comprising a transaction amount global variable name request and a transaction amount, recording the first transaction to a second transaction smart contract on a first blockchain network, and registering the first transaction amount global variable name to a global variable name system, defining a transaction amount global variable. The method further comprises defining a value of the transaction amount global variable responsive to the transaction amount, receiving a second transaction smart contract, which may also be a financial transaction, comprising a second transaction global variable name request and a second transaction amount, and registering the second transaction global variable name request to the global variable name system, defining a second transaction global variable. The method further comprises defining a value of the second transaction global variable responsive to the second transaction amount, receiving a transaction notification comprising the second transaction global variable name and a transaction value, recording the transaction notification to the second smart contract, and updating the value of the second transaction global variable responsive to the transaction value.

In some embodiments, updating the value of the second transaction global variable may comprise publishing the updated value of the second transaction global variable to a first managed topic on a first messaging server and transmitting the content published to the managed topic to a first subscriber. The receipt of the content published to the first managed topic by the first subscriber may initiate a smart contract transaction for a first smart contract, the first smart contract being recorded on a first blockchain network.

Registering the transaction amount global variable, registering the second transaction global variable, and registering the registering the second transaction global variable each comprise performing a global variable registration process may comprise receiving a request for to register a global variable name at a global variable name registrar from a user, defining a new global variable, defining an owner for the new global variable at a global variable name registry, defining a resolver for the new global variable at the global variable name registry, and defining a value of the new global variable. Additionally, the method may further comprise performing an updating procedure to update the value of the new global variable, the updating procedure comprising receiving a trigger generated by a smart contract data source on a first messaging server, the trigger comprising an updated value of the new global variable, publishing the updated value comprised by the trigger to a first managed topic associated with the new global variable on the first messaging server, and transmitting the updated value comprised by the trigger that is published to the managed topic to a first subscriber. Receipt of the content published to the first managed topic by the first subscriber may initiate a smart contract transaction for a first smart contract, the first smart contract being recorded on the first blockchain network.

In some embodiments, the method may further comprise receiving a collateral input and recording the collateral input to a collateral smart contract on the first blockchain network. The collateral input may be a collateral token generated by receiving a tangible asset collateral deposit, generating a collateral token associated with the tangible asset collateral deposit, and transmitting the collateral token. The tangible asset may be received by a third party and the collateral token may be generated by the third party. In some embodiments, the method may further comprise receiving a repayment notification, recording the repayment notification to the second transaction smart contract, updating the value of the second transaction global variable, and recording a collateral release to the collateral smart contract. In some embodiments, the method may further comprise receiving a default notification, recording the default notification to the second transaction smart contract, updating the value of the second transaction global variable, and recording a collateral release to the collateral smart contract directed to the second transaction global variable. The collateral input may comprise at least one of cryptocurrency or a collateral token.

In some embodiments, the method may further comprise receiving an installation payment, recording an installation payment notification to the second transaction smart contract, updating the second transaction global variable responsive to a value of the installation payment, and transferring at least a portion of the value of the installation payment to an entity associated with the second transaction global variable.

In some embodiments, the first transaction smart contract may further comprise a loan duration and a loan interest rate, collectively defining borrower conditions, the method further comprising registering a loan duration global variable name to the global variable name system, defining a loan duration global variable, defining a value of the loan duration global variable responsive to the transaction amount, registering a loan interest rate global variable name to the global variable name system, defining a loan interest rate global variable, and defining a value of the loan interest rate global variable responsive to the loan interest rate. The method may further comprise receiving a plurality of lending offers from a plurality of lenders, each lending offer comprising an amount to lend, a loan duration, and expected returns, collectively defining lending pool conditions, recording the plurality of lending offers, defining a lending pool, to a second transaction smart contract on the first blockchain network, the values of the lending offers of the plurality of lending offers defining lending pool conditions, determining if the borrower conditions match the lending pool conditions, matching a lending offer from the second transaction smart contract to the first transaction, recording a borrower smart contract between the borrower and the second transaction smart contract, and recording a lender smart contract between the lender associated with the matched lending offer and the second transaction smart contract. Additionally, the method may further comprise receiving multiple pluralities of lending offers from a plurality of lenders, each lending offer comprising an amount to lend, a loan duration, and expected returns, recording each plurality of lending offers, defining a lending pool, to a second transaction smart contract on the first blockchain network, the values of the lending offers of the plurality of lending offers defining lending pool conditions, recording a plurality of second transaction smart contracts to a pool of pools smart contract on the first blockchain network, determining if the borrower conditions match the lending pool conditions of any of the plurality of second transaction smart contracts comprised by the pool of pools smart contract, matching a lending offer from the pool of pools smart contract to the first transaction, recording a borrower smart contract between the borrower and the pool of pools smart contract, recording a pool-to-pool smart contract between the pool of pools smart contract and the second transaction smart contract, and recording a lender smart contract between the lender associated with the matched lending offer and the second transaction smart contract.

In some embodiments, the method may further comprise receiving borrower identity information associated with a borrower, receiving a borrower credit rating, and recording the borrower credit rating to a credit rating and reputation smart contract on the first blockchain network.

Additional embodiments of the inventions may be directed to a system for exchanging value across a blockchain network comprising a processor, a data storage device, such as memory, positioned in communication with the processor, and a network communication device positioned in communication with each of the processor, the data storage device, and a network. The network communication device may be operable to receive a first transaction smart contract comprising a transaction amount global variable name request and a transaction amount. The processor may be operable to record the first transaction to a second transaction smart contract on a first blockchain network and register the first transaction amount global variable name to a global variable name system, defining a transaction amount global variable. Additionally, the network communication device may be operable to receive a second transaction smart contract comprising a second transaction global variable name request and a second transaction amount. Furthermore, the processor may be operable to register the second transaction global variable name request to the global variable name system, defining a second transaction global variable. The network communication device may be operable to receive a transaction notification comprising the second transaction global variable name and a transaction value. The processor may be operable to record the transaction notification to the second transaction smart contract and update a value of the second transaction global variable responsive to the transaction value.

Further embodiments are directed to a method of tracking orders through a blockchain network comprising receiving a plurality of global variable registration requests from a plurality of linked smart contracts recorded to a first blockchain network responsive to an order placement at a global variable name system (GVNS), defining a global variable responsive to each global variable registration request, receiving a first status update related to the order placement from a first smart contract of the plurality of smart contracts, defining a first received status update, and updating a first global variable comprised by the GVNS responsive to the first received status update, defining a first GVNS variable update. The first global variable may be comprised by the first smart contract and a second smart contract of the plurality of smart contracts and the value of the first global variable on each of the first and second smart contracts may be updated responsive to the first GVNS variable update.

In some embodiments, the method may further comprise receiving a first indication of value transfer from a distributed application responsive to the first GVNS variable update. The value transfer may be indicated to have occurred on a second blockchain network discrete from the first blockchain network.

In some embodiments the method may further comprise receiving a second status update related to the order from the second smart contract of the plurality of smart contracts, defining a second received status update and updating a second global variable comprised by the GVNS responsive to the second received status update, defining a second GVNS variable update. The method may further comprise a second indication of value transfer from a distributed application responsive to the second GVNS variable update.

In some embodiments the plurality of global variable registration requests and the first status update may be received at an oracle in communication with the GVNS. The method may further comprise receiving the plurality of global variable registration requests and the first status update from the oracle, receiving a status request for the first global variable from the oracle, transmitting a first flag to the oracle if the first global variable has changed in a time period since a previous status request for the first global variable, defining a first indication time period, and transmitting the value of the first global variable to the oracle where the first flag indicates the first global variable has changed during the first indication time period. The GVNS may be implemented in a database outside the first blockchain network.

In some embodiments the plurality of linked smart contracts may comprise a smart contract associated with the placing of the order, a smart contract associated with receipt of the order by an order fulfillment agent, and a smart contract associated with a delivery agent. The plurality of linked smart contracts may further comprise an escrow smart contract.

BRIEF DESCRIPTION OF THE DRAWINGS

FIG. 34 is an illustration of a smart contract data source that uses an integrated publisher client to publish messages to the publish-subscribe messaging framework, according to an embodiment of the invention.

FIG. 35 is an illustration of the message format for the publish-subscribe messaging framework, according to an embodiment of the invention.

FIG. 40 is an exemplary implementation of a Bulletin Board Publisher/Producer client and Consumer/Subscriber client, according to an embodiment of the invention.

FIG. 45 is an illustration of the mobile application features extended to show different types of accounts, according to an embodiment of the invention.

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to like elements throughout.

Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

Figure 1:
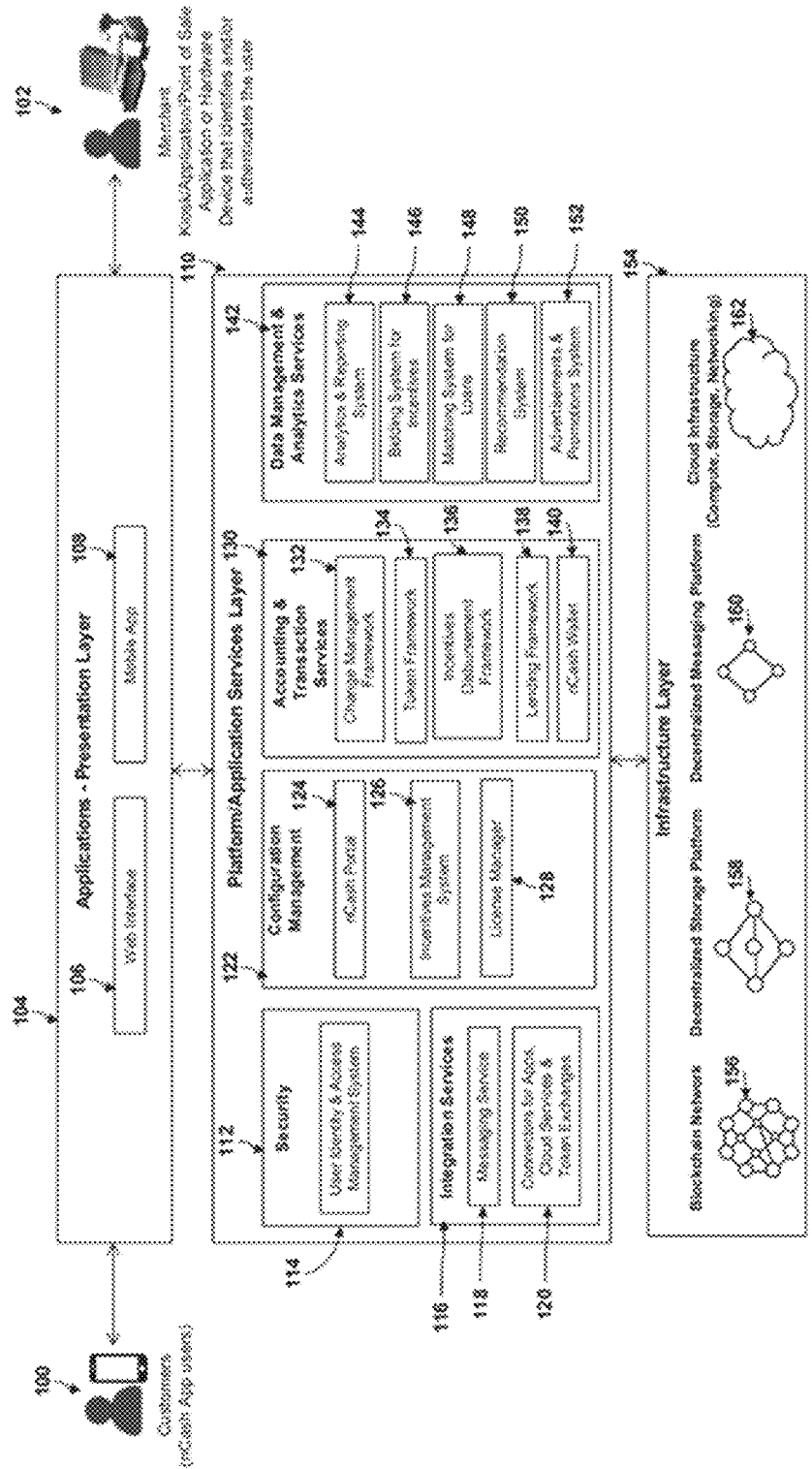
FIG. 1 is a schematic diagram of a retail payments, loyalty rewards and peer-to-peer lending system that uses smart contracts and blockchain.

Referring now to FIG. 1 a schematic diagram of a retail payments, loyalty rewards and peer-to-peer lending system that uses smart contracts and blockchain, is described in more detail. A user 100 and a merchant 102 may complete a transaction through use of an application and presentation layer 104. The application and presentation layer 104 may comprise a web interface 106 and/or a mobile application 108. Elements of the application and presentation layer 104 may be the client-facing element of a platform/application services layer 110. The platform/application services layer 110 may comprise security features 112, such as a user identity and access management system 114. The platform/application services layer 110 may further comprise integration services 116, such as, for example, a messaging service 118 or a connector service for applications, cloud services, and token exchanges 120. The platform/application services layer 110 may further comprise configuration management features 122. The configuration management features 122 may include an exemplary portal 124, an incentives management system 126, and a license manager 128. The platform/application services layer 110 may further comprise accounting and transaction services 130, such as a change management framework 132, a token framework 469, an incentives disbursement framework 136, a lending framework 138, and an exemplary wallet 140. The platform/application services layer 110 may further comprise data management and analytics services 142, such as analytics and reporting systems 144, an incentives bidding system 146, a loan matching system 148, a recommendation system 150, and an advertisement and promotions system 152. The platform/application services layer 110 may function on an infrastructure layer 154 that may comprise one or more of blockchain networks 156, decentralized storage platforms 158, decentralized messaging platforms 160, or cloud infrastructure 162, such as cloud computational resources, cloud storage resources, or cloud networking resources.

Figure 2:
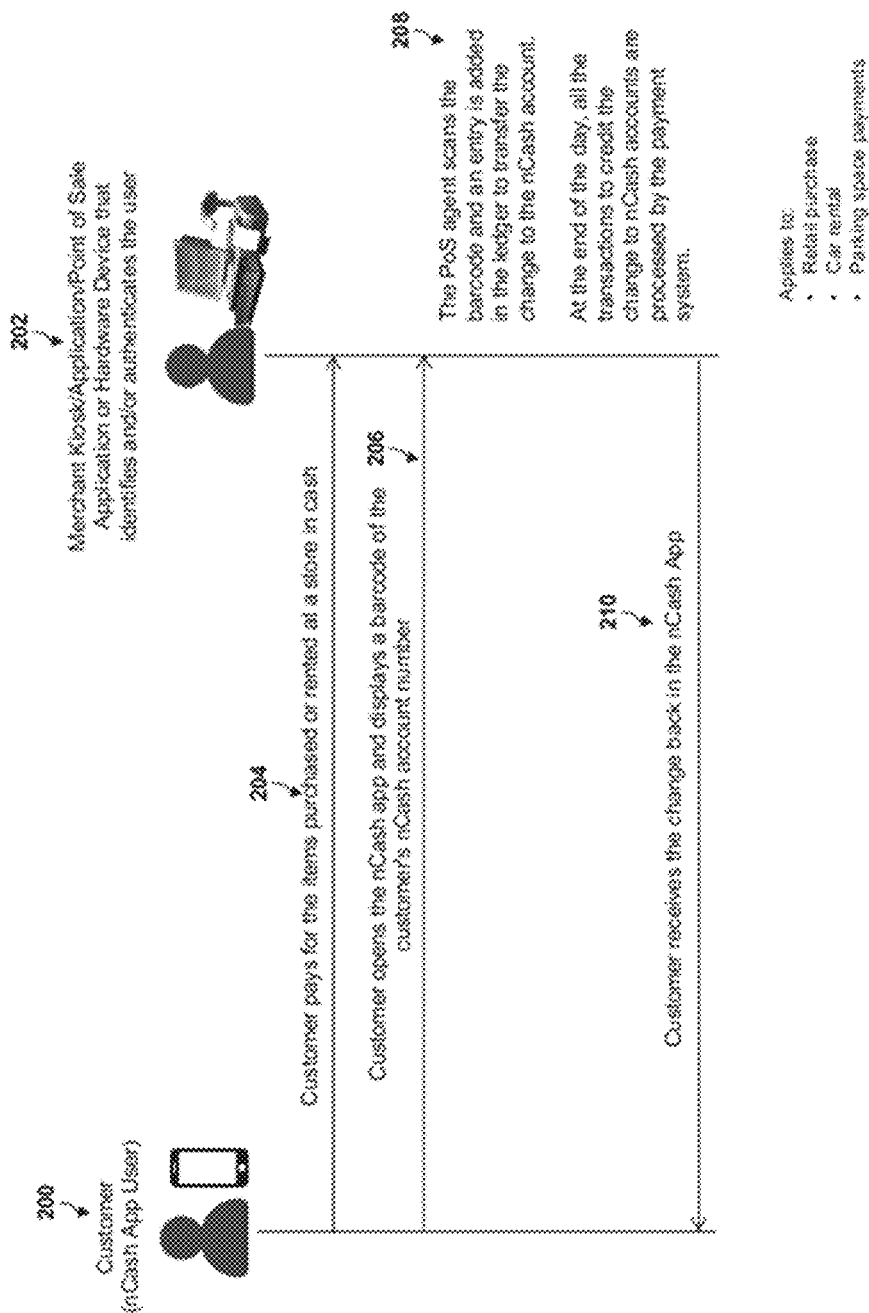
FIG. 2 is an illustration of a process for retail payments where a customer pays in cash at a merchant kiosk/application/point of sale application or hardware device that is aware of the platform, and instead of receiving loose change back receives digital tokens in the mobile application wallet, according to an embodiment of the invention.

Referring now to FIG. 2 a process flow for retail payments where a customer pays in cash and instead of receiving loose change back, receives the change as digital tokens (exemplary coins—"NCC") in the exemplary mobile application, is described in more detail. Customer 200 pays for the items purchased or rented at a store in cash at step 204. Customer 200 opens the exemplary app and displays a barcode of the customer's exemplary account number at step 206. The merchant kiosk/application/point of sale application or hardware device that is aware of the exemplary platform 202 scans the barcode and an entry is added in the ledger to transfer the change to the exemplary account at step 208. At some periodic interval, for example, at the end of the day, all the transactions to credit the change to exemplary accounts are processed by the payment system. Customer 200 receives the change back in the exemplary App at step 210.

Figure 3:
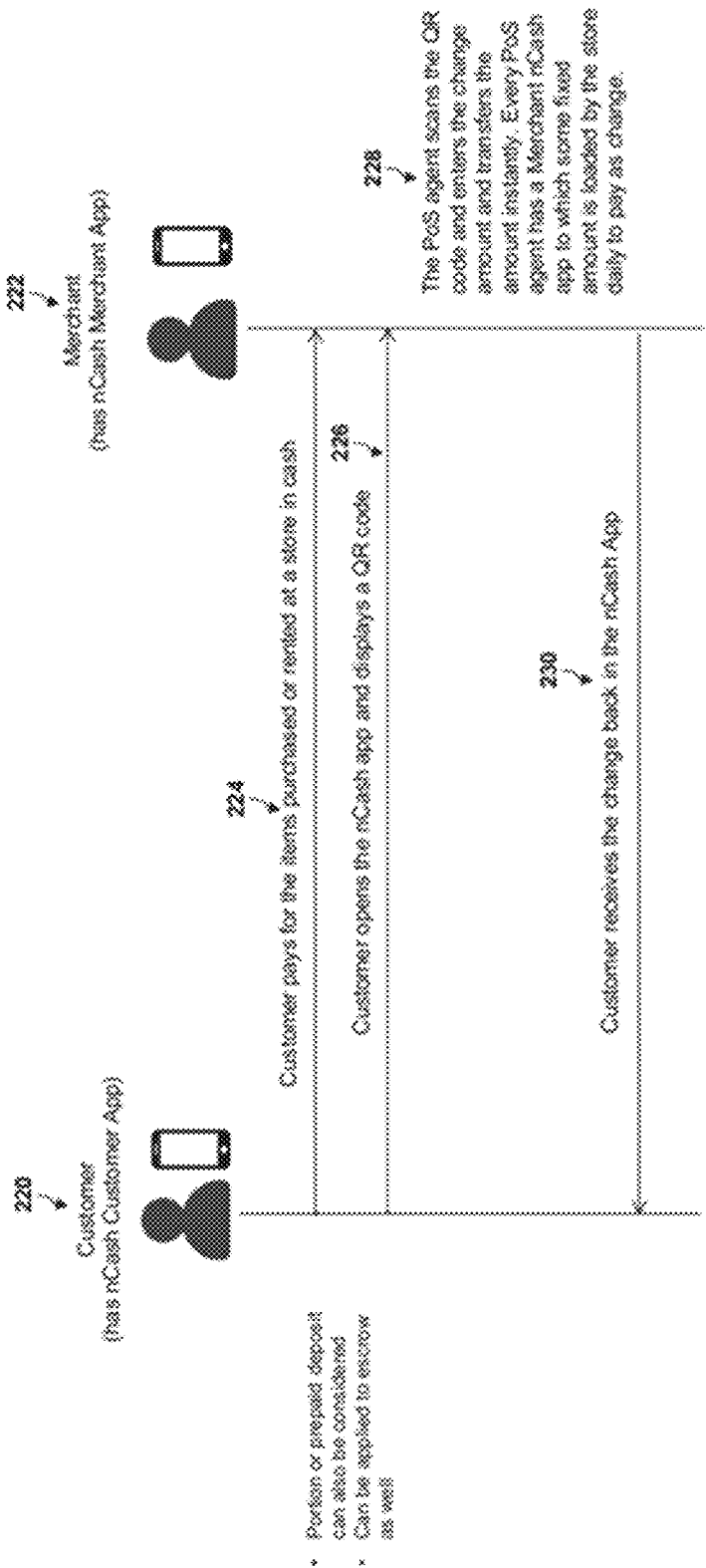
FIG. 3 is an illustration of a process for retail payments where a customer pays in cash and instead of receiving loose change back receives digital tokens from a merchant account in the mobile application, according to an embodiment of the invention.

Referring now to FIG. 3 a process flow for retail payments where a customer pays in cash and instead of receiving loose change back receives digital tokens from a merchant account in the exemplary mobile application, is described in more detail. Customer 220 pays for the items purchased or rented at a store in cash at step 224. Customer 220 opens the exemplary app and displays a QR code at step 226. The merchant/PoS agent 222 that has a mobile/tablet device with exemplary mobile application installed scans the QR code and enters the change amount and transfers the amount instantly from the merchant administrator or operator account at step 228. Every PoS agent 222 has a Merchant exemplary app to which some fixed amount is loaded by the store daily to pay as change. Customer 220 receives the change back in the exemplary App at step 230.

Figure 4:
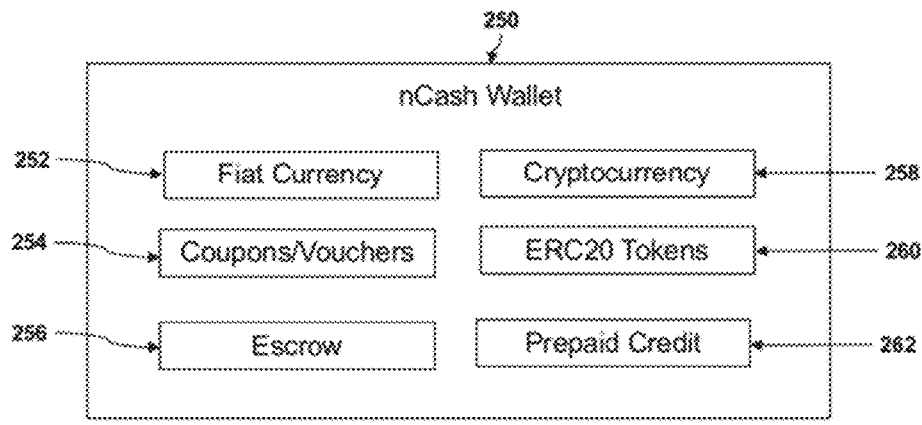
FIG. 4 is an illustration of the components of the mobile application wallet, according to an embodiment of the invention.

Referring now to FIG. 4 components of an exemplary mobile application wallet 250 are described in more detail. The exemplary wallet 250 may comprise a Fiat currency wallet 252, a cryptocurrency wallet 258, a coupons and voucher management system 254, and ERC-20 token wallet 260, Escrow accounts 256, and prepaid credit accounts 262. For making retail payments, a portion or prepaid deposit in fiat or cryptocurrency wallets 252, 258 can be considered. The wallet balance of one or both of the fiat and cryptocurrency wallets 252, 258 may be applied to Escrow 256 as well where the payment sent by a customer to a merchant is held in an Escrow account and released when an order is fulfilled.

Figure 5:
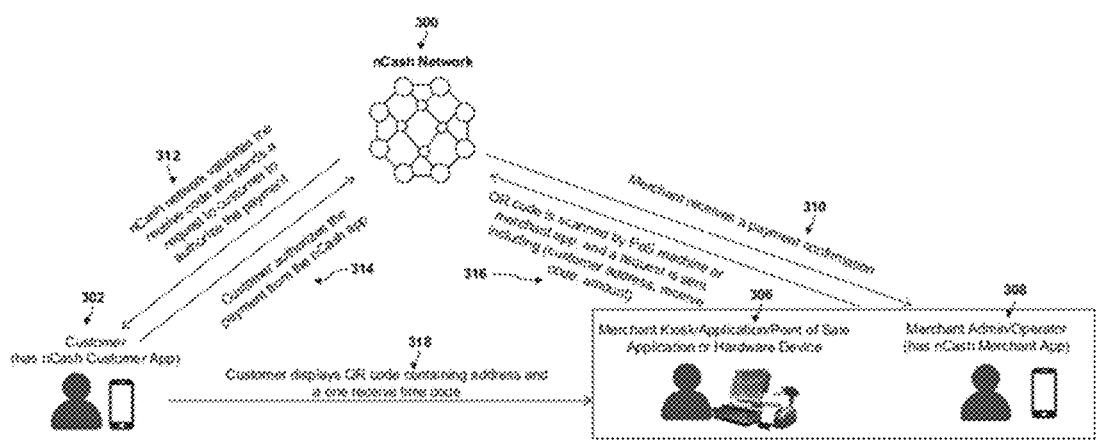
FIG. 5 is an illustration a process for QR-code based payment request and authorization, according to an embodiment of the invention.

Referring now to FIG. 5 a process flow for QR-code based payment request and authorization, is described in more detail. Customer 302 uses exemplary mobile application to display a QR code containing customer's exemplary wallet address and a one-time receive code at step 318. The QR code is scanned by a PoS machine 306 or exemplary app with merchant account 308, and a request is sent including the customer address, the receive code, and the amount to the exemplary network 300 at step 316. The exemplary network 300 validates the receive code and sends a request to customer to authorize the payment at step 312. Customer 302 authorizes the payment from the exemplary app at step 314. A payment confirmation is sent to the PoS machine 306 or exemplary app with merchant account 308, at step 310.

Figure 6:
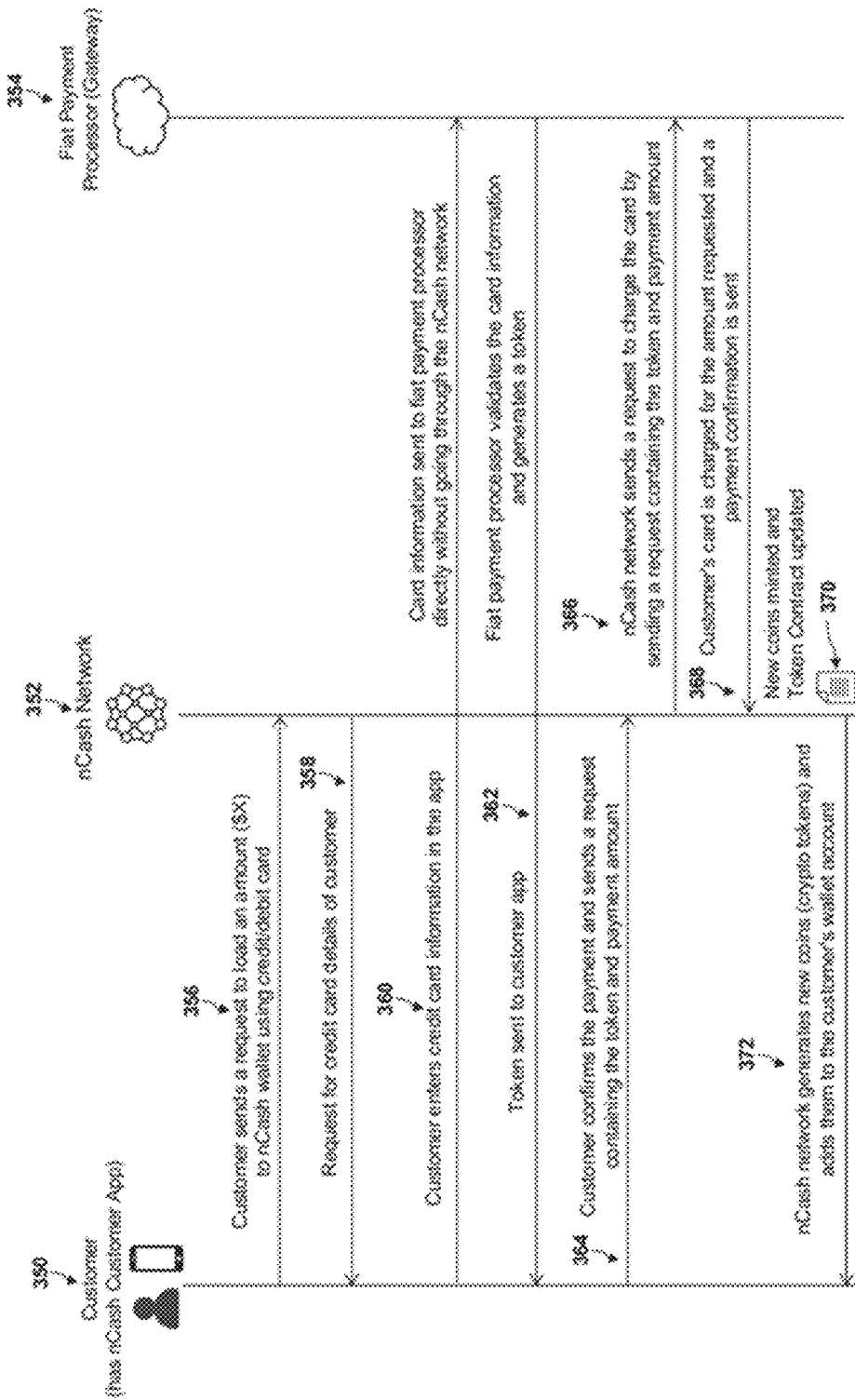
FIG. 6 is an illustration of a process for buying coins with credit or debit card, according to an embodiment of the invention.

Referring now to FIG. 6 a process flow for buying coins with credit or debit card is described in more detail. Customer 350 sends a request to load an amount to exemplary wallet using credit or debit card at step 356. The exemplary network 352 requests for credit or debit card details of customer 350 at step 358. Customer 350 enters credit or debit card information in the exemplary mobile application at step 360. The card information is then sent to the fiat payment processor 354 directly without going through the exemplary network 352 at step 360. The fiat payment processor 354 validates the card information and generates a token which is then sent to customer's exemplary mobile application at step 362. Customer 350 confirms the payment and sends a request containing the card token and payment amount at step 364. The exemplary network 352 sends a request containing the token and the payment amount to charge the card to the fiat payment processor 354 at step 366. The fiat payment processor 354 charges the customer's card for the amount requested and a payment confirmation is sent to the exemplary network 352 at step 368. The exemplary network 352 mints new coins (digital tokens defined in the exemplary Token smart contract) and the token smart contract 370. The exemplary network 352 adds these new coins (digital tokens) the customer's exemplary wallet account at step 372.

Figure 7:
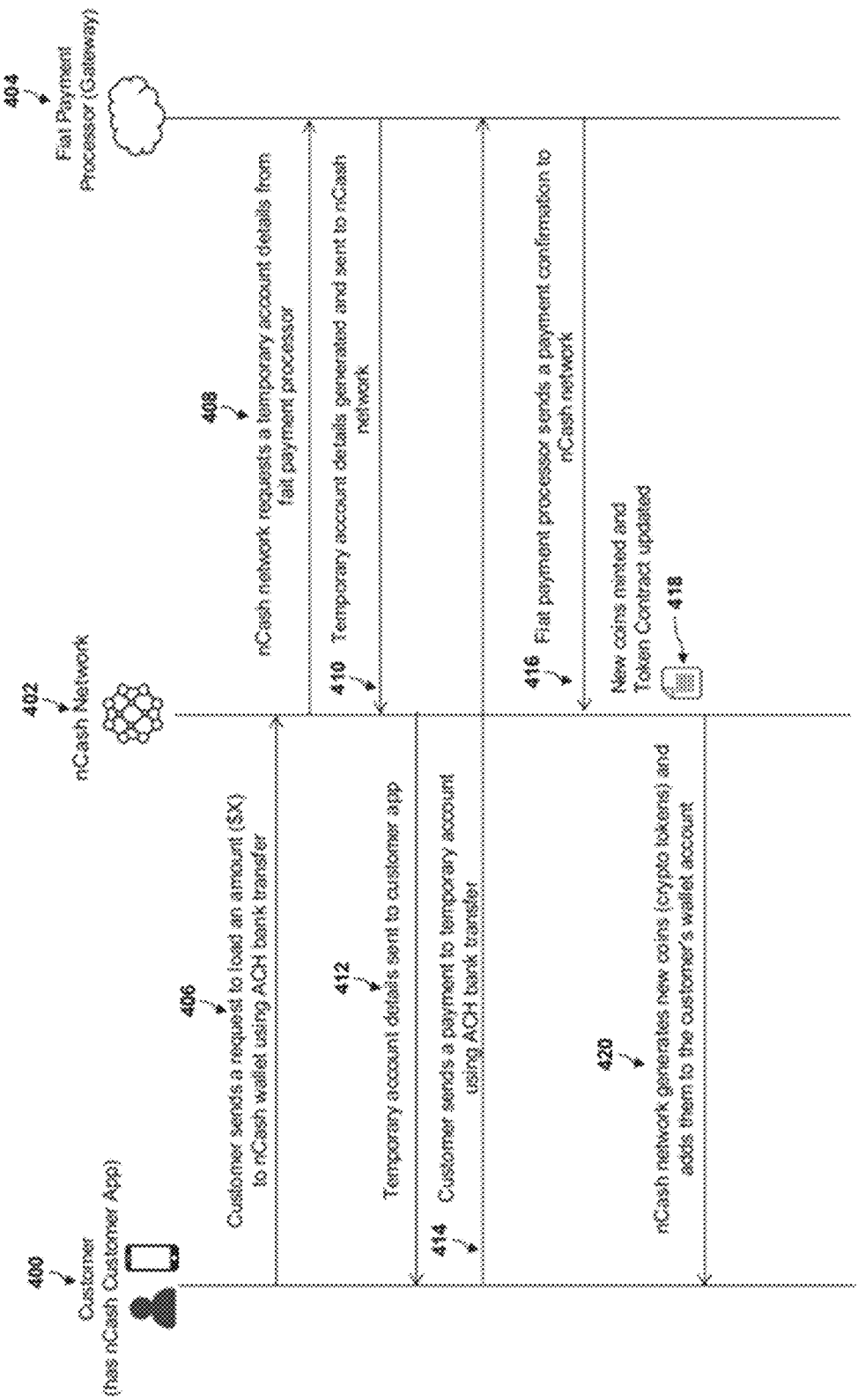
FIG. 7 is an illustration of a process for buying coins with ACH Bank Transfer, according to an embodiment of the invention.

Referring now to FIG. 7 a process flow for buying coins with ACH Bank Transfer is described in more detail. Customer 400 sends a request to an exemplary network 402 to load an amount to exemplary wallet using ACH bank transfer at step 406. The exemplary network 402 requests a temporary account details from a fiat payment processor 404 at step 408. The fiat payment processor 404 generates a temporary account and sends details about the temporary account to the exemplary network 402 at step 410. The exemplary network 402 then sends the temporary account details to the customer's exemplary mobile application. Customer 400 sends a payment to the temporary account using ACH bank transfer at step 414. On receiving the payment, the fiat payment processor 404 sends a payment confirmation to exemplary network 402 at step 416. The exemplary network 402 mints new coins (digital tokens defined in the exemplary Token smart contract) and the token smart contract 418. The exemplary network 402 adds these new coins (digital tokens) the customer's exemplary wallet account at step 420.

Figure 8:
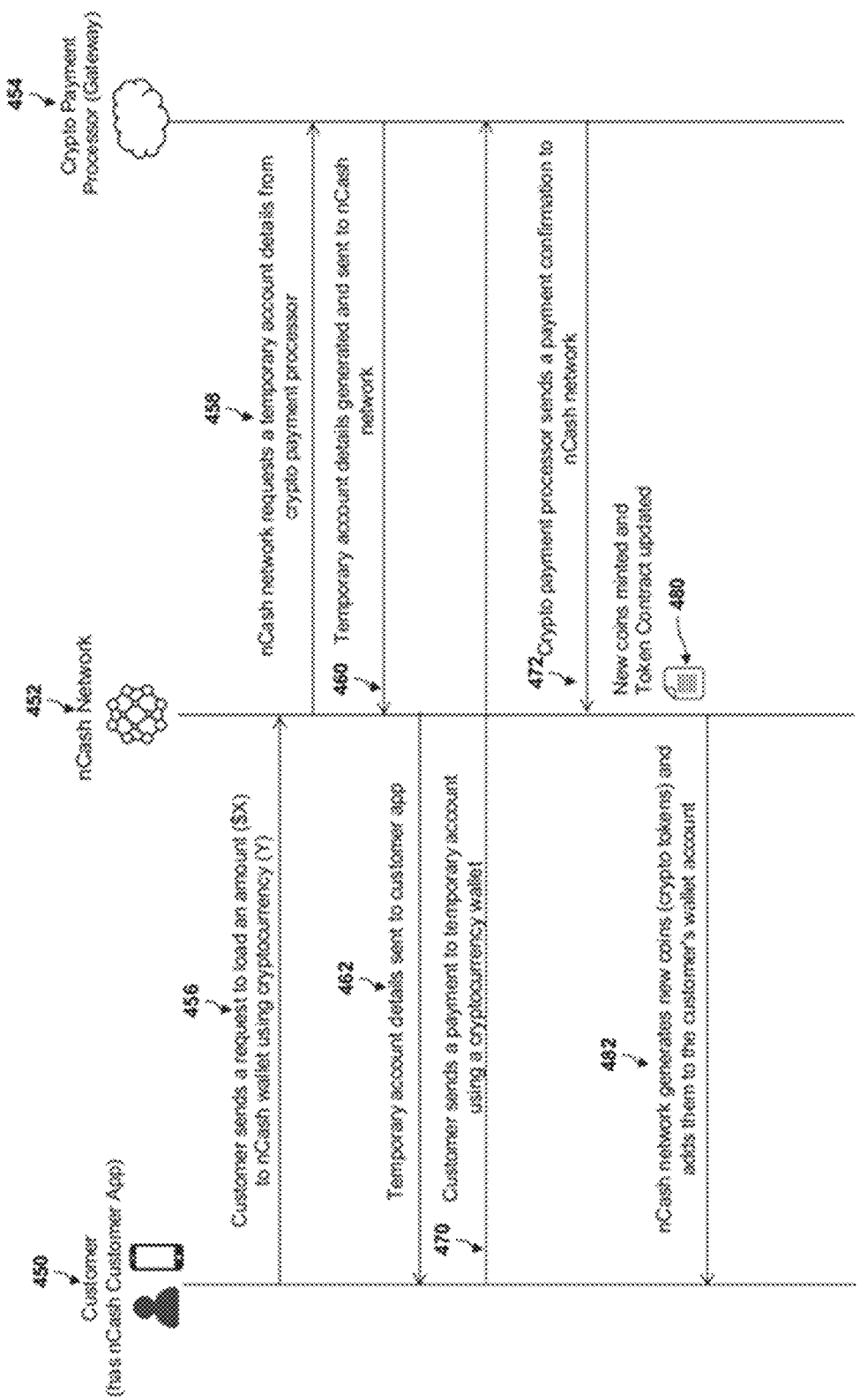
FIG. 8 is an illustration of a process for buying coins with Cryptocurrencies, according to an embodiment of the invention.

Referring now to FIG. 8 a process flow for buying coins with Cryptocurrencies is described in more detail. Customer 450 sends a request to an exemplary network 452 to load an amount to exemplary wallet using cryptocurrency at step 456. The exemplary network 452 requests a temporary account details from a crypto payment processor 454 at step 458. The crypto payment processor 454 generates temporary account and sends them to the exemplary network 452 at step 460. The exemplary network 452 then sends the temporary account details to the customer's exemplary mobile application at step 462. Customer 450 sends a payment to the temporary account using a cryptocurrency wallet at step 470. On receiving the payment, the crypto payment processor 454 sends a payment confirmation to exemplary network 452 at step 472. The exemplary network 452 mints new coins (digital tokens defined in the exemplary Token smart contract) and the token smart contract 480. The exemplary network 452 adds these new coins (digital tokens) the customer's exemplary wallet account at step 482.

Figure 9:
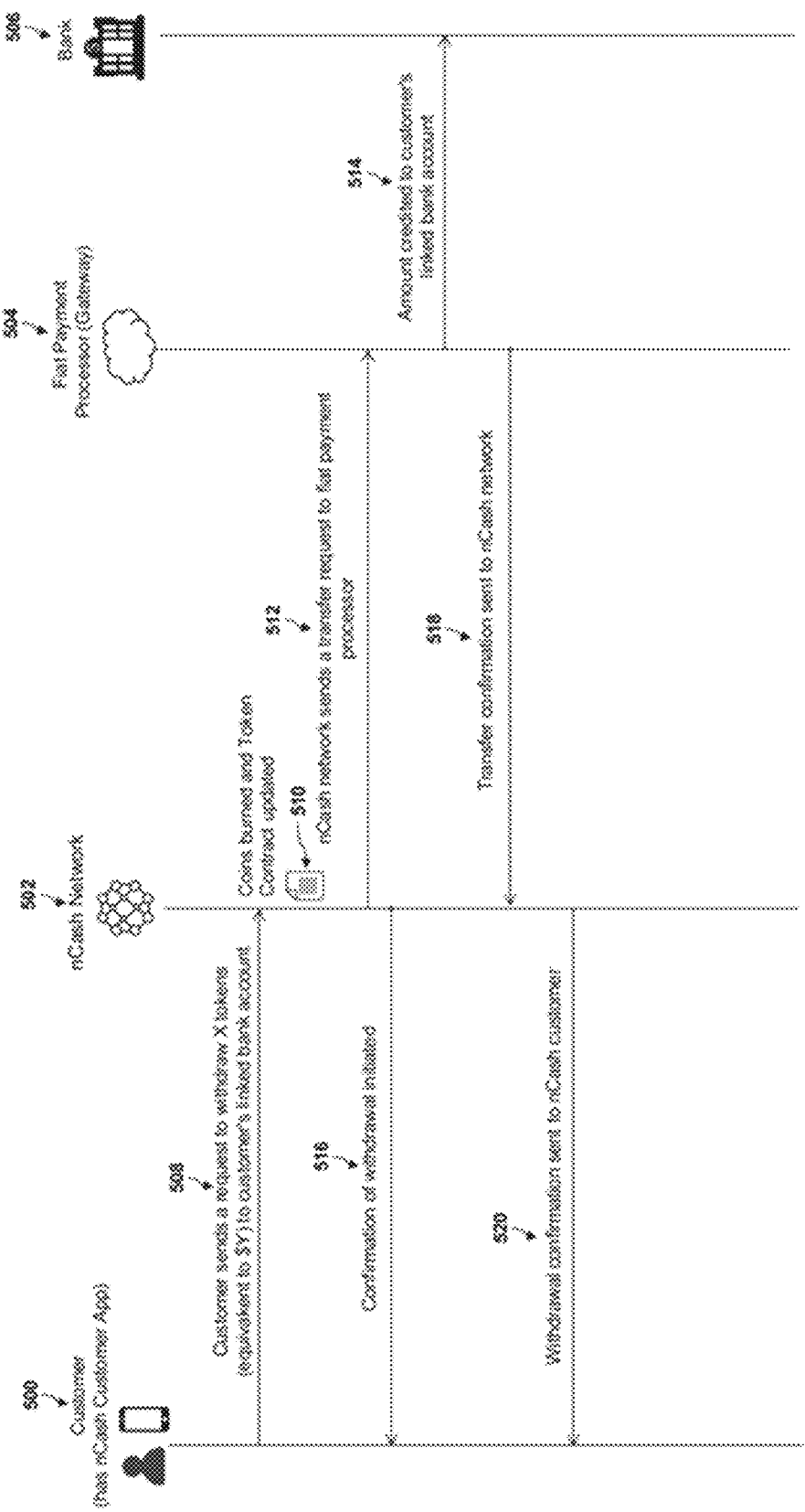
FIG. 9 is an illustration a process for withdrawing coins to a linked bank account, according to an embodiment of the invention.

Referring now to FIG. 9 a process flow for withdrawing coins to a linked bank account is described in more detail. Customer 500 sends a request to a exemplary network 502 to withdraw a certain amount of tokens to customer's linked bank account in a bank 506 at step 508. On receiving the withdrawal request the exemplary network 502 burns coins equivalent to the withdrawal amount from the customer's account and updates the token smart contract 510. The exemplary network 502 then sends a transfer request to the fiat payment processor 504 at step 512. The withdrawal amount is credited by the fiat payment processor 504 to the customer's linked bank account at the bank 506 at step 514. The fiat payment processor 504 then sends a transfer confirmation to exemplary network 502 at step 518. A withdrawal confirmation is then sent to customer 500 at step 520.

Figure 10:
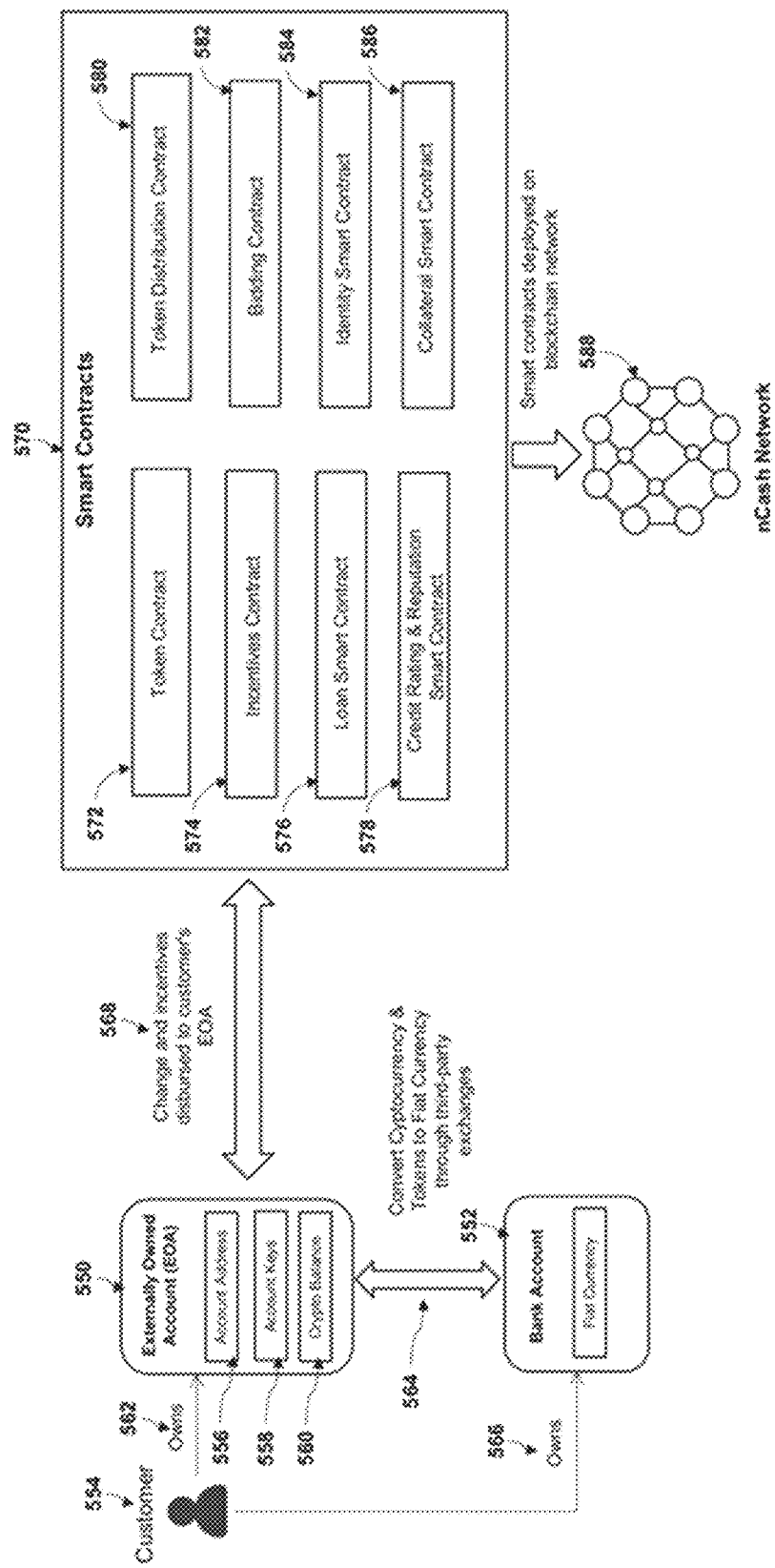
FIG. 10 is an illustration of the smart contracts involved in the exemplary retail payments, loyalty rewards and peer-to-peer lending platform, according to an embodiment of the invention.

Referring now to FIG. 10 examples of smart contracts involved in the exemplary retail payments, loyalty rewards, and peer-to-peer lending platform are described in more detail. The exemplary blockchain network 588 is a distributed ledger which maintains records of all the transactions on the exemplary network. Users 554 interact and transact with the blockchain network 588 through Externally Owned Account (EOAs) 550, which are owned and controlled by the users. Each EOA 550 has an account address 556, account public-private keys 558 and a balance 560 (in certain units of a Cryptocurrency associated with the Blockchain network) associated with it. EOAs do not have any associated code. EOAs may interact 564 with bank accounts 552 also owned 566 by the user 554 via third party exchanges operable to exchange cryptocurrencies for fiat currency, which may be deposited in or withdrawn from the bank account 552.

All transactions on a blockchain network are initiated by EOAs. These accounts can send transactions to other EOAs or contract accounts. Another type of accounts support by second generation programmable Blockchain platforms are the Contract Accounts. Smart contracts 570 contain the contract code which control the associated contract accounts. The smart contracts 570 are deployed on the blockchain network 588. The smart contracts 570 involved in the exemplary network are as follows:

- Token Contract 572: Token Contract provides the exemplary token definition including token name, symbol, decimal places, token supply, method for token transfer, and method for checking token balance of an account.
- Token Distribution Contract 580: Token Distribution Contract defines the token distribution and pricing model and contains methods for purchasing and claiming tokens, and methods for withdrawing token sale proceeds.
- Incentives Contract 574: Incentives Contract defines the incentives and triggers and methods for distributing incentives.
- Bidding Contract 582: Bidding Contract defines the bidding mechanism for allowing merchants to compete, bid, or pay for the right to add incentives.
- Loan Smart Contract 576: Loan Smart Contract is used to enforce loan terms, manage release, repayment or extension of loans.
- Identity Smart Contract 584: Identity Smart Contract is used to link blockchain accounts to real users (borrowers or lenders).
- Credit Rating & Reputation Smart Contract 578: Credit Rating & Reputation Smart Contract is Used to track credit scores and reputation of borrowers.
- Collateral Smart Contract 586: Collateral Smart Contract is used to manage locking up and release of collateral, such as cryptocurrency tokens or physical assets which may be represented in a tokenized form.

Figure 11:
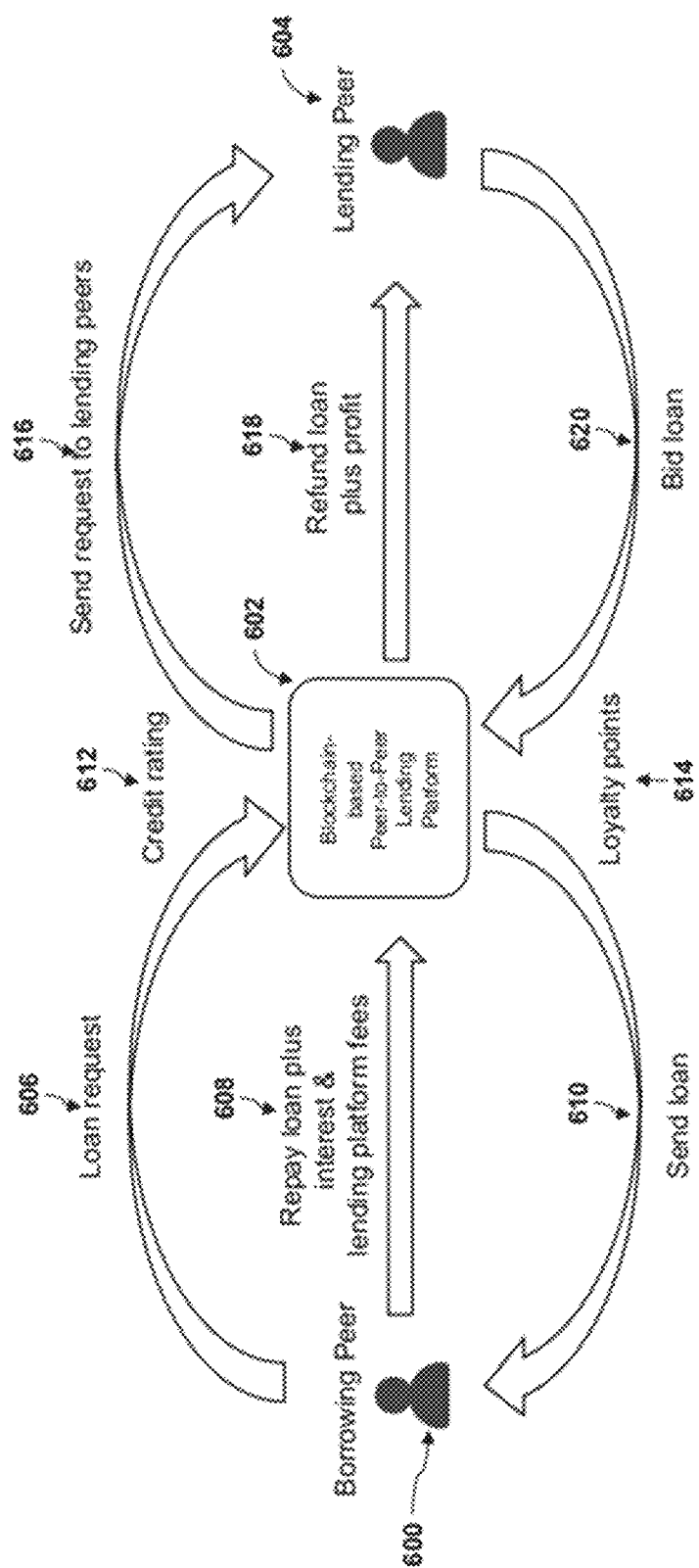
FIG. 11 is an illustration of a process for peer-to-peer lending, according to an embodiment of the invention.

Referring now to FIG. 11 a process flow for peer-to-peer lending is described in more detail. A borrowing peer (borrower) 600 creates a first transaction smart contract in the form of a loan request at step 606. The lending platform 602 advertises the loan requests to the lending peers (lenders) 604 at step 616. The lending platform 602 may acquire a credit rating 612 associated with the borrowing peer 600 and include the credit rating with the request. The lending peers 604 bid for loans by sending second transaction smart contracts in the form of loan offers to the lending platform 602 at step 620. The borrowing peer 600 selects the best offer and the loan amount is sent to the borrowing peer at step 610. The borrowing peer 600 repays the loan amount plus the interest and lending platform fees to the lending platform 602 at step 608. The lending platform 602 returns the loan amount plus the profit to the lending peer 604 at step 618. The lending platform 602 may issue loyalty points 614 to borrowing peers 600 and lending peers 604 upon successful repayment of loans, to incentivize the borrowing and lending peers 600, 604 to use the lending platform again for borrowing and lending.

Figure 12:
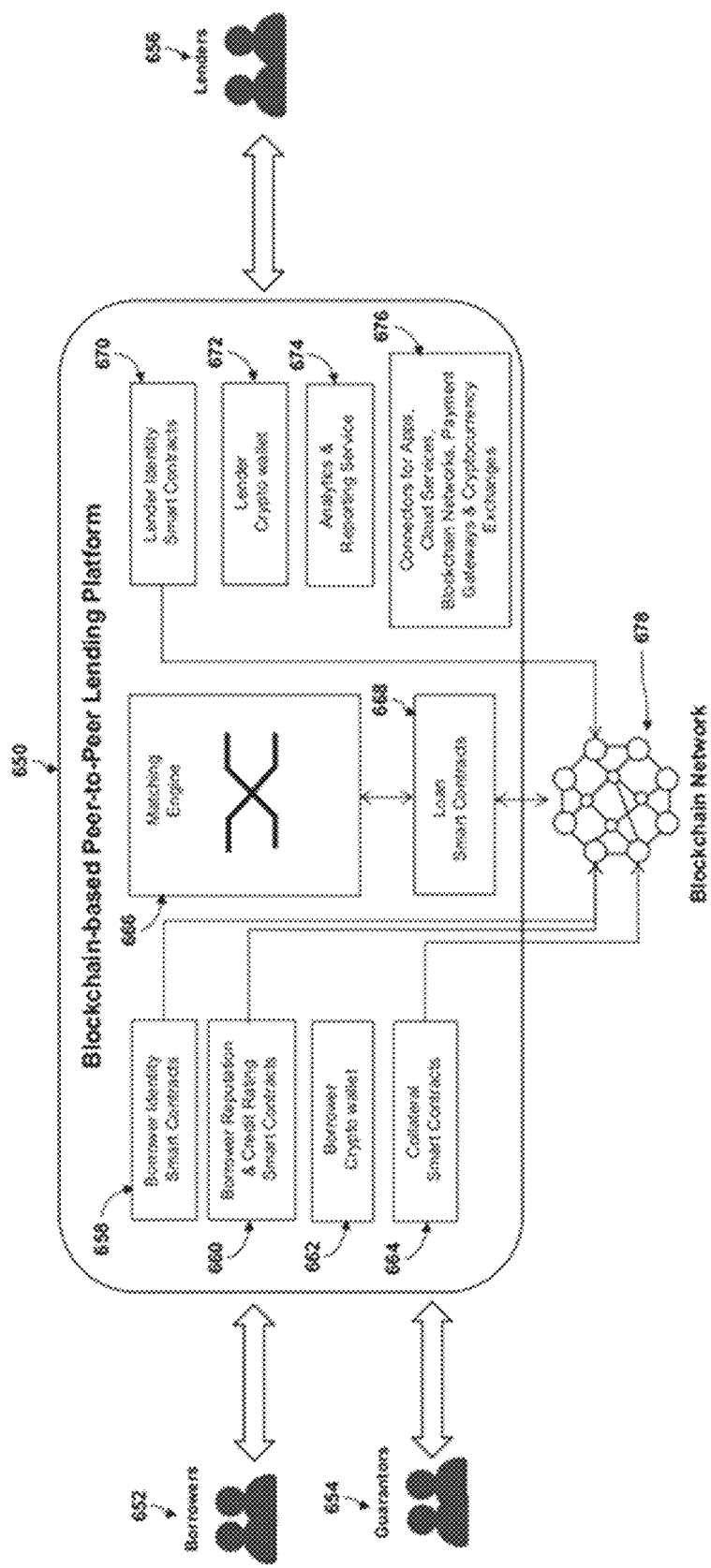
FIG. 12 is a schematic diagram of the blockchain-based peer-to-peer lending system, according to an embodiment of the invention.

Referring now to FIG. 12 a schematic diagram of the blockchain-based peer-to-peer lending system is described in more detail. The blockchain-based peer-to-peer lending system allows borrowing peers or borrowers 652 to send loan requests to a platform 650 which are advertised to lending peers or lenders 656. Lenders 656 can bid to send a loan at a particular rate and terms that is enforced by a loan smart contract 668 deployed on a blockchain network 678. The lending platform 650 can co-exist with an electronic payments platform. A Borrowers 652 post loan requests to the platform and rates they can pay and lenders bid for loans with terms and rates. Platform 650 allows borrowers 652 to automatically repay loans from their exemplary mobile application wallets (Borrower Crypto wallet) 662 or extend loan for another term if agreed to. Platform 650 can disburse loans in fiat or crypto currencies. When a loan is disbursed, the loan amount is transferred from the Lender Crypto wallet 672 (exemplary mobile application wallet of the lender) to the Borrower Crypto wallet 662 (exemplary mobile application wallet of the borrower). The interest rate is driven by the market. Higher risk means larger rate. Platform 650 may charge a percentage of the interest rate on every transaction. Borrower Identity Smart Contracts 658 comprised by the platform 650 maintain the identity information of the borrowers 652. Lender Identity Smart Contracts 670 comprised by the platform 650 maintain the identity information of the lenders 656. Borrower Reputation and Credit Rating Smart Contracts 660 comprised by the platform 650 maintain the reputation information of the borrowers 652 and their credit ratings. Collateral Smart Contracts 664 comprised by the platform 650 maintain collateral information for the loans. A reputation system and collaterals for loans makes the lending process more reliable. The lending platform 650 uses smart contracts to create a credit rating and reputation system for borrowers. Each repayment and successful loan adds points to the borrower's credit rating and if a loan is not repaid then points are deducted from the borrower's credit rating. Such payments may be transferred to a cryptocurrency wallet 672 for the lender 656. If a borrower 652 requesting a loan does not repay as per conditions their credit rating/reputation drops and lenders 656 will charge extremely high rates and higher guarantees for any subsequent loan requests. The amount of loans could be against a collateral account by the borrower 652 or having pledges from guarantor 654 or other peers that they will guarantee a certain portion of loan. The risk score gets lower of a borrower has pledges to support him. If risk score suddenly changes existing lenders get an alert that they can opt for a higher rate or a shorter repayment term. This forces the borrower to borrow wisely to protect against these margin calls. Loans issued through the platform 650 may be secured (backed by collateral) or unsecured. A Matching Engine 666 of the platform 650 matches loan requests to loan offers and connects the borrowers to lenders. The platform matches borrowers to lenders by risk reputation, loan value and interest terms. For secured loans, borrowers 652 or their guarantors 654 may present collateral in the form of Cryptocurrency Tokens or Tokenized Assets. When Cryptocurrency Tokens are presented as collateral such tokens are transferred by the borrower to a collateral contract where the tokens are held until the loan is not repaid. When the loan is repaid, the tokens are released to the borrower 652. If the loan in not repaid, the tokens are released to the lender 656. Physical assets (such as gold, diamonds, real-estate property) may be tokenized and presented as a collateral. For such cases, a third party may be engaged to verify the physical assets or keep the assets in their possession till the loan is repaid. The lending platform 602 may issue loyalty points 614 to borrowing peers 600 and lending peers 604 upon successful repayment of loans, to incentivize the borrowing and lending peers 600, 604 to use the lending platform again for borrowing and lending.

Figure 13:
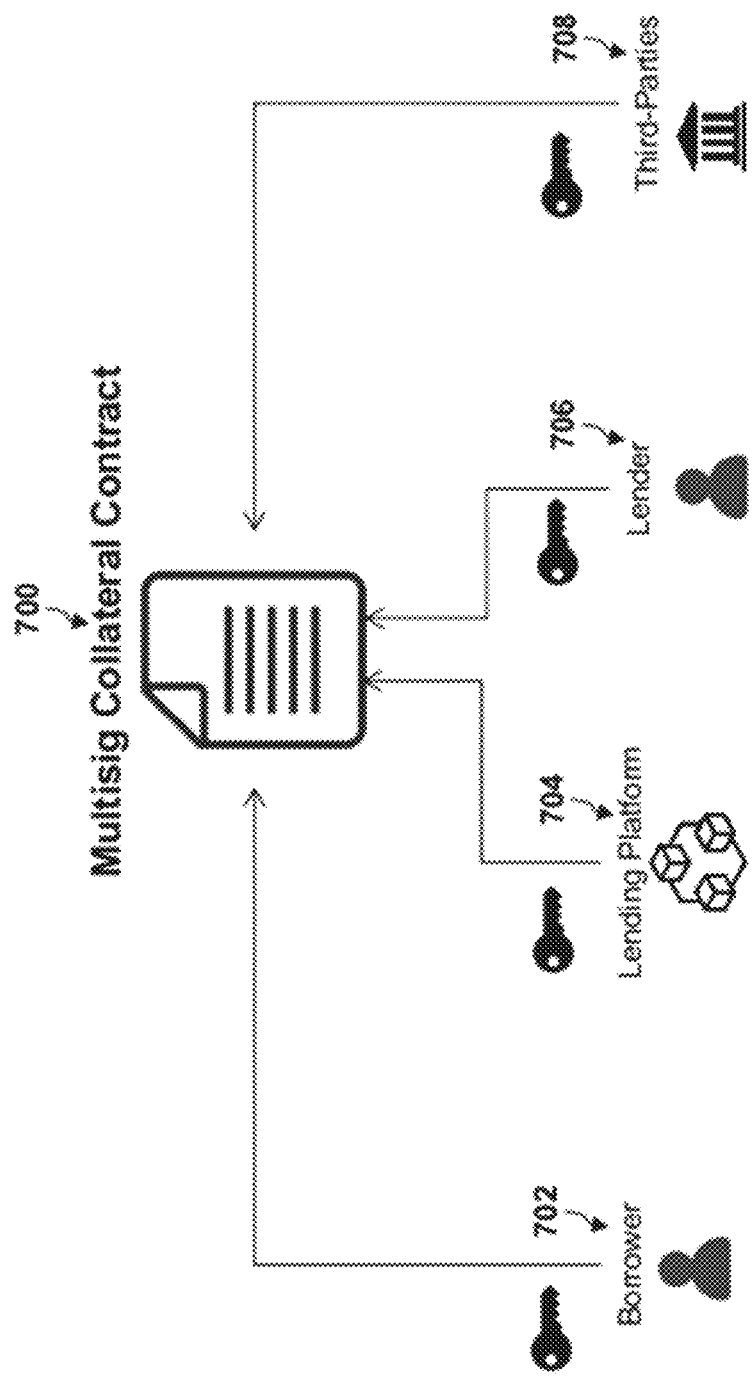
FIG. 13 is an illustration the multi-signature collateral contract used by the peer-to-peer lending system, according to an embodiment of the invention.

Referring now to FIG. 13 the multi-signature collateral contract used by the peer-to-peer lending system shown in FIG. 12 is described in more detail. Collateral tokens are stored in a multi-signature wallet contract 700. Borrower 702, Lender 706, Lending Platform 704 and optional third-parties 708 hold keys to the multisig wallet contract 700. The contract requires M-of-N signatures, typically a majority, (e.g. 2-of-3 or 3-of-5) to release collateral.

Figure 14:
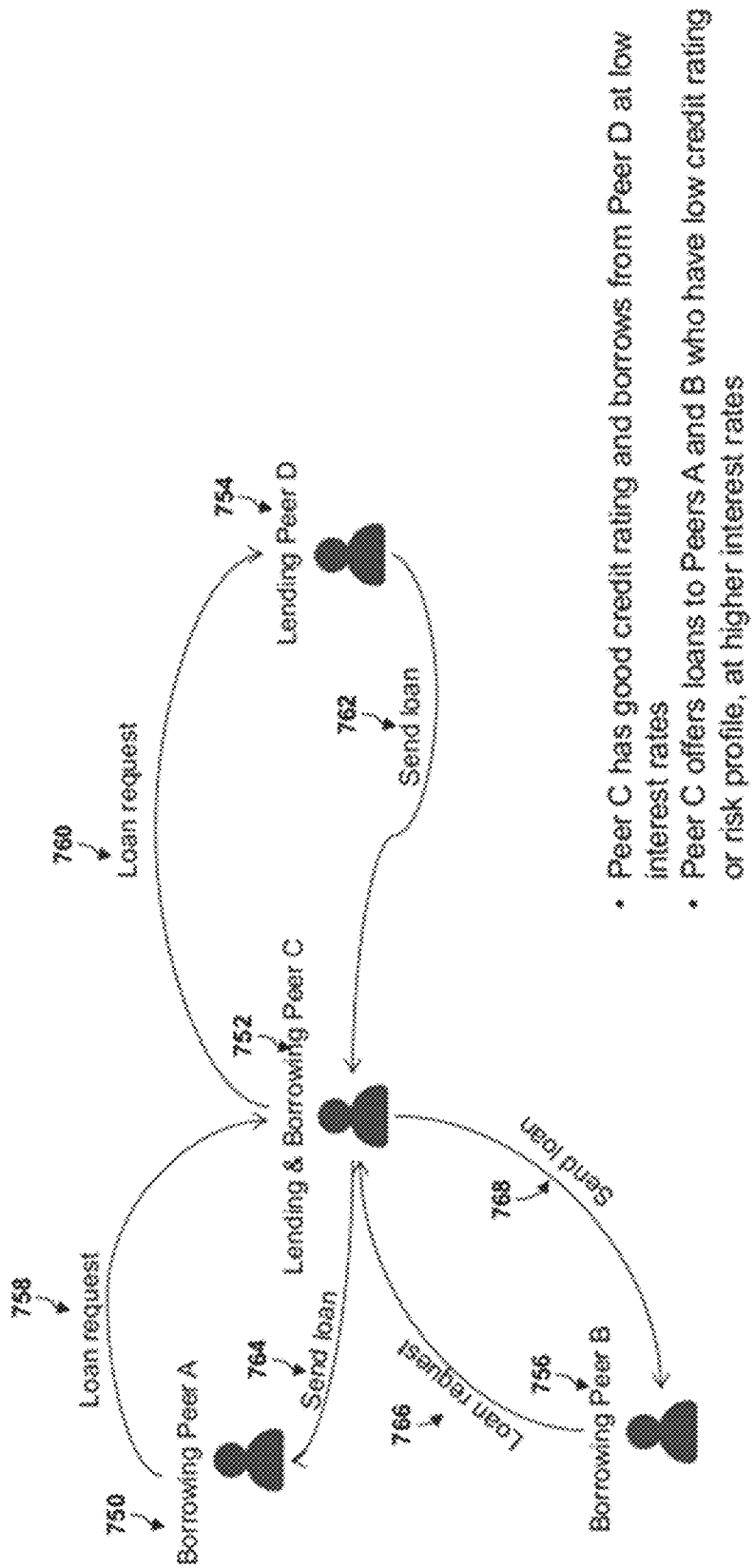
FIG. 14 is an illustration of a process for chaining of loans, according to an embodiment of the invention.

Referring now to FIG. 14 a process flow for the chaining of loans is described in more detail. The lending platform supports chaining loans where a borrowing/lending peer who has a good credit rating can borrow at low interest rates and lend to one or more peers who have low credit rating at higher interest rates. For example, Peer C 752 has good credit rating and sends a loan request 760 and borrows 762 from Peer D 754 at low interest rates. Peer C 752 receives loan requests 758, 766 from Peers A and B 750, 756 who have low credit rating or risk profile, and then send loans 764, 768 to Peers A and B 750, 756, respectively, at higher interest rates. A loan can be partitioned into subloans with different terms. Lenders can fund a portion or fraction of a loan request. Thus a loan could be satisfied with a dozen microloans each at different rates. For example, once a big lender jumps in for 30% of loan, small lenders can jump in to lend at a lower interest rate. A borrower with low risk can float a loan but open only 25% for bid to a high value lenders (such as institutions or banks). The borrower may then open up the loan to the smaller lenders who know the high value lenders will have vetted this borrower. Lending peers can buy a bundle of loans at a particular risk for a price or resell loans. The lending platform allows creating a market for users to buy, pool and resell loans. The lending platform may allow a loan to be written off if certain conditions may be met. For example, if a philanthropist funds a clinic and they treat five hundred patients in a month, then their loans can get a reduced rate, or if a farmer creates two jobs his loan may be forgiven.

Figure 15:
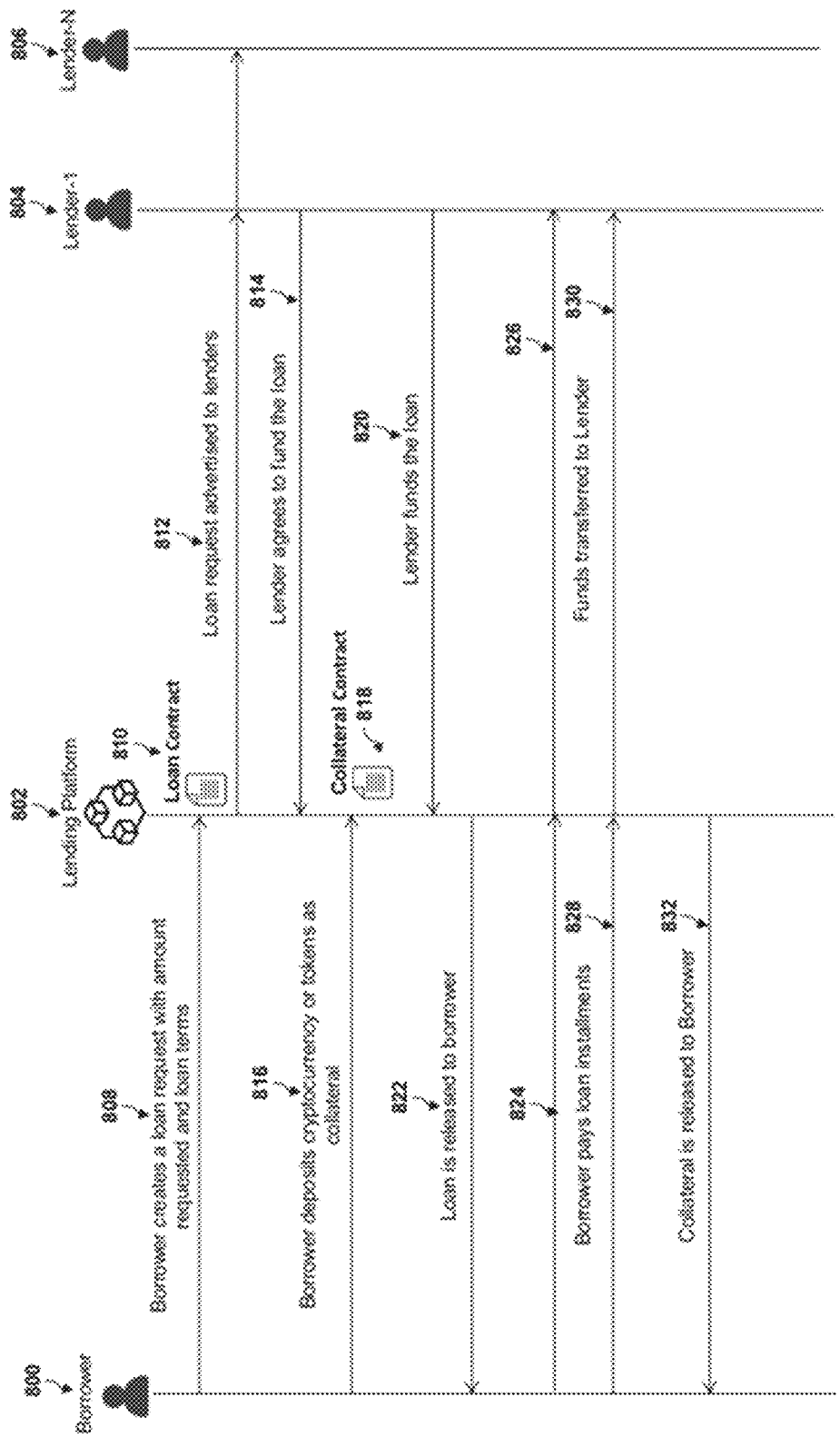
FIG. 15 is an illustration of a process for lending with cryptocurrency or tokens as collateral where the borrower successfully repays the loan, according to an embodiment of the invention.

Referring now to FIG. 15 a process for lending with cryptocurrency or tokens as collateral where the borrower successfully repays the loan is described in more detail. A Borrower 800 creates a loan request with amount requested and loan terms at step 808. The lending platform 802 creates a loan contract 810 and advertises the loan request to lenders at step 812. A Lender 804 agrees to fund the loan at step 814. Next, the Borrower 800 deposits cryptocurrency or tokens as collateral in a collateral contract 818 at step 816. The Lender 804 funds the loan at step 820. The loan amount is released to the Borrower 800 at step 822. The Borrower 800 pays loan installments to the Lending Platform 802 at steps 824 and 828 which are released to the Lender 804 at steps 826 and 830. When the loan repayment is complete, the Collateral is released to the Borrower 800 at step 832, such release being recorded to the collateral contract 818.

Figure 16:
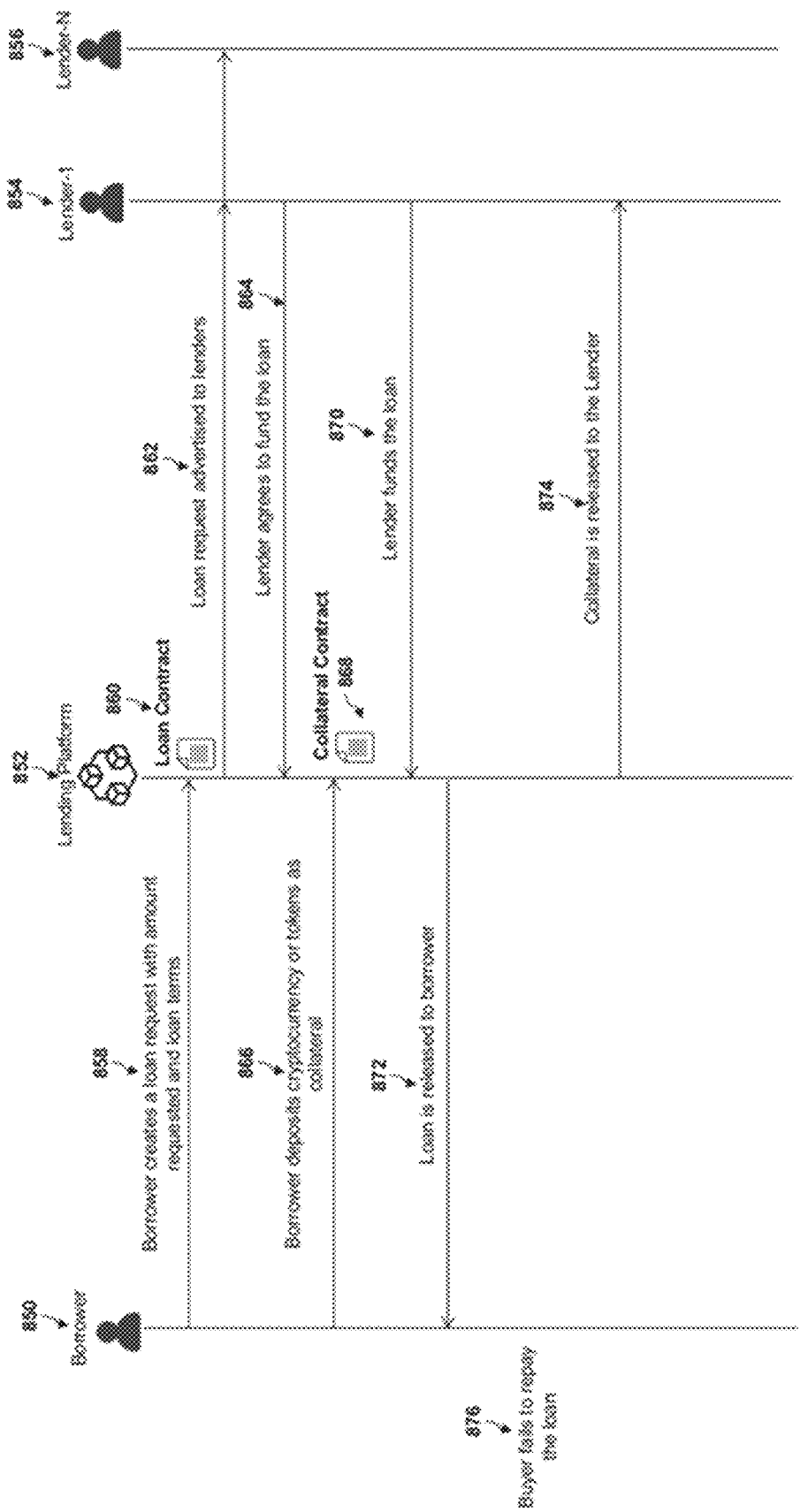
FIG. 16 is an illustration of a process for lending with cryptocurrency or tokens as collateral where the borrower fails to repay the loan, according to an embodiment of the invention.

Referring now to FIG. 16 a process for lending with cryptocurrency or tokens as collateral where the borrower fails to repay the loan, is described in more detail. A Borrower 850 creates a loan request on a lending platform 852 with an amount requested and loan terms at step 858. The lending platform 852 creates a loan contract 860 and advertises the loan request to lenders at step 862. A Lender 854 of N lenders 856 to whom the loan request is advertised agrees to fund the loan at step 864. Next, the Borrower 850 deposits cryptocurrency or tokens as collateral in a collateral contract 868 at step 866. The Lender 854 funds the loan at step 870. The loan amount is released to the borrower at step 872. When the Borrower 850 fails to repay the loan as indicated at step 876, the Collateral is released to the Lender at step 874.

Figure 17:
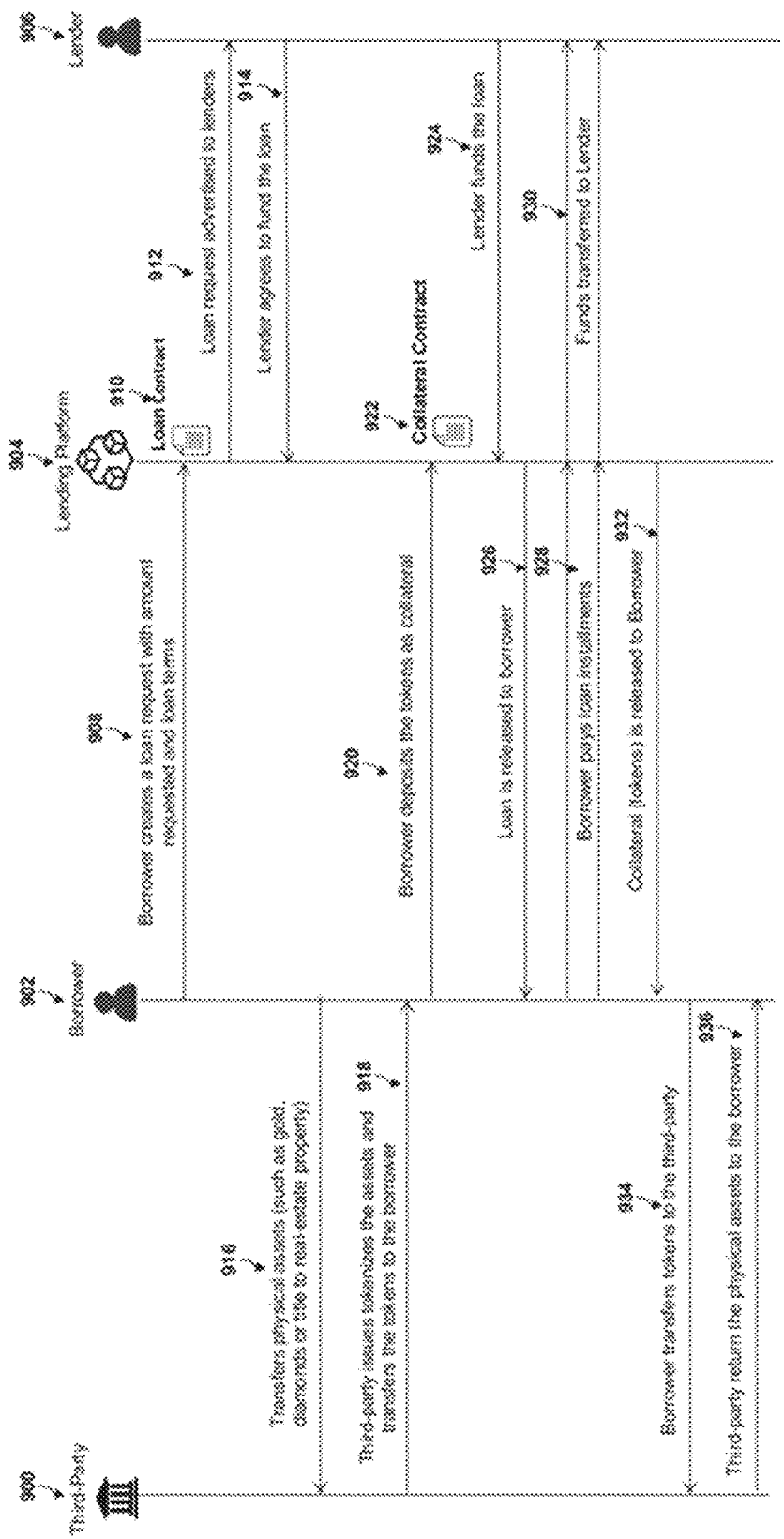
FIG. 17 is an illustration of a process for lending with physical assets as collateral, according to an embodiment of the invention.

Referring now to FIG. 17 a process flow for lending with physical assets as collateral, is described in more detail. A Borrower 902 creates a loan request on a lending platform 904 with an amount requested and loan terms at step 858. The lending platform 904 creates a loan contract 910 and advertises the loan request to lenders at step 912. A Lender 906 agrees to fund the loan at step 914. Next, the Borrower 902 transfers physical assets (such as gold, diamonds or title to real-estate property) to a Third Party 900 at step 916. The Third Party 900 tokenizes the assets and transfers the tokens to the borrower at step 918. The Borrower 902 deposits these tokens as collateral to the lending platform 904 in a Collateral Contract 922 at step 920. The Lender 906 funds the loan at step 924. The loan amount is released to Borrower at step 926. The Borrower repays the loan installment to the lending platform 904 at step 931 and the funds are released to the lender 906 at step 930. When the loan repayment is complete the lending platform 904 releases the Collateral (tokens) is released to the Borrower 902 at step 932. Next, the Borrower 902 transfers tokens to the third-party 900 at step 934. The third-party 900 then returns the physical assets to the Borrower 902 at step 936.

Figure 18:
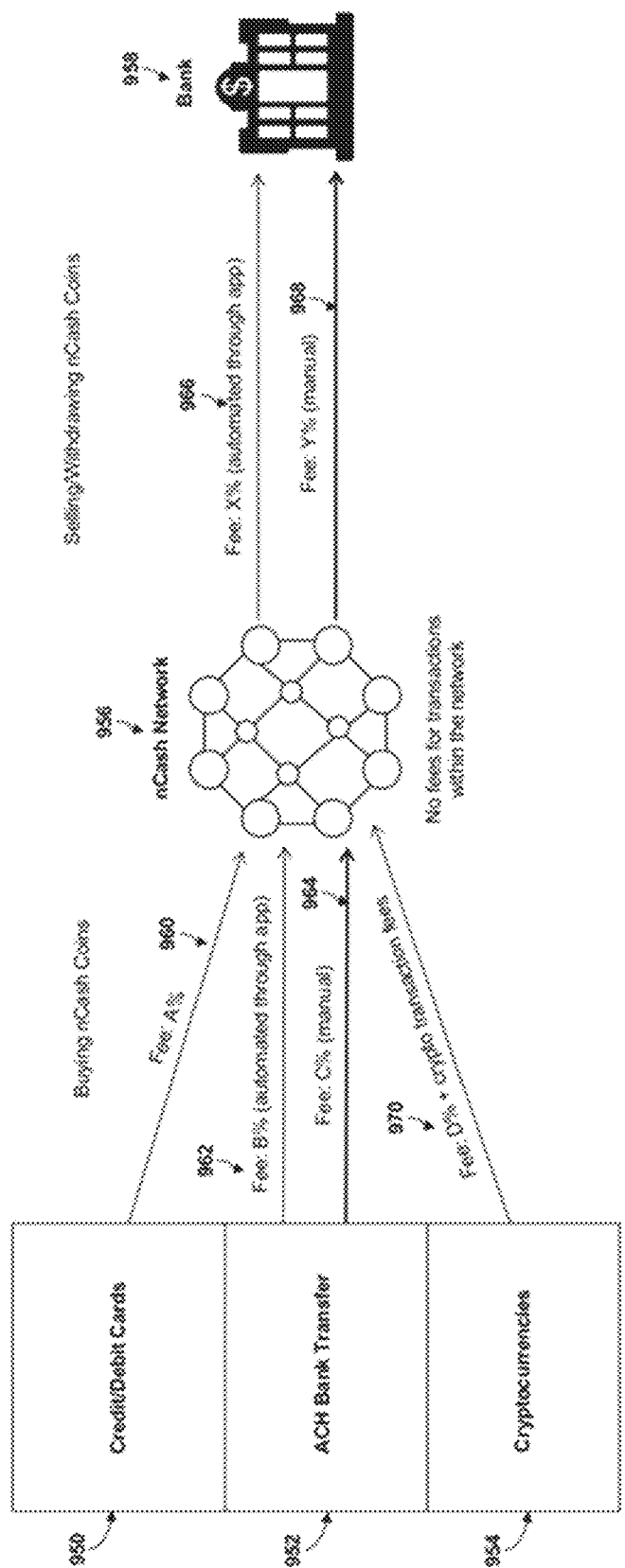
FIG. 18 is an illustration of the transaction fee involved for buying and selling of coins, according to an embodiment of the invention.

Referring now to FIG. 18 transaction fees involved for buying and selling of exemplary coins is described in more detail. exemplary coins can be purchased by paying in a fiat currency (such as USD) using credit/debit card 950 or ACH bank transfer 952, or by paying in a cryptocurrency 954 (such as Bitcoin, Ether). There are different transaction fees for buying coins with credit/debit card 960, ACH bank transfer, whether automated through an app 962 or manually 964, or cryptocurrency 970. For transactions between the exemplary network 956 (such as sending coins to another user or merchant) does not involve any transaction fee. For selling coins and withdrawing coins to a linked bank account 958, a transaction fee. for automated transactions through an app 866 or manual transactions 968. is involved.

Figure 19:
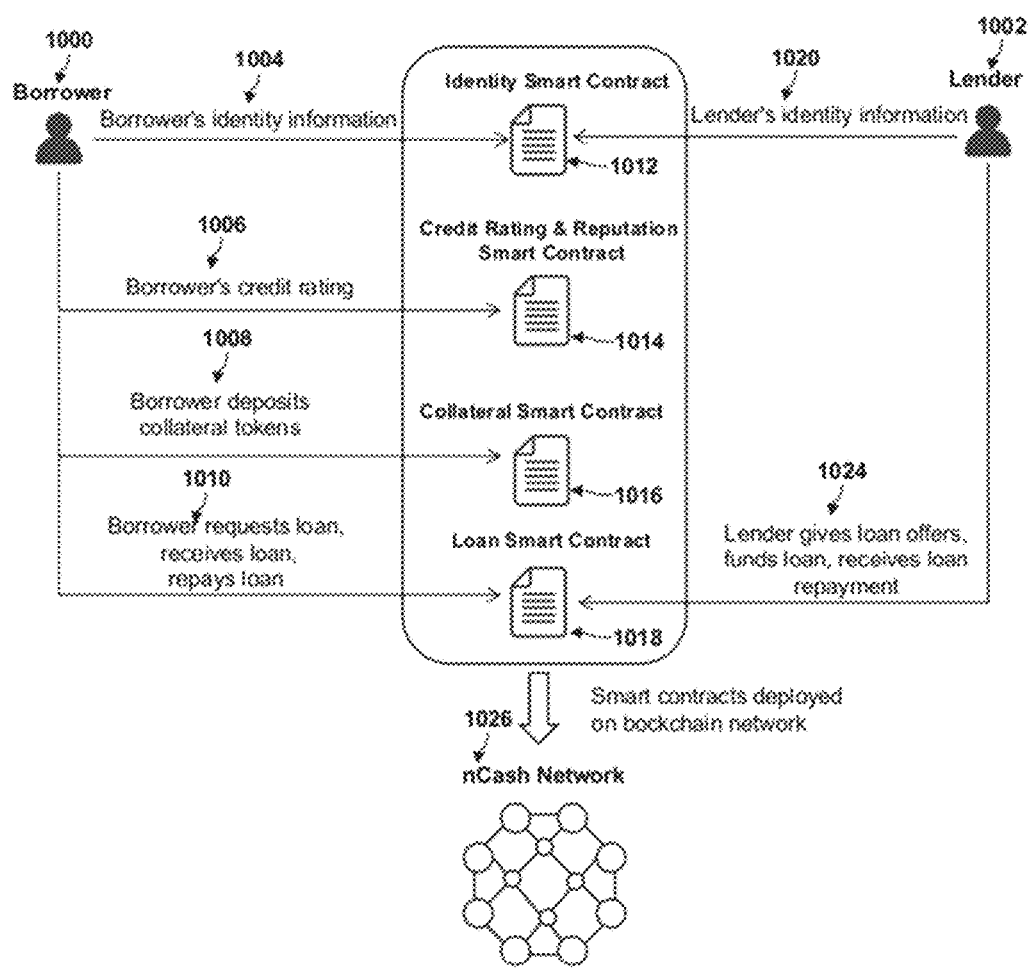
FIG. 19 is an illustration of the smart contracts related to the lending platform and the interactions of borrowers and lenders with the smart contracts, according to an embodiment of the invention.

Referring now to FIG. 19 an illustration of smart contracts related to the lending platform and the interactions of borrowers and lenders with the smart contracts is described in more detail. An Identity Smart Contract 1012 is used to link blockchain accounts to real users, such as an account of a borrower 1000 or a lender 1002. The identity information provided by the borrower 1000 at step 1004 is recorded in the identity smart contract 1012 in original or hashed form. Similarly the identity information provided by the lender 1002 at step 1020 is recorded in the identity smart contract 1012 in original or hashed form. A Credit Rating & Reputation Smart Contract 1014 is used to track credit scores and reputation of a borrower 1000. The credit score of the borrower 1000 is recorded at step 1006 and updated on each new loan request, loan repayment or loan default. A Collateral Smart Contract 1016 is used to manage locking up and release of collateral, such as cryptocurrency tokens or physical assets which may be represented in a tokenized form. The borrower 1000 deposits the collateral tokens to the collateral smart contract 1016 at step 1008. A Loan Smart Contract 1018 is used to enforce loan terms and manage release, repayment or extension of loans. The information related to the borrower's 1000 loan requests, loan disbursement received or loan repayment completion is recorded in the loan smart contract 1018. Similarly, the information related to the lender's 1002 loan offers, loan disbursement completion, or loan repayment received is recorded in the loan smart contract 1018. The smart contracts 1012, 1014, 1016 and 1018 are deployed on the blockchain network 1026.

Figure 20:
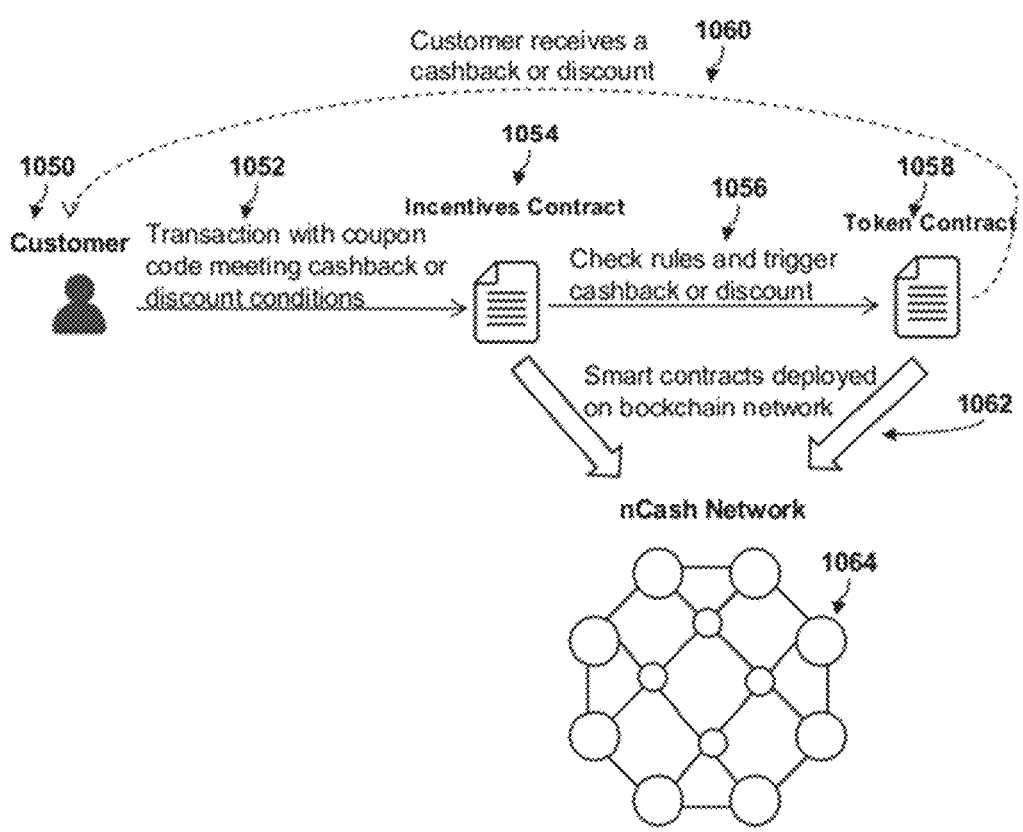
FIG. 20 is an illustration of a process for issuing cashback and discounts using smart contracts, according to an embodiment of the invention.

Referring now to FIG. 20 an illustration of a process for issuing cashback and discounts using smart contracts, is described in more detail. A customer 1050 makes a transaction to a merchant with coupon code meeting cashback or discount conditions at step 1052. An incentives smart contract 1054 checks cashback or discount rules comprised thereby and triggers a cashback or discount if the transaction meets the cashback or discount criteria at step 1056. When a cashback or discount is triggered, the token contract 1058 is updated and tokens are transferred from the merchant's account to the customer's account. The customer 1050 receives a cashback or discount notification at step 1060. The smart contracts 1054 and 1058 are deployed on the blockchain network 1064 at step 1062.

Figure 21:
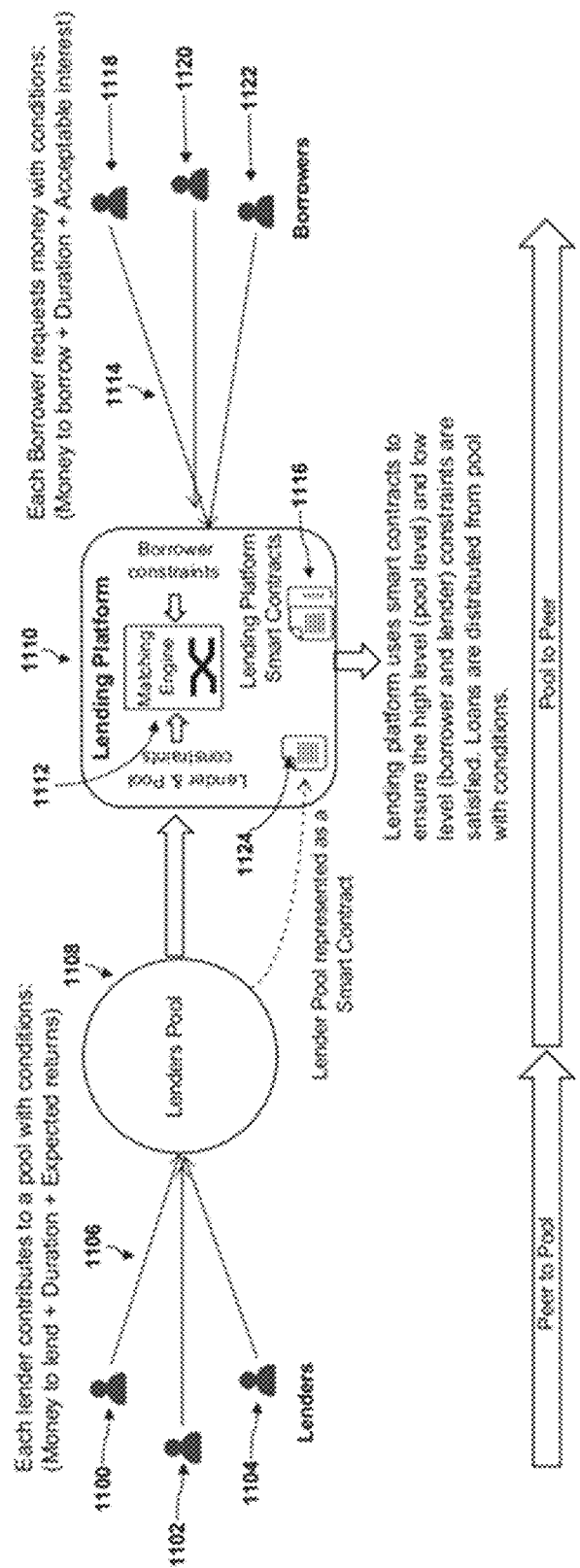
FIG. 21 is an illustration of a peer-to-pool-to-peer (P2P2P) lending model, according to an embodiment of the invention.

Referring now to FIG. 21 an illustration of the peer-to-pool-to-peer (P2P2P) lending model, is described in more detail. The lenders 1100, 1102, 1104 contribute to a lenders pool 1108 with conditions. A lender's condition to lend money may include the amount to lend, the duration of the loans, and expected returns. The loans are distributed from the lenders pool 1108 with conditions. Borrowers 1118, 1120, 1122 may submit borrower's requests 1114 from the lenders pool 1108 through a lending platform 1110. Each borrower request may comprise the borrower's conditions for a loan. A borrower's condition for borrowing money may include the amount to borrow, the duration of the loan, and an acceptable interest rate.

A matching engine 1112 in the lending platform 1110 uses smart contracts 1116 to ensure the high level (pool level) and low level (borrower and lender) constraints are satisfied. A borrower's requests to borrow money are matched automatically to the lenders 1100, 1102, 1104 and lending pool's 1108 conditions using smart contracts 1116. Each lender pool (such as pool 1108) is represented by a smart contract (such as smart contract 1124) in the lending platform 1110 which controls the pool level behavior and handles conditions such as different time periods and expected returns for the lenders 1100, 1102, 1104 and substitution of lenders who exit the pool 1108 with new lenders, as some of the lenders to the pool 1108 may have different time periods and they will exit and be substituted by new lenders. Loans are distributed from lender pools 1108 with conditions.

The peer-to-pool-to-peer (P2P2P) lending model is more efficient than the existing peer-to-peer (P2P) lending models, especially when there are large number of lenders/investors who want to lend loans. Each lender/investor contributes a different amount of money and specifies the minimum interest they would like to receive and the period of their loan amounts. Similarly, the borrowers specify similar terms such as the amount of money to borrow, duration and acceptable rate of interest. In the P2P2P lending model the lender's money is pooled into one lending pool and then lent out to multiple borrowers, while smart contracts assure payouts to lenders and payments to borrowers, while some lenders exist and some borrowers' payback. This allows the "pool" of money that is used for lending, while at the lower level smart contracts ensure all lower agreements are kept. Lenders' and borrowers' contributions and withdrawals continually occur, while the pool remains active as new borrowers and lenders join and others may leave. A lender may end up lending to N loans and a borrower may end up borrowing from M lenders over a period where only P lenders are active at any time (where M>N and M>P). The smart contracts are thus critical to maintain the integrity of the records. In the P2P2P lending model, the transactions for pools merge lower level transactions between peers inside the blockchain.

Furthermore, it is contemplated and included within the scope of the invention that a variety of loans may be executed utilizing this systems and other systems disclosed herein. The types of loans requested by borrowers, and offered by lenders, may include larger value loans, such as those typically offered by banks, but may also include smaller value loans, including those for individual consumer transactions (e.g. a routine, daily transaction for the purchase of consumer goods, groceries, etc.) performed at a merchant terminal. Additionally, loan requests may also take the form of other transfers of value aside from fiat currency, such as requests for cryptocurrency, credit towards a future transaction, an exchange of tokens having value, and the like.

Figure 22:
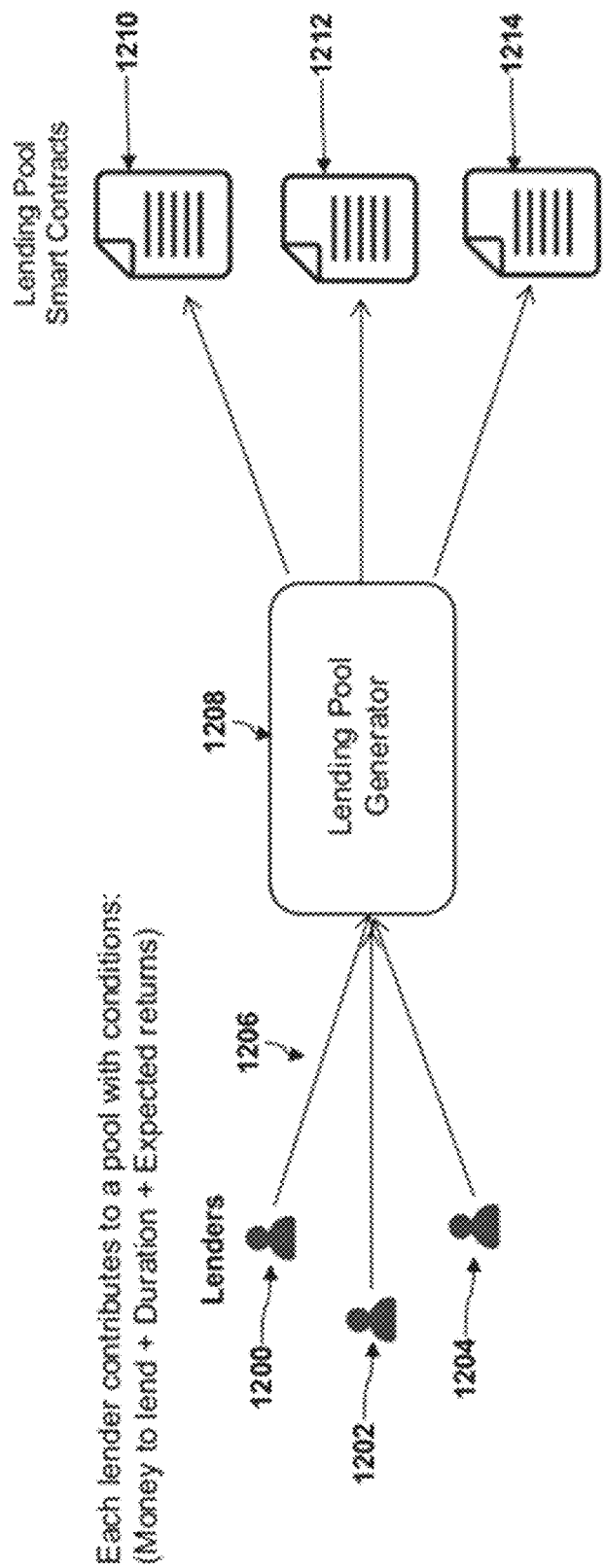
FIG. 22 is an illustration of a lending pool generator for generating lending pool smart contracts, according to an embodiment of the invention.

Referring now to FIG. 22 an illustration of a lending pool generator for generating lending pool smart contracts is described in more detail. Each lender 1200, 1202, 1204 contributes 1206 to a lending pool with conditions including the amount of money to lend, duration of lending and expected returns. Lenders 1200, 1202, 1204 can have different conditions and may contribute to one or more lending pools. A lending pool smart contract generator 1208 is used to generate smart contracts 1210, 1212, 1214 which represent the lending pools.

Figure 23:
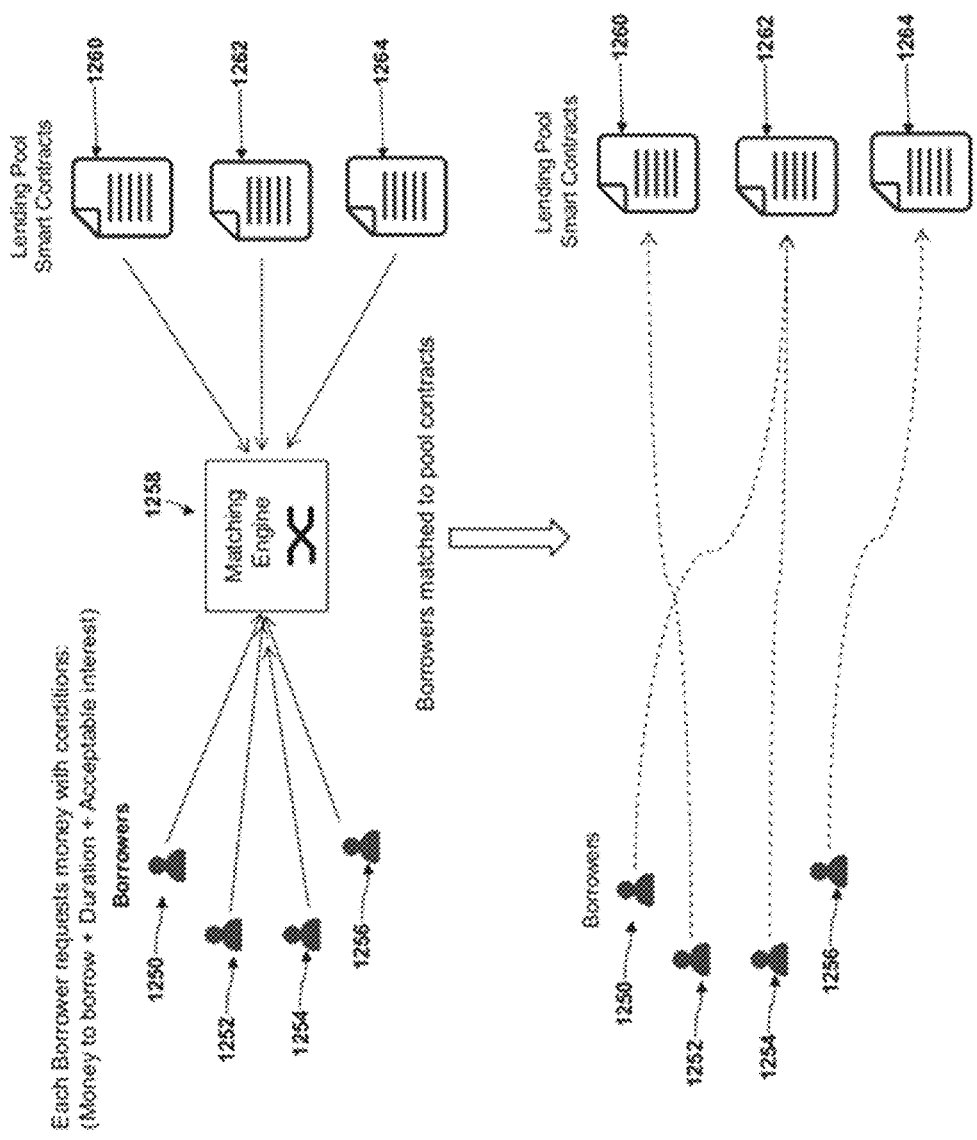
FIG. 23 is an illustration of a matching engine for matching borrowers to lending pools, according to an embodiment of the invention.

Referring now to FIG. 23 an illustration of a matching engine for matching borrowers to lending pools is described in more detail. Each borrower 1250, 1252, 1254, 1256 requests money with conditions including the amount of money to borrow, duration for which money is to be borrowed and acceptable rate of interest. A matching engine 1258 matches the borrowers 1250, 1252, 1254, 1256 to lending pool smart contracts 1260, 1262, 1264 such that the borrower level and pool level conditions are satisfied. A borrower 1250, 1252, 1254, 1256 may be matched to more than one lending pool.

Figure 24:
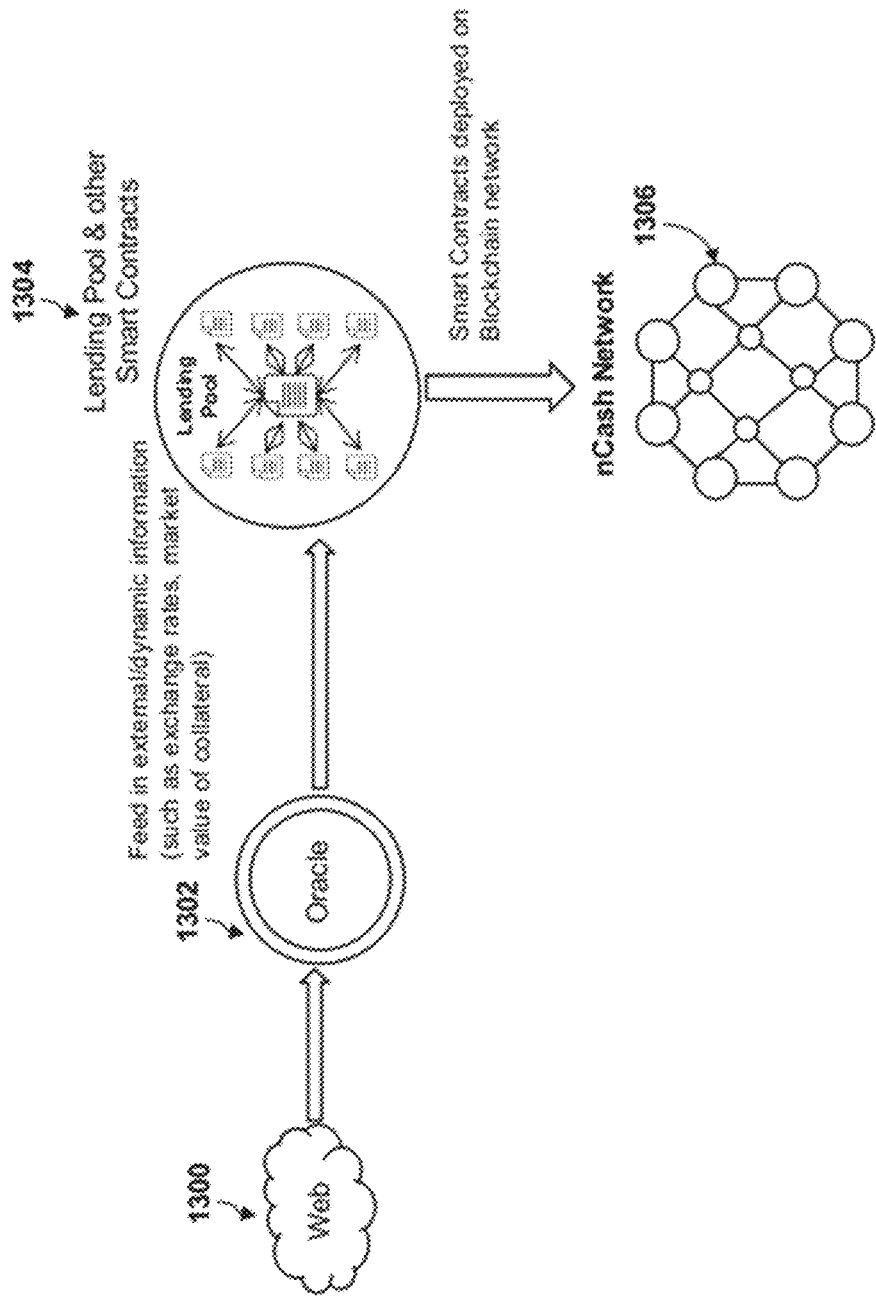
FIG. 24 is an illustration of feeding external data to lending pool contracts using an oracle, according to an embodiment of the invention.

Referring now to FIG. 24 an illustration of feeding external data to lending pool contracts using an oracle is described in more detail. Lending pool and related smart contracts 1304 are deployed on a blockchain network 1306. An oracle 1302 is used to feed in external or dynamic information (such as exchange rates, market value of collateral) to the lending pool smart contracts. The oracle 1302 may obtain such information from external sources and the web 1300.

Figure 25:
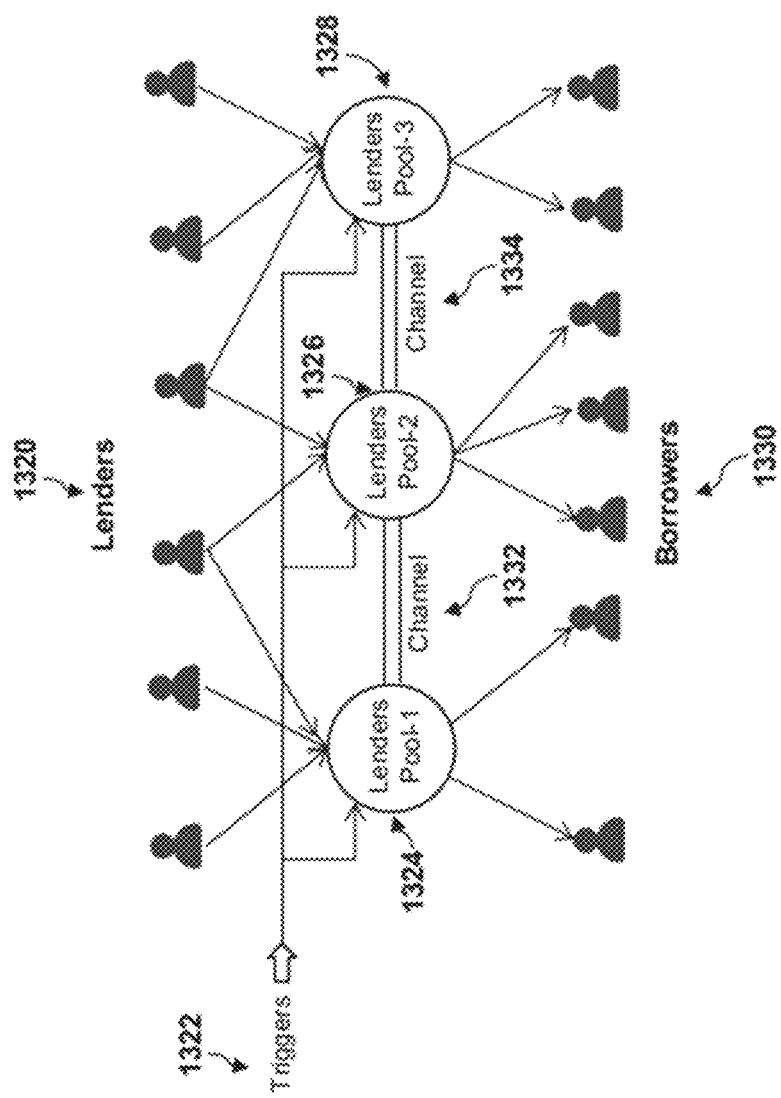
FIG. 25 is an illustration of channels and triggers for lending pools, according to an embodiment of the invention.

Referring now to FIG. 25 an illustration of channels and triggers for lending pools is described in more detail. Lending pools 1324, 1326, 1328 comprising Lenders 1320 and distributing to Borrowers 1330 can have channels 1332, 1334 between them for transfer of pooled funds between the pools based on external triggers 1322. Moving funds from one pool to another pool may be required when a pool is not performing well and the high-level (pool-level) and low-level (lender and borrower level) constraints are not being satisfied. The P2P2P lending platform may monitor the performance of each lending pool and generate triggers for transfer of funds from one pool to another.

Figure 26:
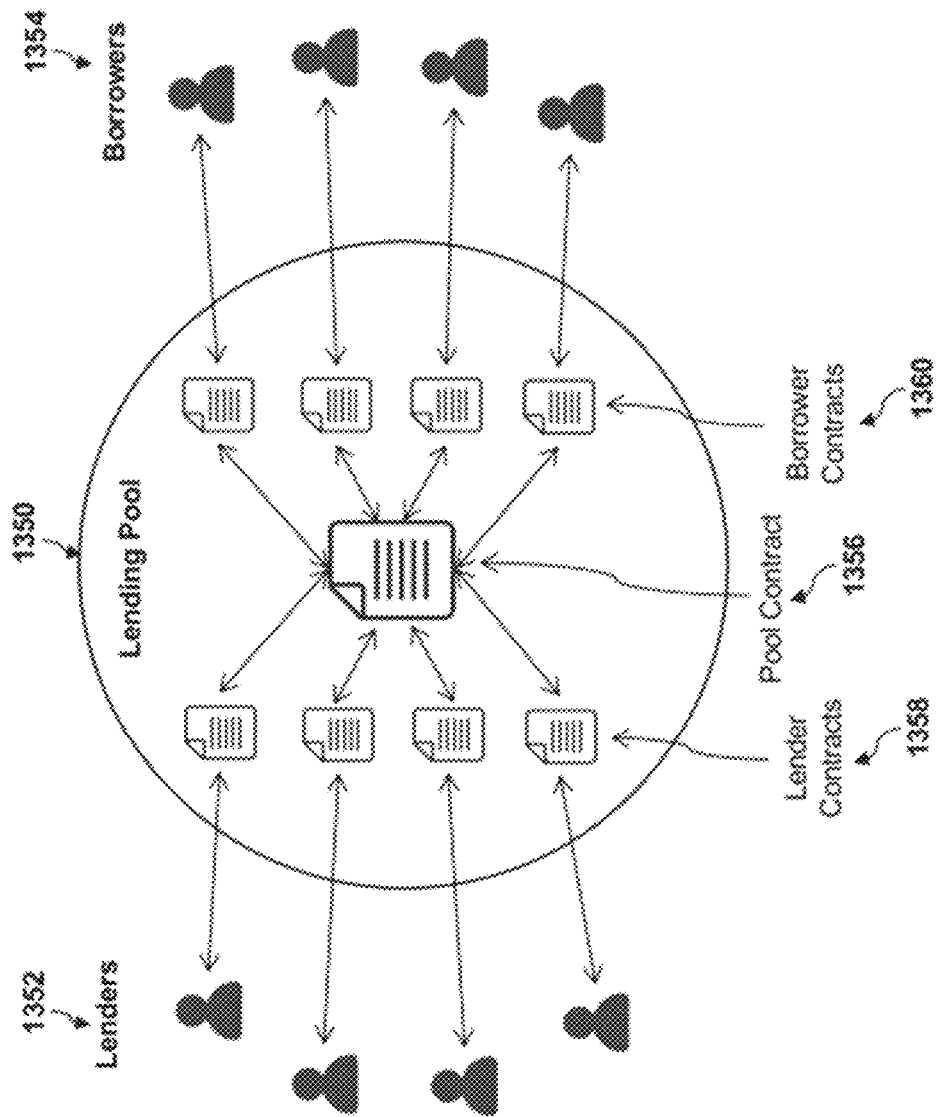
FIG. 26 is an illustration of smart contracts involved in a lending pool, according to an embodiment of the invention.

Referring now to FIG. 26 an illustration of the smart contracts involved in a lending pool is described in more detail. Each lender 1352 is represented by an individual smart contract 1358 in the lending pool 1350. Similarly, each borrower 1354 is represented by an individual smart contract 1360 in the lending pool 1350. The lender smart contracts 1358 link lenders 1352 to the lending pool 1350 via the lending pool contract 1356. The borrower smart contracts 1360 link borrowers 1354 to the pool lending 1350 via the lending pool contract 1356. There is no direct link between the lenders 1352 and borrowers 1354 like traditional smart contracts used in blockchain based peer-to-peer lending solutions.

In current lending schemes (especially computer-implemented lending schemes or blockchain based peer-to-peer lending schemes), if there are a large number of investors in a lending pool, each specifying an investment amount they would like to invest, the rates they would like to receive in combination with time periods (such as 2.3% over 3 months, or 2.2% over 6 months) and with various exit strategies, and large number of borrowers specifying various terms and repayment periods and early payoff options, the following problems arise:

Manual reconciliation is not possible when the number of active and passive investors enter and leave the pool.

A scalable and secure solution is not possible.

Abstracting the lenders and borrowers with "linked" smart contracts in a lending pool solves the problems of manual reconciliation and scalability. Additionally, this approach provides the following benefits:

Borrowers with good credit may borrow at better rates and lend to other borrowers with bad credit with the borrowed money at higher rates.

A seamless lending environment can be created with options to borrow or lend at certain rates and offer these derivatives for trading as well.

Figure 27:
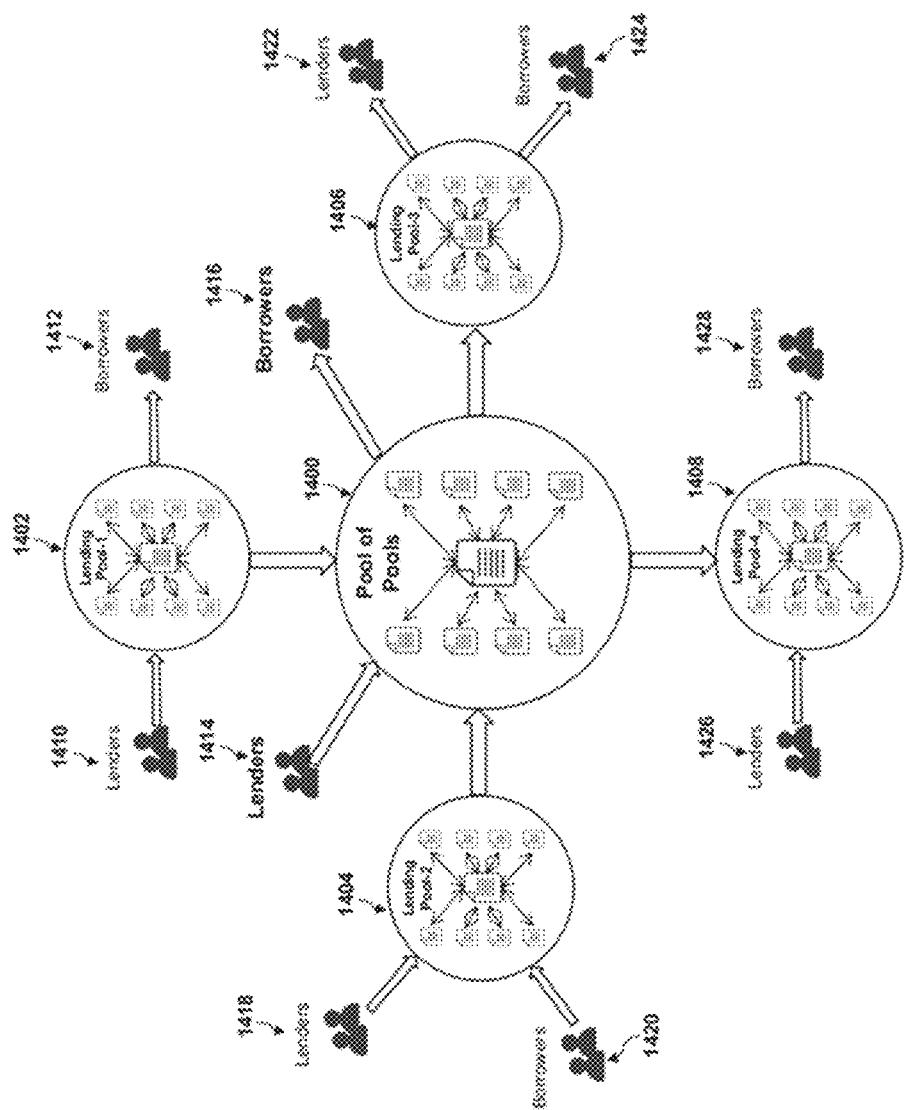
FIG. 27 is an illustration of a pool-of-pools comprised of multiple lending pools, according to an embodiment of the invention.

Referring now to FIG. 27 an illustration of pool-of-pools comprised of multiple lending pools, is described in more detail. Multiple lending pools can be clubbed together to create a pool-of-pools. The pool-of-pools approach is beneficial for highly volatile pools in which borrowers and lenders keep entering and exiting and it is difficult to meet the high-level (pool-level) and low-level (lender and borrower level) constraints. Combining multiple pools into a pool-of-pools brings stability to the P2P2P lending platform. A pool-of-pools approach may comprise a plurality of lending pools 1402, 1404, 1406, 1408 that each interact with a pool of pools 1400. Each of the plurality of lending pools 1402, 1404, 1406, 1408 may comprise borrower smart contracts with respective borrowers 1412, 1420, 1424, 1428 and lender smart contracts with respective lenders 1410, 1418, 1422, 1426. Additionally, some borrowers 1416 and lenders 1414 may interact directly with the pool of pools 1400.

Figure 28:
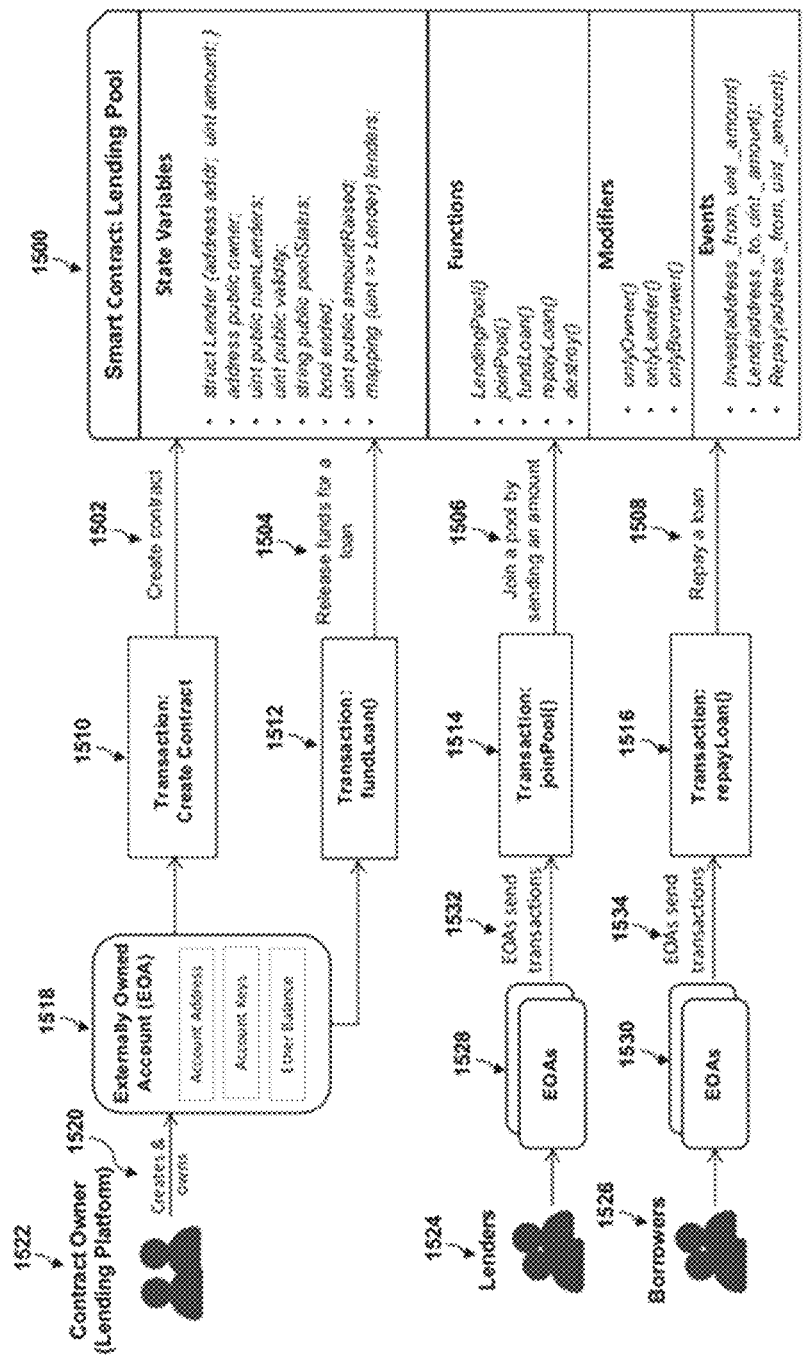
FIG. 28 is an illustration of a lending pool smart contract structure and transactions, according to an embodiment of the invention.

Referring now to FIG. 28 an illustration of lending pool smart contract structures and transactions is described in more detail. A contract owner (or the lending platform) 1522 creates and owns 1520 a lending pool contract 1500. The lending pool contract 1500 is created from an externally owned account (EOA) 1518 of the contract owner (or the lending platform) 1522 when a create contract transaction 1510 is performed by the EOA 1518 thereby creating 1502 the lending pool contract 1500. Lenders 1524 use their EOAs 1528 to send transactions 1532 to the lending pool contract 1500. A lender 1524 can join 1506 a lending pool by sending a joinPool transaction 1514. Borrowers 1526 use their EOAs 1530 to send transactions 1534 to the lending pool contract 1500. A borrower 1526 can repay a loan 1508 taken from the lending pool by sending a repayLoan transaction 1516.

Figure 29:
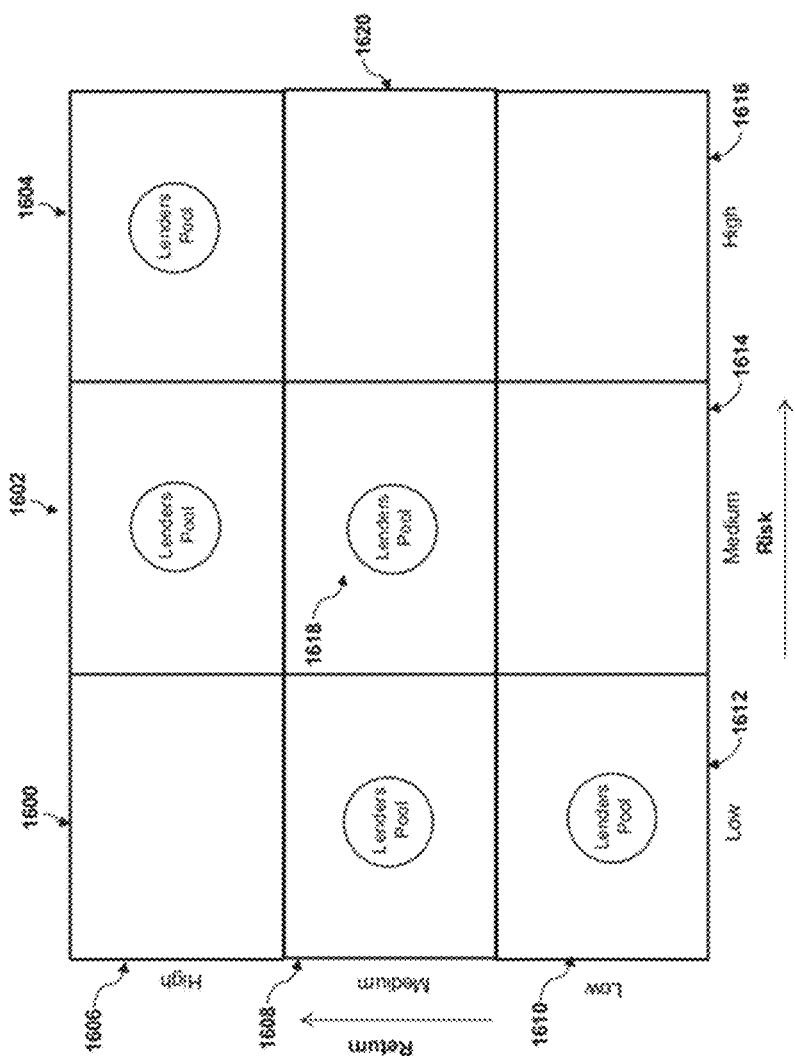
FIG. 29 is an exemplary classification of lending pools based on their risk and returns, according to an embodiment of the invention.

Referring now to FIG. 29 an exemplary classification of lending pools based on their risks and returns is described in more detail. Lending pools are classified based on their risks and returns. The lending pools with lower risk have lower returns and the lending pools with higher risk have higher returns. The risk level for a lending pool is computed based on the reputation and credit scores of the borrowers and lenders linked to the pool. The pools which lend money to borrowers with high credit scores usually lend at low rates of interest as these loans are considered to be safe. Similarly the pools which lend money to borrowers with low credit scores usually lend at high rates of interest as these loans are considered to be risky. In some embodiments, the loan risk may be categorized as low, medium, and high, and the returns may also be characterized as low, medium and high. This may result in risk-reward categories of low risk-high returns 1600, medium risk-high returns 1602, high risk-high returns 1604, low risk-medium returns 1608, medium risk-medium returns 1618, high risk-medium returns 1620, low risk-low returns 1612, medium risk-low returns 1614, and high risk-low returns 1616. Most lending pools will fall into one of low risk-low returns 1612, low risk-medium returns 1608, medium risk-medium returns 1618, medium risk-high returns 1602, and high risk-high returns 1604.

Figure 30:
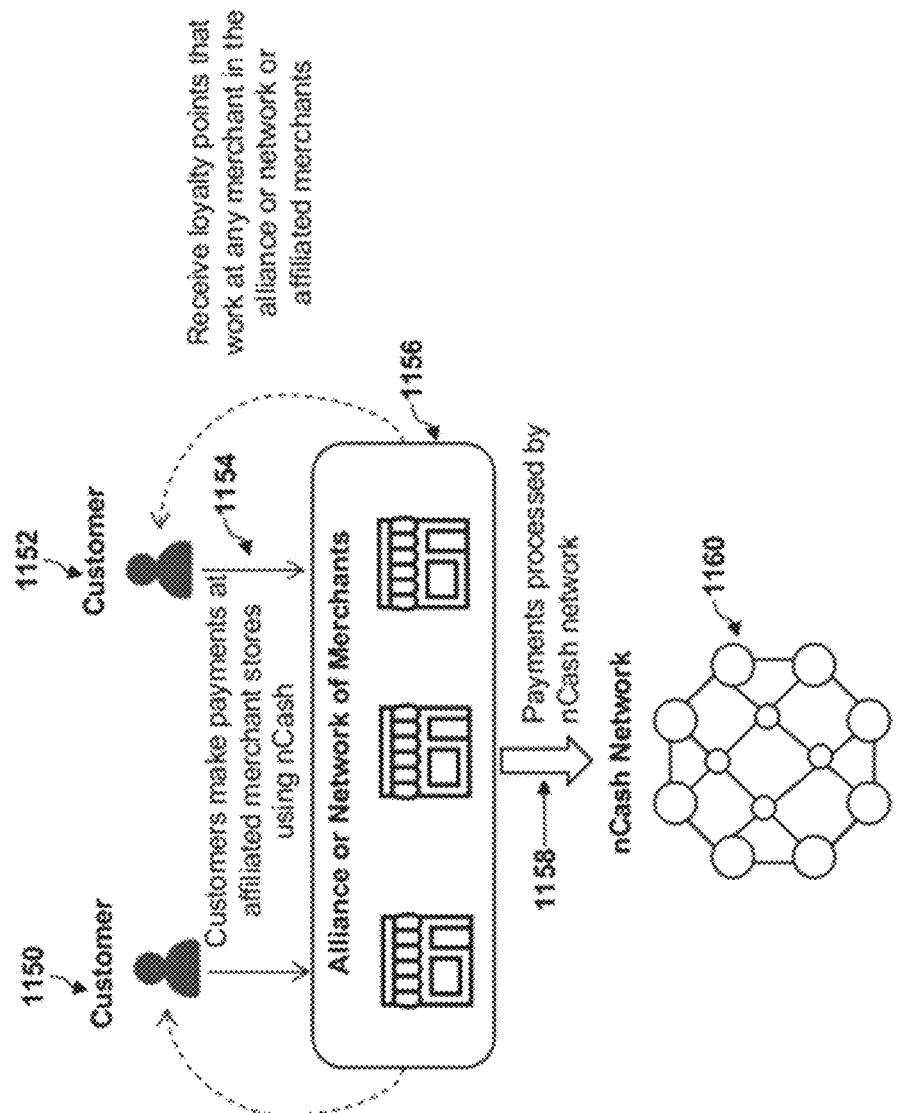
FIG. 30 is an illustration of an alliance of merchants with interoperable loyalty points, according to an embodiment of the invention.

Referring now to FIG. 30 an illustration of an alliance of merchants with interoperable loyalty points is described in more detail. Customers 1150 and 1152 make payments 1154 at affiliated merchant stores 1156 using exemplary. The merchant payments are processed 1158 by the exemplary network 1160. Customer's receive loyalty points that work at any merchant in the alliance or network or affiliated merchants 1156. These loyalty points are interoperable across all the merchants in the alliance and can be applied towards a discount for the next purchase.

Figure 31:
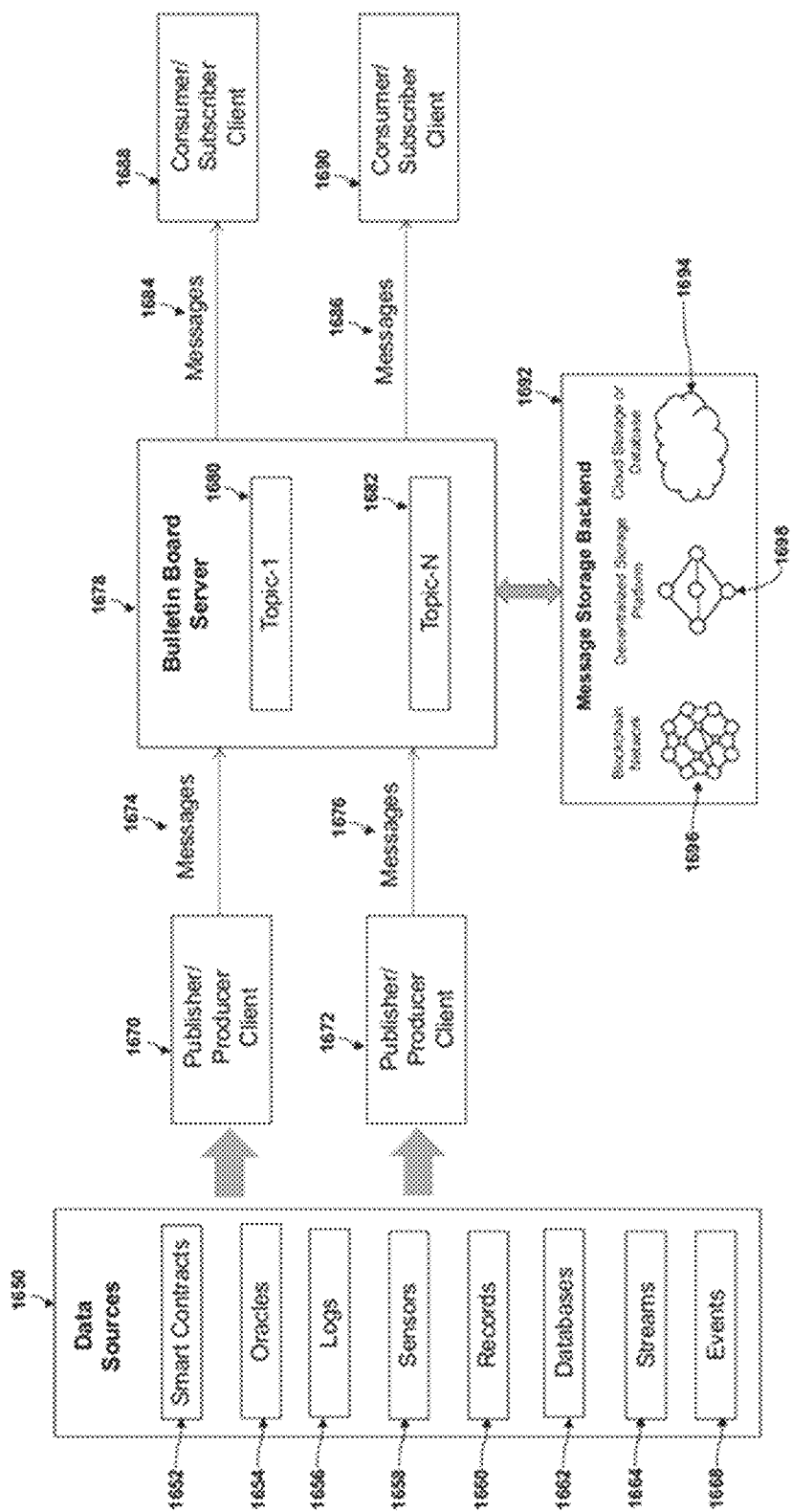
FIG. 31 is an illustration of a distributed messaging framework called Bulleting Board Messaging Framework (BBMF) according to an embodiment of the invention.

Referring now to FIG. 31 an illustration of a distributed messaging framework, is described in more detail. The distributed publish-subscribe messaging framework described here is referred to as Bulleting Board Messaging Framework (BBMF) or "Bulletin Board". The Bulletin Board Server 1678 manages Topics 1680, 1682. Bulletin Board Clients can be Publisher/Producer Clients 1670, 1672 or Consumer/Subscriber Clients 1688, 1690. The Publisher/Producer Clients 1670, 1672 publish data or messages to Topics 1680, 1682. Data pushed to the topics 1680, 1682 from the Publisher/Producer Clients 1670, 1672 may originate from data sources 1650, which may comprise smart contracts 1652, oracles 1654, logs 1656, sensors 1658, records 1660, databases 1662, streams 1664, and events 1668. Consumer/Subscriber Clients 1688, 1690 consume data from the Topics 1680, 1682, receiving messages 1684, 1686 from the Bulletin Board Server 1678. Bulletin Board Server 1678 supports a plug-in Message Storage Backend 1692 to store and replay messages. The Message Storage Backend 1692 persists the messages using two options: (1) a Cloud Database or Cloud Storage 1694, (2) Decentralized Storage Platform (such as IPFS or Swarm) 1698 with regular checkpointing of message hashes to a Blockchain 1696. Messages in the Bulletin Board can be either Ephemeral or Persistent. Ephemeral messages are not stored by the Message Storage Backend. For Persistent messages Time-to-Live (TTL) can be specified. The Producers and Consumers support both Cloud and Blockchain protocols such as HTTP-REST or Web3 for Ethereum. This allows existing Smart Contracts (such as Solidity smart contracts) to publish and consume data to/from the Bulletin board, and existing Oracles to feed-in data from the web to the smart contracts through the Bulletin board. A smart contract implemented in the Solidity language, for example, is a data source which generates notifications in the form of Solidity events which are published to the Bulletin Board server by a Publisher Client. Solidity smart contracts require an external Publisher Client to publish messages to the Bulletin board. Extensions to smart contract languages such as Solidity may be implemented to support Bulletin board APIs to publish data without the need for an external publisher client. These extensions and/or stubs can be through use of pragma directives that may be pre-processed by pre-processors to generate suitable code for implementing the interfaces to the bulletin board, or they could involve extensions to the language itself to support global variable names. Topics are managed in-memory with regular snapshots on the disk which are later stored in the Message Storage Backend 1692. A compaction process is defined for moving the messages in the snapshots to the Message Storage Backend 1692 (Cloud and/or Blockchain). The Bulletin Board itself may be implemented in part through use of a cloud-based service and/or a blockchain and may also include hardware accelerators (such as ASICs or FPGAs) and graphical processing units (GPUs) to provide this high throughput low latency service. Additional redundancy, authorization, and encryption layers may also be provided in hardware and software using known techniques for cloud and internet networks to secure the messages and values stored from system failures or hacking attacks.

The BBMF is designed for high throughput and low latency messaging. The Bulletin Board server 1678 can be deployed in a cloud computing environment and scaled either vertically or horizontally based on demand. In vertical scaling larger virtual machine instance size (in terms of compute capacity, memory and storage) is used for the Bulletin Board server. In horizontal scaling multiple instances of the Bulletin Board server are launched with each instance managing a subset of the topics managed by the Bulletin Board.

BBMF supports both push/pull and publish/subscribe data ingestion models and data delivery models. Furthermore, the data delivery may be either at-least once delivery or exactly-once delivery. BBMF can be implemented in hardware and software, using a combination of servers, ASICs/FPGAs and GPUs as part of a cloud-based or a locally configured computing system.

As Bulletin Board is a distributed messaging framework, a trade-off exists between consistency and availability. This trade-off is explained with the CAP Theorem, which states that under partitioning, a distributed data system can either be consistent or available but not both at the same time. Bulletin Board adopts an eventually consistent model. In an eventually consistent system, after an update operation is performed by a writer, it is eventually seen by all the readers. When a read operation is performed by a consumer, the response might not reflect the results of a recently completed write operation.

The Bulletin Board messaging framework supports prioritized processing of messages. The priority can be set in the message header field. Various priority classes for messages can be defined and specified in the priority header field. This priority classification of messages is crucial for the Peer-to-Pool-Peer (P2P2P) lending system when a large number of updates have to be propagated to linked smart contracts in the lending system.

Figure 32:
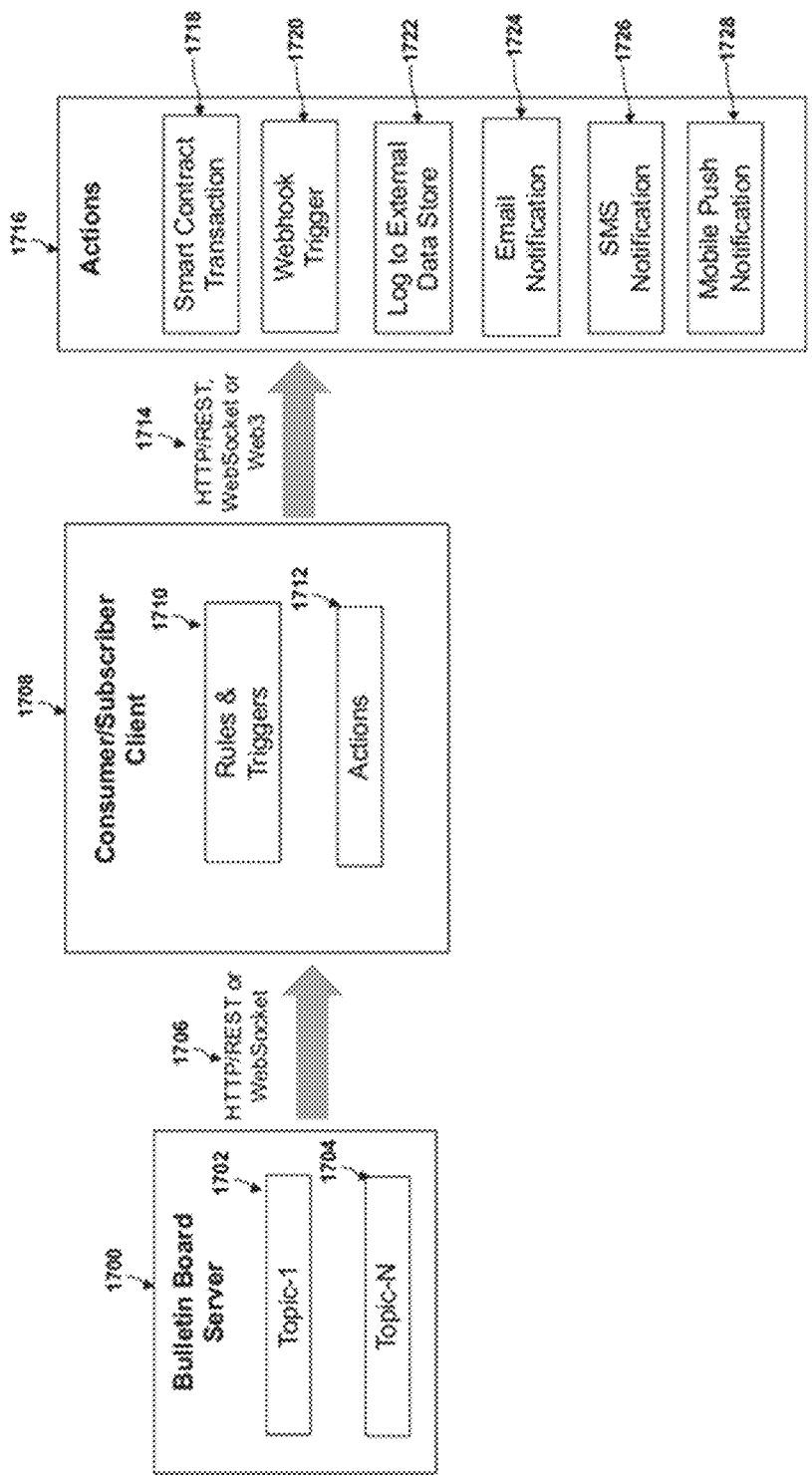
FIG. 32 is an illustration of consumer/subscriber actions supported in the publish-subscribe messaging framework illustrated in FIG. 31.

Referring now to FIG. 32 an illustration of the consumer/subscriber actions supported in the publish-subscribe messaging framework are described in more detail. For Consumers or Subscribers 1708 various actions Rules & Triggers 1710 and Actions 1712 can be defined. Rules & Triggers 1712 specify how to filer and select data and trigger actions. The supported actions 1716 include Smart Contract Transaction 1718, Webhook Trigger 1720, Log to External Data Store 1722, Email Notification 1724, SMS Notification 1726, and Mobile Push Notification 1728. An action is performed when a message 1706 matching a rule is received (for example temperature>60 or ETH price<$500) from the Bulletin Board Server 1700, being related to one of the Topics 1702, 1704 managed by the Bulletin Board Server 1700. The message may be transmitted to the Consumer or Subscriber Client 1708 by any means or method known in the art, including, but not limited to, HTTP/REST applications and WebSocket. The smart contract transaction action is particularly useful for the P2P2P lending system described above where a large number of linked smart contracts (such as smart contracts in a lending pool) can be executed when a message notifying a change in the lending conditions is received.

Figure 33:
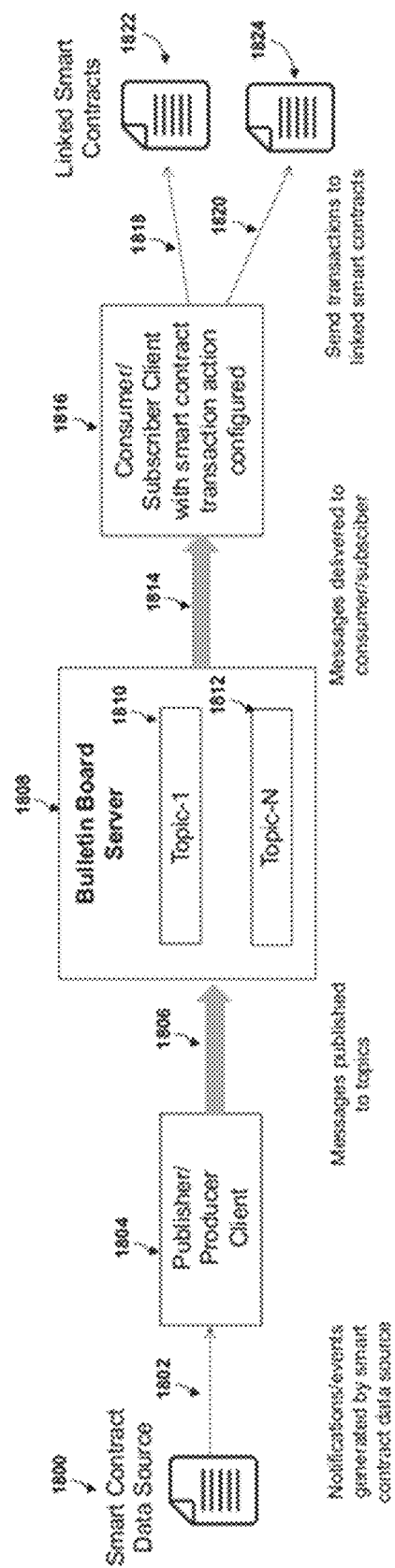
FIG. 33 is an illustration of a smart contract data source that uses an external publisher client to publish messages to the publish-subscribe messaging framework, according to an embodiment of the invention.

Referring now to FIG. 33 an illustration of a smart contract data source that uses an external publisher client to publish messages to the publish-subscribe messaging framework is described in more detail. A smart contract data source 1800 such as a Solidity smart contract generates notifications or events 1802. A publisher/producer client 1804 watches for the notifications or events generated by the smart contract 1800. When a notification or event is generated, the messages are published 1806 to the topics 1810, 1812 managed by the Bulletin Board 1808. These messages are delivered 1814 to the consumer/subscriber client 1816 which has subscribed to the topics 1810, 1812. The consumer/subscriber client 1816 has a smart contract transaction action configured which sends transactions 1818, 1820 to the linked smart contracts 1822, 1824 on receiving the messages.

Referring now to FIG. 34 an illustration of a smart contract data source that uses an integrated publisher client to publish messages to the publish-subscribe messaging framework, is described in more detail. A smart contract data source with integrated publisher/producer client 1850 generates notifications or events. The notifications or events are published as messages 1852 to the topics 1856, 1858 managed by the Bulletin Board 1854. These messages are delivered 1860 to the consumer/subscriber client 1862 which has subscribed to the topics 1856, 1858. The consumer/subscriber client 1862 has a smart contract transaction action configured which sends transactions 1864, 1866 to the linked smart contracts 1868, 1870 on receiving the messages.

Referring now to FIG. 35 an illustration of the message format for the publish-subscribe messaging framework is described in more detail. The Message Type field 1750 defines the type of the message. Supported message types in the Bulletin Board framework are as follows:
  CONNECT: A CONNECT message is sent by a client (producer or consumer) to connect to the server.
  DISCONNECT: A DISCONNECT message is sent by a client to disconnect from the server.
  PUBLISH: Used to publish a new message
  SUBSCRIBE: Used to subscribe to a topic managed by the Bulletin Board
  UNSUBSCRIBE: Used to unsubscribe from a topic
  PINGREQUEST: Used to send a ping request to the server
  PINGRESPONSE: Used to respond to a ping request
  DATAREQUEST: Used to request a message or data item
  DATARESPONSE: Used to respond to a request for a message or data item.

The Data Payload field 1752 includes the message as a JSON data payload. The message may be signed by the sender and/or encrypted. The Topics field 1754 includes a list of topics to which the message is published. The Headers field 1756 includes headers such as:
  Sender or receiver identity
  Message signature
  QoS Level
  Priority
  Persistent or Ephemeral message
  Additional flags to help in processing of message The Time-to-Live (TTL) field 1758 is used to specify the validity or life of the message. The Nonce field 1760 is an integer value which can be used to prove that a given amount of work was done in composing the message.

Figure 36:
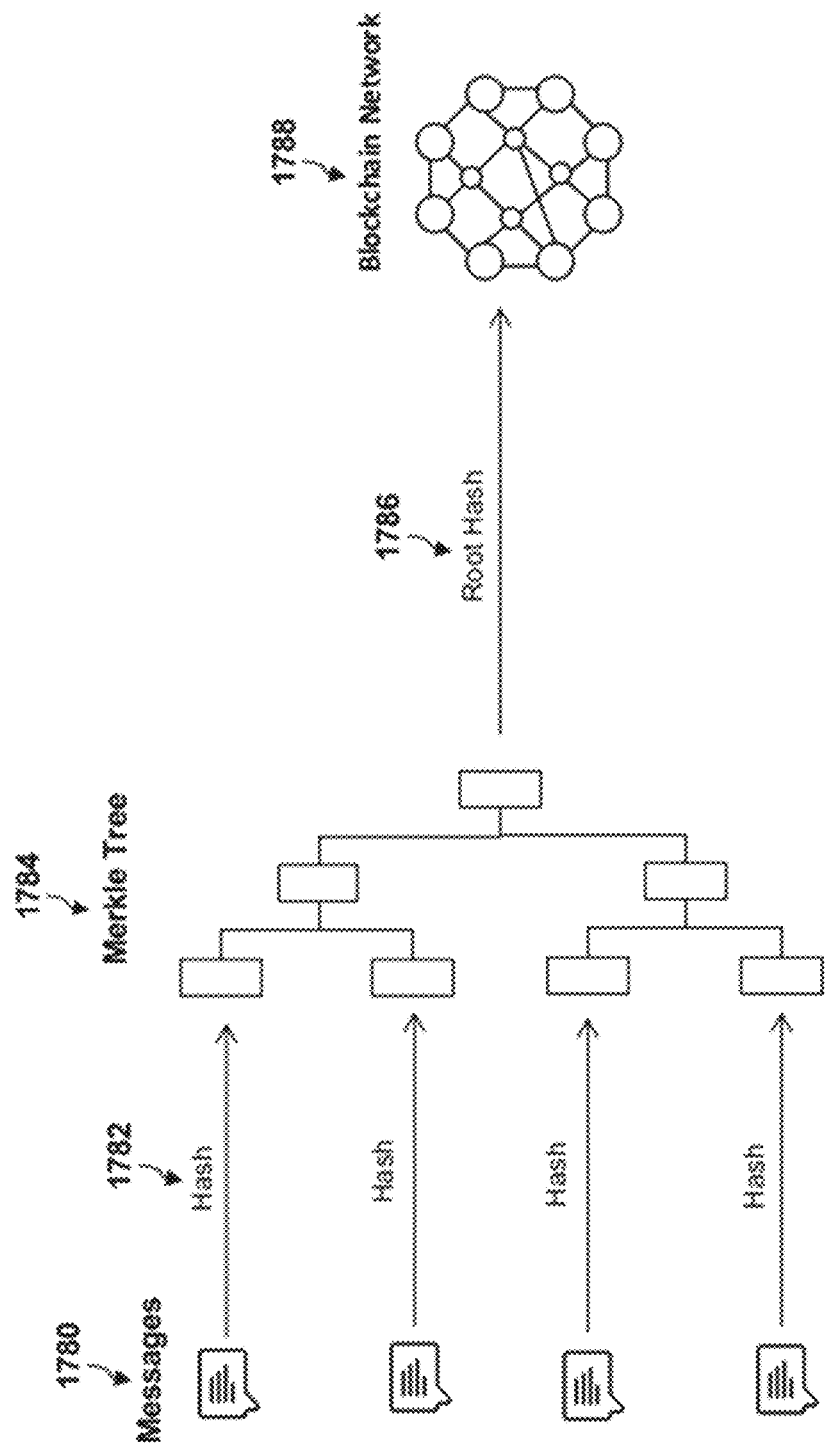
FIG. 36 is an illustration of a global variable name system being updated by a consumer of the publish-subscribe messaging framework, according to an embodiment of the invention.

Referring now to FIG. 36 an illustration of a blockchain checkpointing approach in the publish-subscribe messaging framework, is described in more detail. When using Blockchain and Decentralized Storage Platform (IPFS or Swarm) based Message Storage Backend, the messages 1780 are hashed 1782 and are added to a Merkle Tree 1784. The root hash 1786 of the Merkle Tree 1784 (after every N messages) is recorded on the Blockchain 1788. This ensures messages cannot be tampered with later.

Figure 37:
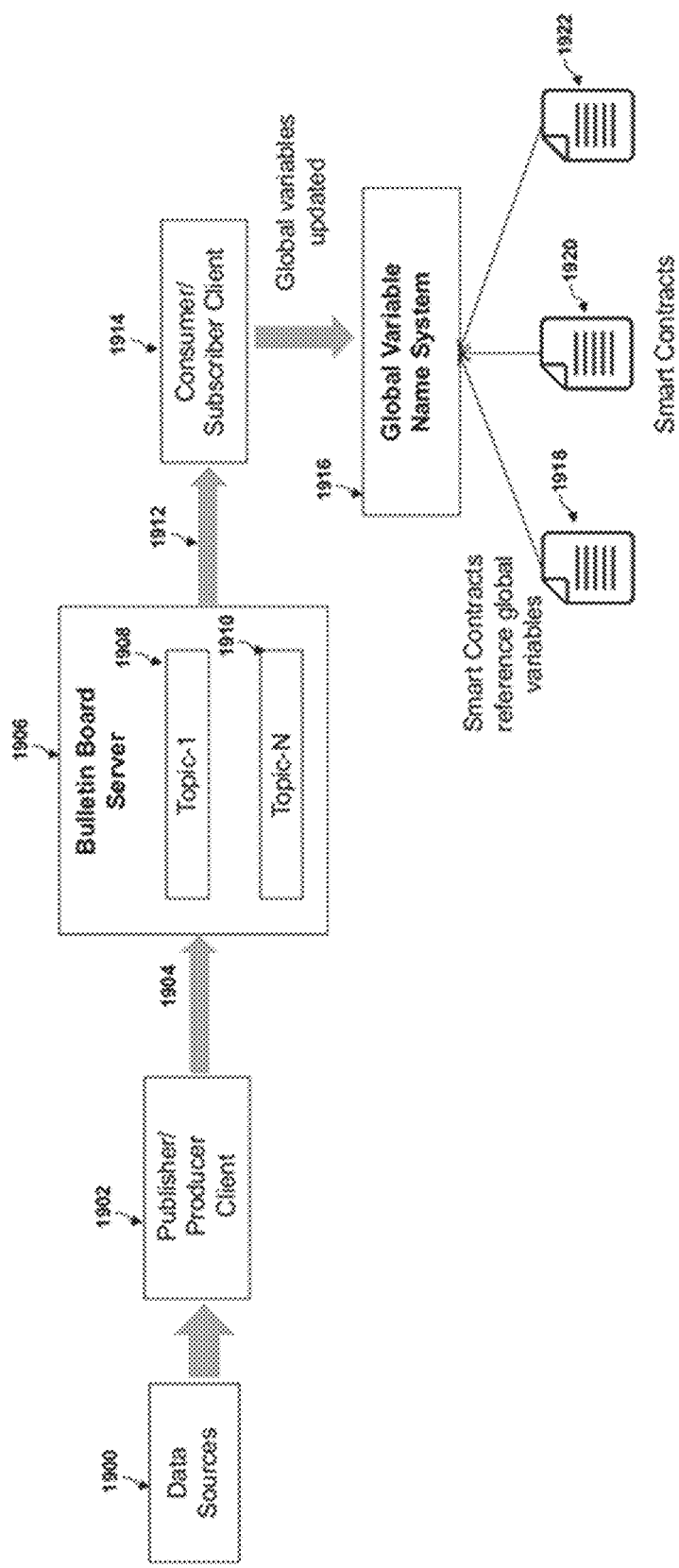
FIG. 37 is an illustration of the architecture of a global variable name system, according to an embodiment of the invention.

Referring now to FIG. 37 an illustration of a global variable name system being updated by a consumer of the publish-subscribe messaging framework, is described in more detail. The Global Variable Name System (GVNS) 1916 maintains records of global variables and the owners and resolvers for the global variables. Data sources 1900 such as a smart contract, oracle, log, sensor, record, database, stream or event, produce data or notifications which are sent to a publisher/producer client 1902. The publisher/producer client 1902 publishes the data or notification as a message 1904 to one or more topics 1908, 1910 managed by the Bulletin Board server 1906. The consumer/subscriber client 1914 receives the messages 1912 and updates the value of global variables registered in the GVNS 1916. Smart contracts 1918, 1920, 1922 reference the global variable registered in the GVNS 1916.

Figure 38:
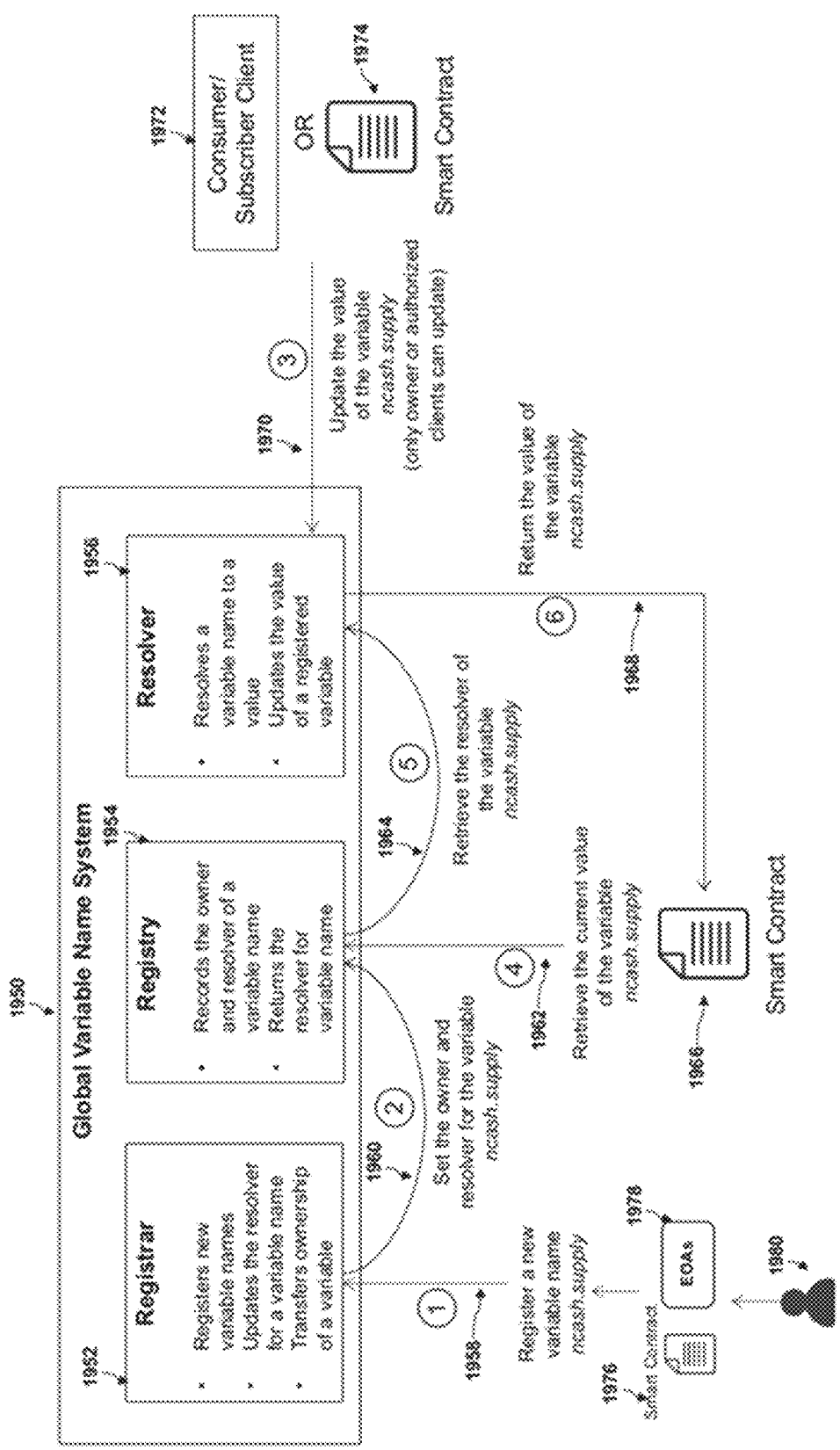
FIG. 38 is an illustration of a blockchain checkpointing approach in the publish-subscribe messaging framework, according to an embodiment of the invention.

Referring now to FIG. 38 an illustration of the architecture of a global variable name system, is described in more detail. The Global Variable Name System (GVNS) 1950 comprises Registrar 1952, Registry 1954 and Resolver 1956 components. The Registrar 1952 is responsible for registering new variable names, updating the resolver for a variable name, and transferring the ownership of a variable. The Registry 1954 is responsible for recording the owner and resolver of a variable name and returning the resolver for a variable name. The Resolver 1956 is responsible for resolving a variable name to a value and updating the value of a registered variable. The steps involved in registering a global variable in the GVNS 1950, updating the variable and retrieving the current value of the variable are explained as follows. At step-1 1958 a user 1980 sends a request (through an externally owned account 1978 or a smart contract 1976) to register a new global variable name (for example, nCash.supply) to the Registrar 1952. At step-2 1960, the Registrar 1952 sets the owner and resolver for the variable in the Registry 1954. At step-3 1970, a consumer/subscriber client 1972 or a smart contract 1974 sends a request to update the value of the global variable to the Resolver 1956. At step-4 1962, a smart contract 1966 requests the value of the global variable from the Registry 1954. At step-5 1964, the Registry 1954 retrieves the Resolver 1956 for the variable. At step-6 1968, the Resolver 1956 returns the value of the global variable.

Figure 39:
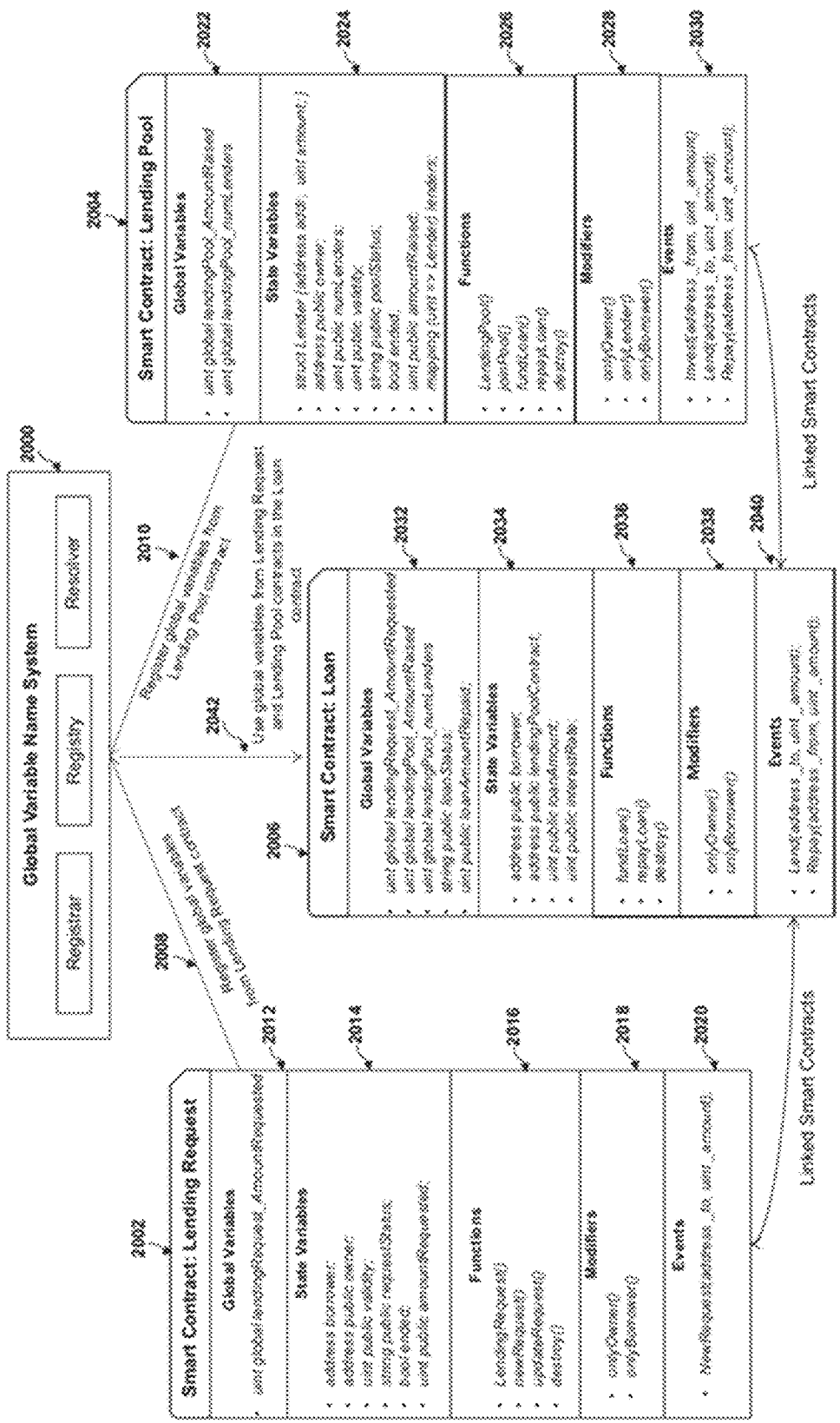
FIG. 39 is an illustration of global variable sharing across smart contracts, according to an embodiment of the invention.

Referring now to FIG. 39 an illustration of global variable sharing across smart contracts is described in more detail. The Lending Pool smart contract 2004, Lending Request smart contract 2002 and Loan smart contract 2006 are linked smart contracts in a Peer-to-Pool-Peer (P2P2P) lending system that are used in loan making and loan servicing processes. The Lending Request smart contract 2002 is used in the loan making process. Borrowers send lending requests to the lending system and a Lending Request smart contract is created for each lending request. The Lending Pool smart contract 2004 is used to manage a lending pool. When the lending system matches a lending request to a lending pool, a new Loan smart contract 2006 is created. The Loan smart contract 2006 manages the loan servicing aspects of a loan from the time the loan is disbursed until the loan is paid off. The Loan smart contract 2006 captures the loan details such as loan principal, loan interest rate, address of lending pool contract from where the loan is disbursed as state variables. Loan smart contract 2006 also registers global variables 2042 such as for the loan amount repaid (loanAmountRepaid) and loan status (loanStatus). The Lending Pool smart contract 2004 and Lending Request smart contract 2002 have global variables 2022, 2012 which are registered 2010, 2008 with the Global Variable Name Systems (GVNS) 2000 (lendingPool AmountRaised, lendingPool numLenders, lendingRequest AmountRequested). These global variables are referenced 2032 in the Loan smart contract 2006.

Each of the smart contracts 2002, 2004 and 2006 have state variables 2014, 2024, 2034, functions 2016, 2026, 2036, modifiers 2018, 2028, 2038, and events 2020, 2030, 2040, which are existing elements/types/constructs in the Solidity smart contracts language. Support for global variables which are shared across multiple smart contracts through GVNS 2000 within Solidity smart contracts language, is added through extensions to the Solidity language specification or through embodiments described below that can be implemented without such extensions to Solidity and/or EVM. Furthermore, extensions are done within the Ethereum Virtual Machine (EVM) which is the runtime environment for smart contracts in Ethereum to add support for global variables shared through GVNS 2000. While Solidity and Ethereum have support for a limited set of global variables that provide information about the blockchain (such as block.coinbase, block.difficulty, block.gaslimit, block.number, block.blockhash, block.timestamp, msg.data, msg.gas, msg.sender, msg.value, tx.gasprice, tx.origin, this.balance, addr.balance), it is not possible for two or more linked smart contracts to share global variables. This additional support for global variables is enabled by the GVNS 2000, extensions to the Solidity language specification and extensions to the Ethereum Virtual Machine (EVM). The global variable support is crucial for linked smart contracts (such as in a P2P2P lending system) to work.

The BBMF when used in combination with GVNS could provide information to an "analytics engine" as to the number of updates of the global variables and their type, and also to "advertising engines" as to the global variables referenced and their types.

Referring now to FIG. 40 an exemplary implementation of a Bulletin Board Publisher/Producer client and Consumer/Subscriber client is described in more detail. In the Publisher/Producer client implementation an instance of the Bulletin Board client class is created. The connect( )method of the client class is used to establish a connect to the Bulletin Board server by passing the Bulletin Board server address, clientiD and client secret. The publish( )method of the client class is used to publish a message to the Bulletin Board server. The message object published to the Bulletin Board server contains the list of topics, data payload, headers, time-to-live and nonce fields. In the Consumer/Subscriber Client implementation, subscribe( )method of the client class is used to subscribe to all or selected topics on the Bulletin Board server. A callback function on_message( ) is defined which is executed every time a new message is delivered.

Figure 41:
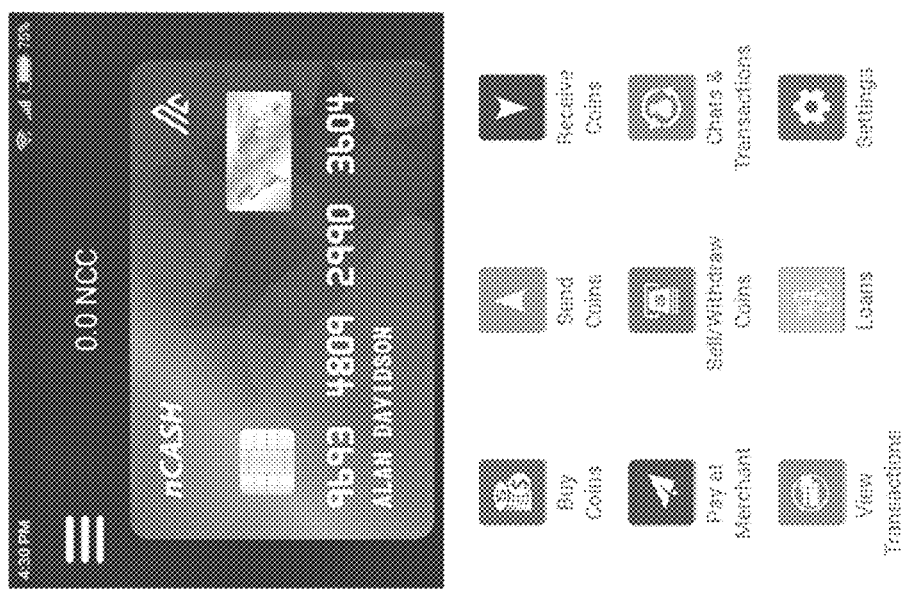
FIG. 41 is an exemplary interface of the representative mobile application, according to an embodiment of the invention.

Referring now to FIG. 41 an exemplary interface of the exemplary mobile application is described in more detail. The exemplary interface shows options to buy coins, send coins, receive coins, pay coins at a merchant, sell or withdraw coins, chat and transact with contacts, view list of transactions, loans and settings options. The customer's account details such as account number, name and account balance is also shown.

Figure 42:
FIG. 42 is an exemplary interface of the representative mobile application extended by showing peer-to-peer lending options, according to an embodiment of the invention.

Referring now to FIG. 42 an exemplary interface of the exemplary mobile application showing peer-to-peer lending options is described in more detail. A customer is eligible to request loans after completing the lending profile that includes customer's financial and education information. Customer can view the exemplary credit score from the mobile application. Borrowing peers (borrowers), can create new loan requests, view the status of existing loan requests, view loan offers received from lending peers (lenders) for the loan requests, and repay a loan. Lending peers (lenders) can view open loan requests submitted by all borrowing peers (borrowers) on the network, search for specific loan requests by date range or loan request ID, send loan offers for the loan requests, and release funds for accepted loan offers.

Figure 44:
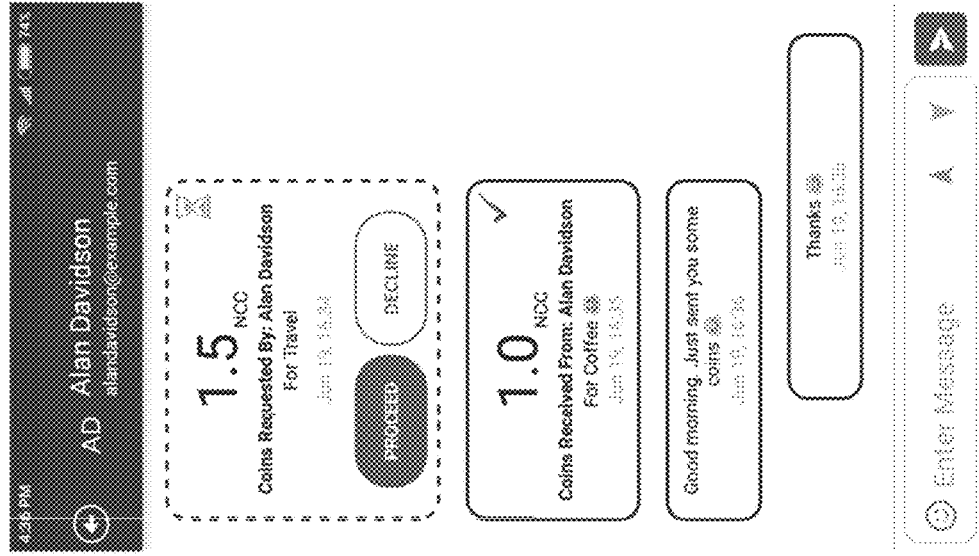
FIG. 44 is an exemplary interface of the mobile application extended to show chats and payments interface, according to an embodiment of the invention.
Figure 43:
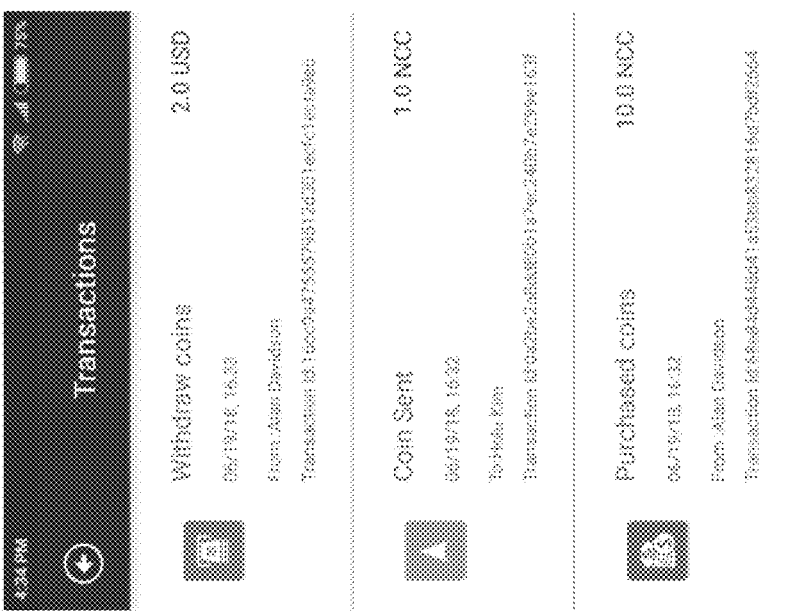
FIG. 43 is an exemplary interface of the mobile application extended to different types of transactions, according to an embodiment of the invention.

Referring now to FIG. 43 an exemplary interface of the exemplary mobile application showing different types of transactions is described in more detail. The transactions involved are of following types:
  Transaction for buying new coins by paying in fiat currency (such as USD) with credit/debit card or ACH bank transfer
  Transaction for buying new coins by paying in cryptocurrency (such as Bitcoin)
  Transaction for selling coins and withdraw coins to a linked bank account
  Transaction for transferring coins to another user
  Transaction for a cashback received on availing a cashback offer.
  Transaction for coins received on claiming a voucher Referring now to FIG. 44 an exemplary interface of the exemplary mobile application showing chats and payments interface, is described in more detail. The chats and transactions interface allows two customers to chat with each other and send or request payments. A payment request received by a user can be approved or declined from the chats and transactions interface itself.

Figure 45:
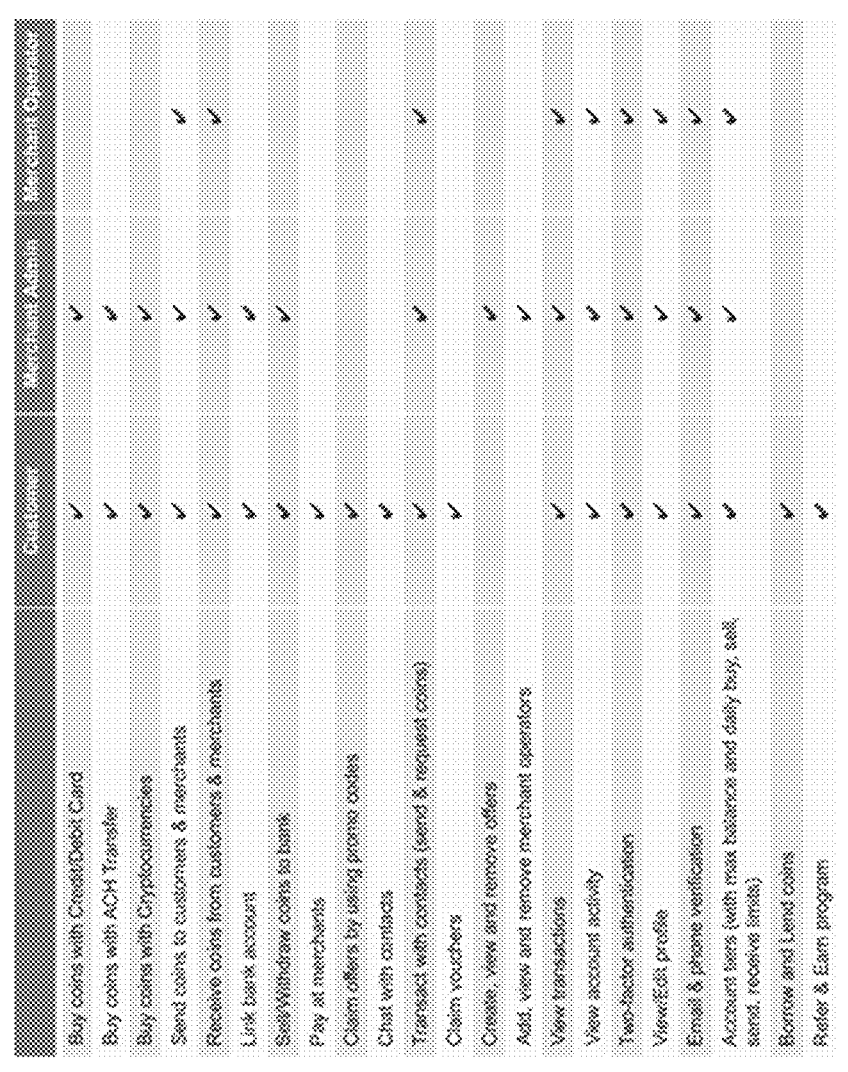

Referring now to FIG. 45 an illustration of the exemplary mobile application features for different types of accounts is depicted.

Figure 46:
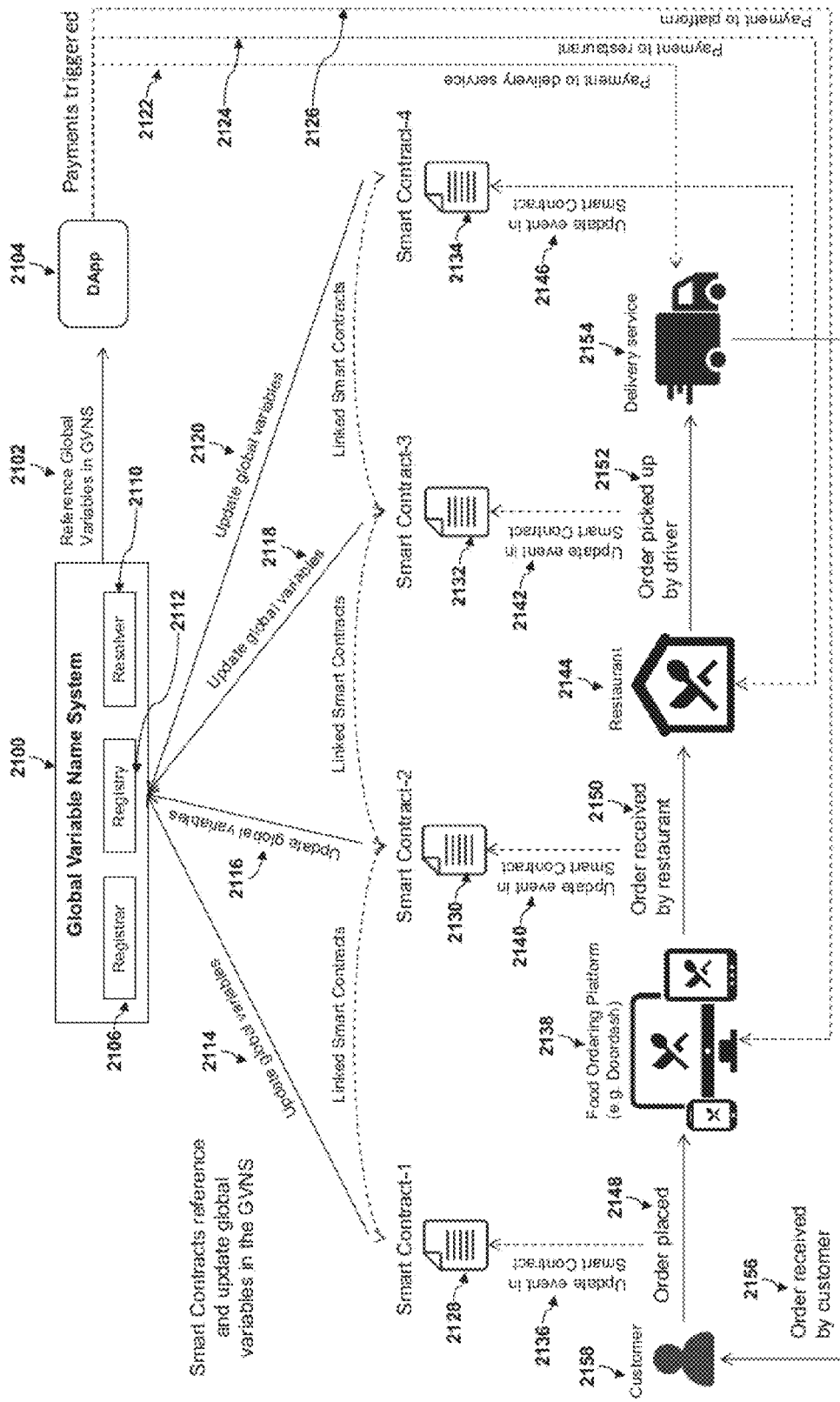
FIG. 46 is an illustration of an application of a Global Variable Name System to an online-food ordering system, according to an embodiment of the invention.

Referring now to FIG. 46 an illustration of an application of a Global Variable Name System to an online-food ordering system, is described in more detail. Consider the example of an online-food ordering system and can also represent any peer-to-peer services application, such as Uber or Lyft, or an Amazon Prime type services model. There are a number of parties involved—customer 2158, food ordering platform 2138, restaurant 2144, delivery service 2154 (applicable to DoorDash and Uber type delivery systems). The system creates, in this exemplary case, four linked smart contracts 2128, 2130, 2132 and 2134 when an order is placed. The linked smart contracts share state through a Global Variable Name System (GVNS) 2100, the GVNS 2100 comprising a registrar 2106, a registry 2112, and a resolver 2110 as described hereinabove. The smart contracts 2128, 2130, 2132 and 2134 include global variable registration requests that are sent to the GVNS 2100 and reference and update global variables 2114, 2116, 2118, 2120 in the GVNS 2100 created responsive to the global variable registration requests, defining status updates, responsive to updates 2136, 2140 2142, 2146 received thereby. The update to the global variable comprised by the GVNS 2100 may be defined as a GVNS variable update. The global shared variables and GVNS variable updates associated therewith are the event status that triggers a state machine that goes through the four states of the order—(1) Order placed on online food ordering platform 2148, (2) Order received by restaurant 2150, (3) Order picked up by driver 2152, (4) Order received by customer 2156. A decentralized application (Dapp) 2104 watches 2102 the global variables in GVNS 2100 for order status and triggers order completion and payments to concerned parties when the global state is updated. Upon order completion trigger, payments are sent to—(1) online food ordering platform at step 2126, (2) restaurant at step 2124, (3) delivery service or driver at step 2122. The Dapp 2104 may also transmit an indication about payment being made. In some embodiments, the Dapp 2104 may make the payment across a blockchain network that is discrete from the blockchain network associated with the smart contracts 2128, 2130, 2132, 2134.

Figure 47:
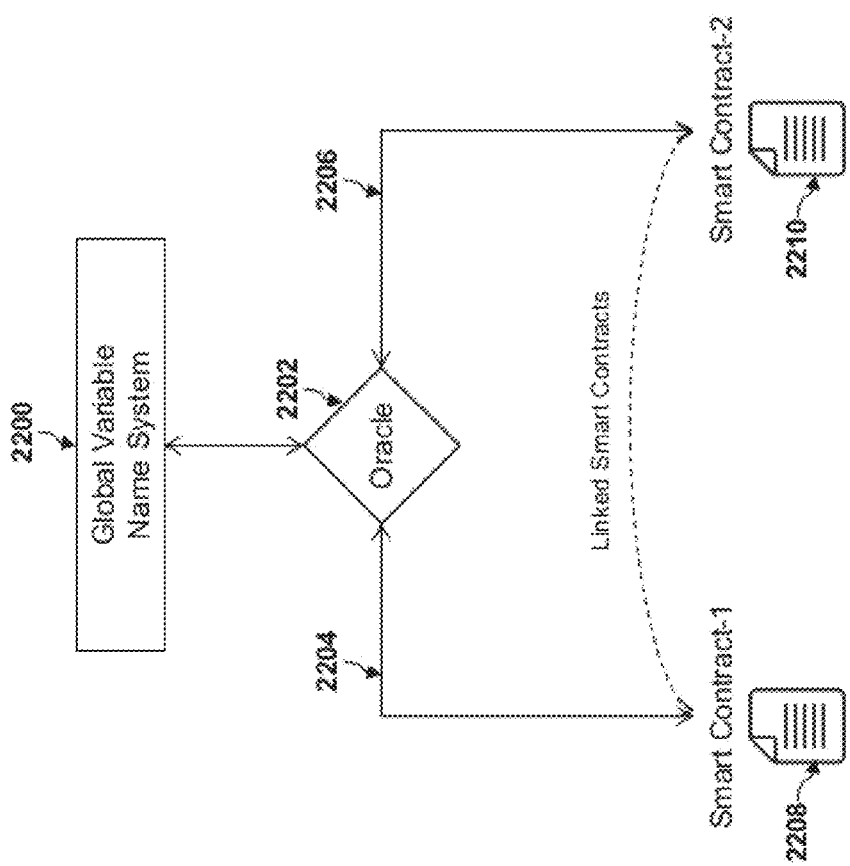
FIG. 47 is an illustration of an approach for realizing the Global Variable Name System, according to an embodiment of the invention.

We now describe an embodiment that may not require extensions of the EVM, but can be realized using a novel way of implementing GVNS. Referring now to FIG. 47, an illustration of an approach for realizing the Global Variable Name System, is described in more detail. The Global Variable Name System (GVNS) 2200 is implemented outside the blockchain in an SQL or NoSQL database. Such an arrangement may improve the performance of the blockchain network the smart contracts reside on by reducing the amount of data stored on the blockchain network and providing additional security to the GVNS by making it not directly accessible from the blockchain network. The two-way oracle 2202 (inbound and outbound) allows registration of global variable names and sending updated values of the variables registered in the GVNS 2200 to smart contracts 2208 and 2210. The smart contracts can request registration of global variable names by transmitting such requests to the GVNS 2200 via the oracle 2202 and update the values of global variables in GVNS 2200 through the oracle 2202. The oracle 2202 pushes data 2204, 2206 to the smart contacts 2208, 2210 according a time period defined as an indication time period whether or not the global variable has changed. If the pushed (or in other embodiments, pulled) data is compared and checked for a flag that indicates the data did not change from the last time then the smart contracts 2208, 2210 need not do anything. Else, the smart contracts will update their local values of the global variables used within their logic. The time period can be adjusted based on application domain. The oracle 2202 has a loop that is driven by a GVNS timer associated with each global variable.

Figure 48:
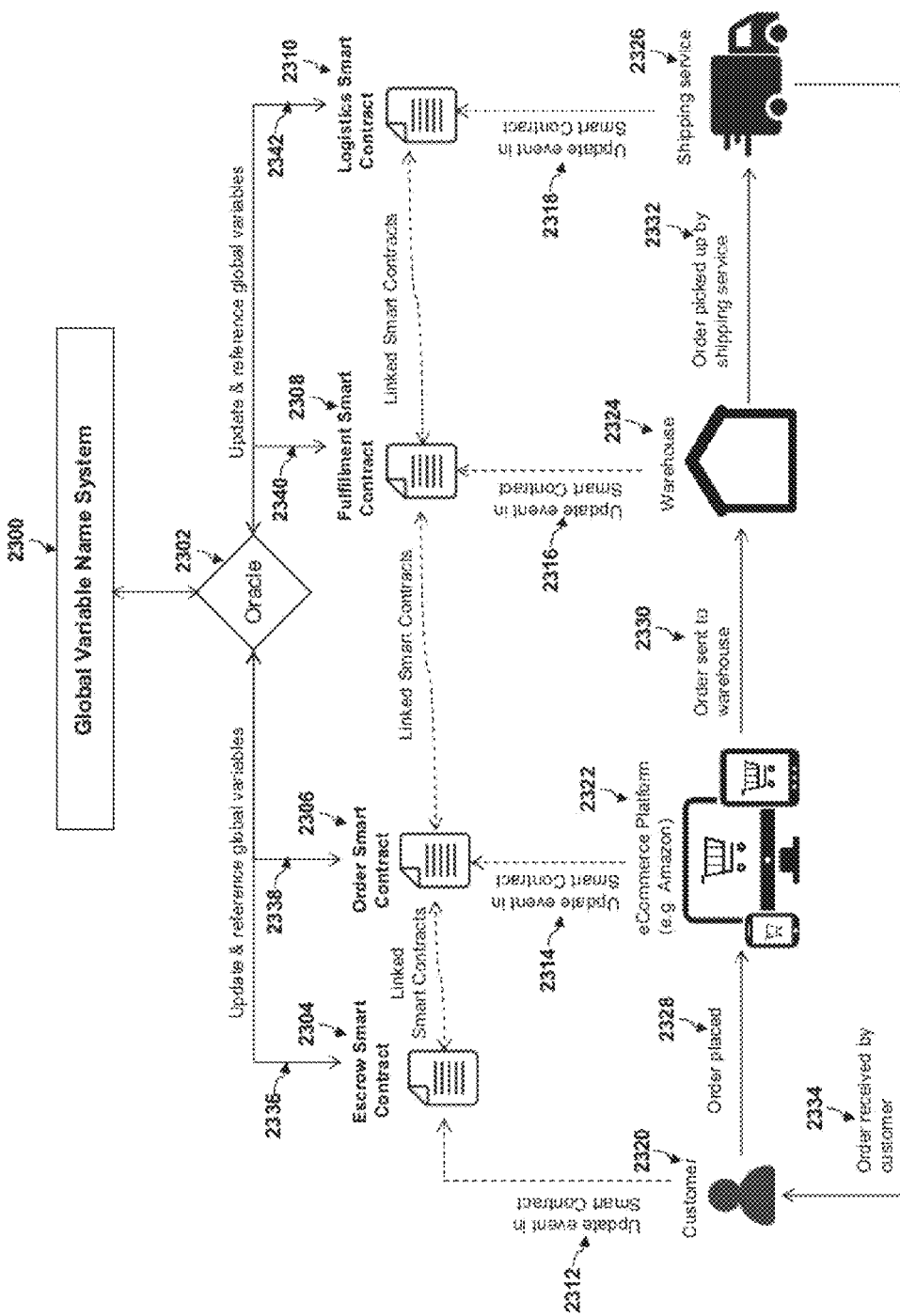
FIG. 48 is an illustration of an application of a Global Variable name system to an online product ordering system, according to an embodiment of the invention.

Referring now to FIG. 48 an illustration of an application of a Global Variable Name System to an eCommerce platform, is described in more detail. Consider the example of an eCommerce platform (such as Amazon, Walmart, eBay or BestBuy). There are a number of parties involved—customer 2320, eCommerce platform 2322, warehouse 2324, shipping service 2326 (either owned by the eCommerce platform or third-party service such as FedEx, DHL or UPS). The system creates, in this exemplary case, four linked smart contracts 2304, 2306, 2308 and 2310 when an order is placed. The customer places the order 2328 for a product on the eCommerce platform 2322 and makes the payment which is held in an Escrow smart contract 2304. Upon confirmation of the order, the eCommerce platform 2322 creates an Order smart contract 2306 and updates the state of the order 2314 in the contract 2306. The order information is sent 2330 to warehouse 2324 for fulfillment. Upon receipt of the order information, the warehouse 2332 creates a Fulfillment smart contract 2308 and updates 2316 the fulfillment status in the smart contract 2308. When the order is packed and handed over 2332 to the shipping service 2326, a Logistics smart contract 2310 is created by the shipping service 2326. When the order is delivered to the customer 2320, the Logistics smart contract 2310 is updated 2318. The linked smart contracts 2304, 2306, 2308 and 2310 share state through a Global Variable Name System (GVNS) 2300. The two-way oracle 2302 (inbound and outbound) allows sending 2336, 2338, 2340, 2342 updated values of the variables registered in the GVNS 2300 to smart contracts 2304, 2306, 2308 and 2310. Upon order completion and delivery 2334, the Escrow smart contract 2304 is updated 2312 and the payment held in Escrow smart contract 2304 is released to the eCommerce platform 2322.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

The claims in the instant application are different than those of the parent application or other related applications. Applicant therefore rescinds any disclaimer of claim scope made in the parent application or any predecessor application in relation to the instant application. Any such previous disclaimer and the cited references that it was made to avoid, may need to be revisited. Further, any disclaimer made in the instant application should not be read into or against the parent application.

That which is claimed is:

1. A method of tracking orders through a blockchain network comprising:
   receiving a plurality of global variable registration requests from a plurality of linked smart contracts recorded to a first blockchain network responsive to an order placement at a global variable name system (GVNS);
   defining a global variable responsive to each global variable registration request;
   receiving a first status update related to the order placement from a first smart contract of the plurality of smart contracts, defining a first received status update; and
   updating a first global variable comprised by the GVNS responsive to the first received status update, defining a first GVNS variable update;
   wherein a reference to the first global variable is comprised by the first smart contract and a second smart contract of the plurality of smart contracts; and
   wherein the value of the first global variable on each of the first and second smart contracts is updated responsive to the first GVNS variable update.

2. The method according to claim 1 further comprising receiving a first indication of value transfer from a distributed application responsive to the first GVNS variable update.

3. The method according to claim 2 wherein the value transfer is indicated to have occurred on a second blockchain network discrete from the first blockchain network.

4. The method according to claim 1 further comprising:
   receiving a second status update related to the order from the second smart contract of the plurality of smart contracts, defining a second received status update; and
   updating a second global variable comprised by the GVNS responsive to the second received status update, defining a second GVNS variable update.

5. The method according to claim 4 further comprising a second indication of value transfer from a distributed application responsive to the second GVNS variable update.

6. The method according to claim 1 wherein the plurality of global variable name registration requests and the first status update are received at an oracle in communication with the GVNS, the method further comprising:
   receiving the plurality of global variable name registration requests from the oracle;
   receiving the first status update from the oracle;
   receiving a status request for the first global variable from the oracle;
   transmitting a first flag to the oracle if the first global variable has changed in a time period since a previous status request for the first global variable, defining a first indication time period; and
   transmitting the value of the first global variable to the oracle where the first flag indicates the first global variable has changed during the first indication time period.

7. The method according to claim 6 wherein the GVNS is implemented in a database outside the first blockchain network.

8. The method according to claim 1 further comprising:
   receiving an indication of the order placement;
   generating the plurality of linked smart contracts responsive to the indication of the order placement, each linked smart contract comprising a global variable name registration request; and
   recording each of the plurality of linked smart contracts to the first blockchain network.

9. The method according to claim 8 wherein the plurality of linked smart contracts comprises a smart contract associated with the placing of the order, a smart contract associated with receipt of the order by an order fulfillment agent, and a smart contract associated with a delivery agent.

10. The method according to claim 9 wherein the plurality of linked smart contracts further comprises an escrow smart contract.

11. A method of tracking orders through a blockchain network comprising:
    receiving a plurality of global variable registration requests from a plurality of linked smart contracts recorded to a first blockchain network responsive to an order placement at a global variable name system (GVNS);

defining a global variable responsive to each global variable registration request;

receiving a first status update related to the order placement from a first smart contract of the plurality of smart contracts, defining a first received status update;

updating a first global variable comprised by the GVNS responsive to the first received status update, defining a first GVNS variable update;

receiving a second status update related to the order from the second smart contract of the plurality of smart contracts, defining a second received status update; and updating a second global variable comprised by the GVNS responsive to the second received status update, defining a second GVNS variable update;

wherein a reference to the first global variable is comprised by the first smart contract and a second smart contract of the plurality of smart contracts;

wherein the value of the first global variable on each of the first and second smart contracts is updated responsive to the first GVNS variable update;

wherein a reference to the second global variable is comprised by the second smart contract and a third smart contract of the plurality of smart contracts; and wherein the value of the second global variable on each of the second and third smart contracts is updated responsive to the first GVNS variable update.

12. The method according to claim 11 further comprising:

receiving a first indication of value transfer from a distributed application responsive to the first GVNS variable update; and receiving a second indication of value transfer from a distributed application responsive to the second GVNS variable update.

13. The method according to claim 11 wherein the plurality of global variable name registration requests and the first status update are received at an oracle in communication with the GVNS, the method further comprising:

receiving the plurality of global variable name registration requests from the oracle;

receiving the first status update from the oracle;

receiving a status request for the first global variable from the oracle;

transmitting a first flag to the oracle if the first global variable has changed in a time period since a previous status request for the first global variable, defining a first indication time period; and transmitting the value of the first global variable to the oracle where the first flag indicates the first global variable has changed during the first indication time period.

14. The method according to claim 13 wherein the GVNS is implemented in a database outside the first blockchain network.

15. The method according to claim 11 wherein the plurality of linked smart contracts comprises a smart contract associated with the placing of the order, a smart contract associated with receipt of the order by an order fulfillment agent, and a smart contract associated with a delivery agent.

16. The method according to claim 15 wherein the plurality of linked smart contracts further comprises an escrow smart contract.

17. A method of tracking orders through a blockchain network comprising:

receiving a plurality of global variable registration requests from an oracle in communication with a plurality of linked smart contracts recorded to a first blockchain network responsive to an order placement at a global variable name system (GVNS);

defining a global variable responsive to each global variable registration request;

receiving a first status update from the oracle related to the order placement from a first smart contract of the plurality of smart contracts, defining a first received status update;

updating a first global variable comprised by the GVNS responsive to the first received status update, defining a first GVNS variable update;

receiving a first indication of value transfer from a distributed application responsive to the first GVNS variable update;

receiving a status request for the first global variable from the oracle;

transmitting a first flag to the oracle if the first global variable has changed in a time period since a previous status request for the first global variable, defining a first indication time period; and transmitting the value of the first global variable to the oracle where the first flag indicates the first global variable has changed during the first indication time period;

wherein a reference to the first global variable is comprised by the first smart contract and a second smart contract of the plurality of smart contracts; and wherein the value of the first global variable on each of the first and second smart contracts is updated responsive to the first GVNS variable update.

18. The method according to claim 17 wherein the value transfer is indicated to have occurred on a second blockchain network discrete from the first blockchain network.

19. The method according to claim 17 further comprising:

receiving a second status update related to the order from the second smart contract of the plurality of smart contracts, defining a second received status update; and updating a second global variable comprised by the GVNS responsive to the second received status update, defining a second GVNS variable update.

20. The method according to claim 19 further comprising a second indication of value transfer from a distributed application responsive to the second GVNS variable update.

* * * * *